(12) United States Patent
Tamura et al.

(10) Patent No.: US 6,576,303 B1
(45) Date of Patent: Jun. 10, 2003

(54) LIQUID CRYSTAL COMPOUNDS EXHIBITING NEGATIVE ANISOTROPY OF PERMITTIVITY

(75) Inventors: Norio Tamura, Chiba (JP); Atsuko Fujita, Chiba (JP); Hiroyuki Tekeuchi, Chiba (JP); Fusayuki Takeshita, Chiba (JP); Etsuo Nakagawa, Chiba (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/622,826
(22) PCT Filed: Dec. 13, 1999
(86) PCT No.: PCT/JP99/06973
§ 371 (c)(1),
(2), (4) Date: Aug. 24, 2000
(87) PCT Pub. No.: WO00/39063
PCT Pub. Date: Jul. 6, 2000

(30) Foreign Application Priority Data

Dec. 25, 1998 (JP) ............................................. 10-370025

(51) Int. Cl.$^7$ ..................... C09K 19/34; C09K 19/30; C07C 211/14; C07C 43/225; C07D 239/26; C07D 319/06
(52) U.S. Cl. .............. 428/1.1; 252/299.61; 252/299.63; 252/299.66; 544/298; 544/334; 544/335; 549/369; 546/193; 546/194; 546/236; 568/588; 568/647; 570/127; 570/129; 570/130
(58) Field of Search ........................ 252/299.61, 299.66, 252/299.63; 556/406, 488; 428/1.1; 570/127, 129, 130; 549/369; 546/184, 192, 193, 194, 236; 544/298, 334, 335; 568/588, 647

(56) References Cited

U.S. PATENT DOCUMENTS

| | | | |
|---|---|---|---|
| 3,269,909 A | * 8/1966 | Leonard | ...................... 514/568 |
| 4,478,740 A | 10/1984 | Eidenschink | ........... 252/299.62 |
| 5,358,663 A | 10/1994 | Gray et al. | ............. 252/299.66 |

FOREIGN PATENT DOCUMENTS

DE 19629523 1/1998

OTHER PUBLICATIONS

CAPLUS 1981: 515322.*
Jacobi, A. et al., "Laterally aromatic branched two–ring mesogens connected to polysiloxane backbone", Mol. Cryst. Liq. Cryst. Sci. Technol., Sect. A, 1997, No. 304, pp. 15–23.

* cited by examiner

Primary Examiner—Shean C. Wu
(74) Attorney, Agent, or Firm—Wenderoth, Lind & Ponack, L.L.P.

(57) ABSTRACT

Novel liquid crystal compound having a negative and absolutely large value of dielectric anisotropy, being excellent in compatibility with other liquid crystalline compounds at a low temperature and being stable chemically and physically, as well as a liquid crystal composition comprising this compound, and a liquid crystal display device comprising this liquid crystal composition are provided, said compound is expressed by the general formula (1):

$$R^1-A^1-B^1-A^2-B^2-A^3-B^3-Z-B^4-A^4-R^2 \quad (1)$$

wherein $A^1$, $A^2$, $A^3$ and $A^4$ represent a single bond, 1,4-cyclohexylene, 1,4-phenylene which may be substituted with a fluorine atom(s) or the like; $B^1$, $B^2$, $B^3$ and $B^4$ represent a single bond, 1,2-ethylene, 1,2-ethenylene, 1,2-ethynylene, oxymethylene, methyleneoxy or the like; $R^1$ and $R^2$ represent an alkyl group having 1 to 10 carbon atoms or the like; and Z represents (I) to (VI):

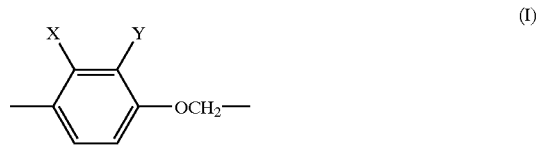

(I)

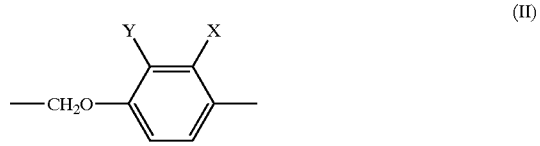

(II)

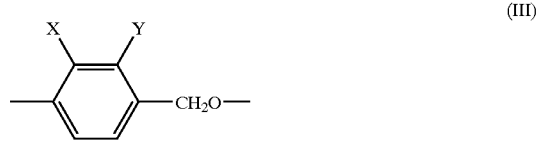

(III)

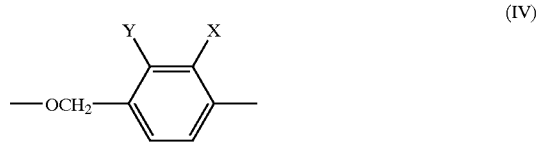

(IV)

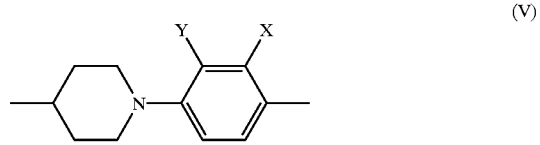

(V)

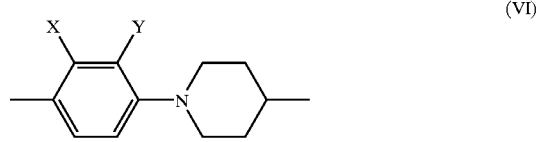

(VI)

wherein X represents H or F, and Y represents difluoromethyl group, difluoromethoxy group, formyl group or carboxyl group.

16 Claims, No Drawings

LIQUID CRYSTAL COMPOUNDS EXHIBITING NEGATIVE ANISOTROPY OF PERMITTIVITY

TECHNICAL FIELD

The present invention relates to a liquid crystalline compound and a liquid crystal composition. More specifically, it relates to a novel liquid crystalline compound having a negative dielectric anisotropy value ($\Delta\in$), a liquid crystal composition comprising this compound as one of components and a liquid crystal display device comprising this liquid crystal composition.

BACKGROUND ART

In recent years, liquid crystal display devices of various modes have been developed in order to obtain a liquid crystal display having a high quality. In particular, an in-plane switching (IPS) mode and a vertical aligning (VA) mode are paid attentions in developing a liquid crystal display having a wide viewing angle. Liquid crystal compositions used for these liquid crystal display devices are expected to have a negative and absolutely large value of $\Delta\in$, and hence many developments have been actively made on liquid crystal materials to meet the expectation as above.

Known as such liquid crystal materials having a negative and absolutely large value of $\Delta\in$ are, for example, 2,3-dicyanophenylene expressed by a formula (13) (Japanese Patent Application Laid-Open No. 10557/1984) and liquid crystalline compounds having a 2,3-difluorophenylene skeleton expressed by formulas (14) or (15) (Japanese Patent Application Laid-Open No. 1725/1990 or Japanese Patent Application WO Laid-Open No. 503441/1990, respectively):

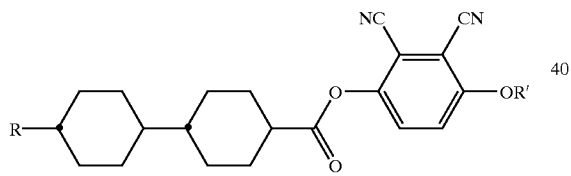

(13)

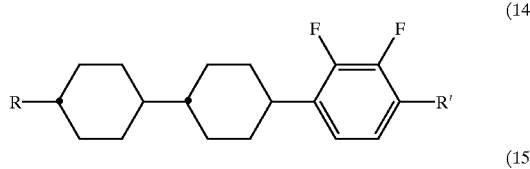

(14)

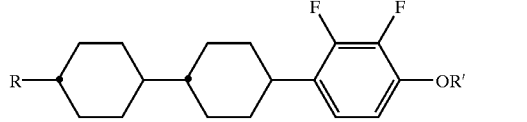

(15)

wherein R and R' represent an alkyl group and the like.

However, among these known compounds, 2,3-dicyanophenylene expressed by the formula (13) has a negative and absolutely large value of $\Delta\in$, but has a problem that it is not only inferior in a compatibility but also lacking in a chemical and physical stability. Accordingly, it is not necessarily satisfactory.

The compound expressed by the formula (14) is simply shown as a component for a ferroelectric liquid crystal composition, and therefore applicability thereof as a nematic liquid crystal composition is not clear. Further, the compound expressed by the formula (15) is shown without any electro-optical characteristics thereof, and therefore it's applicability as a component for a nematic liquid crystal composition is not clear as well.

DISCLOSURE OF THE INVENTION

An object of the present invention is to solve the defects in conventional technology described above. Another object of the present invention is to provide a novel liquid crystalline compound having a negative and absolutely large $\Delta\in$ value, being excellent in a compatibility with other liquid crystalline compounds, having a low viscosity, and being stable chemically and physically; to provide a liquid crystal composition comprising the compound as one of components, and to provide a liquid crystal display device comprising the liquid crystal composition.

For achieving the object described above, the present invention is summarized as follows:

(1) A liquid crystalline compound expressed by the general formula (1):

$$R^1—A^1—B^1—A^2—B^2—A^3—B^3—Z—B^4—A^4—R^2 \quad (1)$$

wherein $A^1$, $A^2$, $A^3$ and $A^4$ each independently represent a single bond, 1,4-cyclohexylene, 1,4-phenylene which may be substituted with a fluorine atom(s), dioxane-2,5-diyl, pyrimidine-2,5-diyl, piperidine-1,4-diyl, pyridine-2,5-diyl which may be substituted with a fluorine atom(s) or 1-sila-1,4-cyclohexylene; Z represents a group selected from divalent groups expressed by partial structural formulas (I) to (VI):

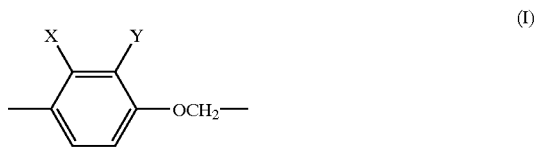

(I)

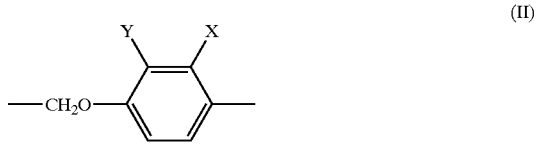

(II)

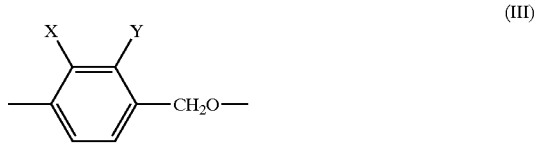

(III)

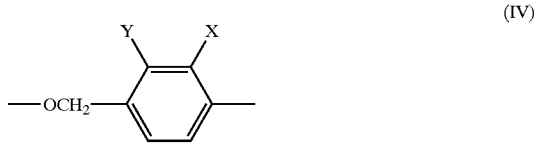

(IV)

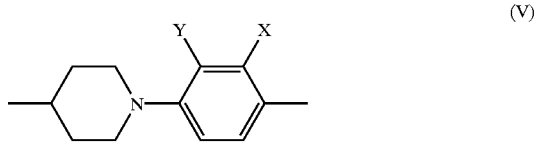

(V)

(VI)

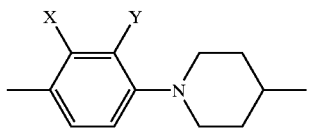

wherein X represents a hydrogen atom or a fluorine atom, and Y represents difluoromethyl group, difluoromethoxy group, formyl group or carboxyl group; $B^1$, $B^2$, $B^3$ and $B^4$ each independently represent a single bond, 1,2-ethylene, 1,2-ethenylene, 1,2-ethynylene, oxymethylene, methyleneoxy, carbonyloxy, oxycarbonyl or 1,4-butylene group, provided that when Z is a group represented by the partial structural formula (III), then $B^4$ is neither oxymethylene nor oxycarbonyl group, and that when Z is a group represented by the partial structural formula (IV), then $B^3$ is neither methyleneoxy nor carbonyloxy group; $R^1$ and $R^2$ each independently represent an alkyl group or a fluoroalkyl group substituted with at least one fluorine atom having 1 to 10 carbon atoms in which alkyl group or fluoroalkyl group one or not adjacent two or more methylene groups may be replaced by an oxygen atom, a sulfur atom or —CH=CH—.

(2) The liquid crystalline compound as recited in paragraph 1 wherein Z is a group represented by the partial structural formula (I).
(3) The liquid crystalline compound as recited in paragraph 1 wherein Z is a group represented by the partial structural formula (II).
(4) The liquid crystalline compound as recited in paragraph 1 wherein Z is a group represented by the partial structural formula (V).
(5) The liquid crystalline compound as recited in paragraph 1 wherein Z is a group represented by the partial structural formula (VI).
(6) A liquid crystal composition comprising two or more components at least one of which is a liquid crystalline compound recited in any of paragraphs 1 to 5 above.
(7) A liquid crystal composition comprising, as a first component, at least one liquid crystalline compound recited in any one of paragraphs 1 to 5 above, and, as a second component, at least one compound selected from the group consisting of the compounds expressed by any one of the formulas (2), (3) and (4):

(2)

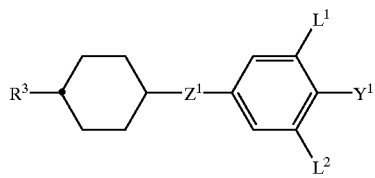

(3)

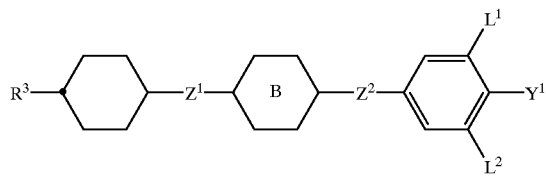

(4)

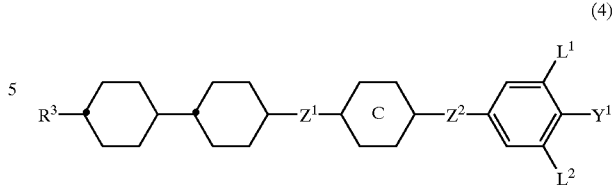

wherein $R^3$ represents an alkyl group having 1 to 10 carbon atoms in which alkyl group one or not adjacent two or more methylene groups may be replaced by an oxygen atom or —CH=CH—, and any hydrogen atom thereof may be replaced by a fluorine atom; $Y^1$ represents a fluorine atom, a chlorine atom, $OCF_3$, $OCF_2H$, $CF_3$, $CF_2H$, $CFH_2$, $OCF_2CF_2H$ or $OCF_2CFHCF_3$; $L^1$ and $L^2$ each independently represent a hydrogen atom or a fluorine atom; $Z^1$ and $Z^2$ each independently represent a 1,2-ethylene group, a 1,4-butylene group, —COO—, —$CF_2O$—, —$OCF_2$—, —CH=CH— or a single bond; ring B represents trans-1,4-cyclohexylene, 1,3-dioxane-2,5-diyl or 1,4-phenylene in which any hydrogen atom on the ring may be replaced by a fluorine atom; and ring C represents trans-1,4-cyclohexylene, or 1,4-phenylene in which any hydrogen atom on the ring may be replaced by a fluorine atom.

(8) A liquid crystal composition comprising, as a first component, at least one liquid crystalline compound recited in any one of paragraphs 1 to 5 above, and, as a second component, at least one compound selected from the group consisting of compounds expressed by the formulas (5) and (6):

(5)

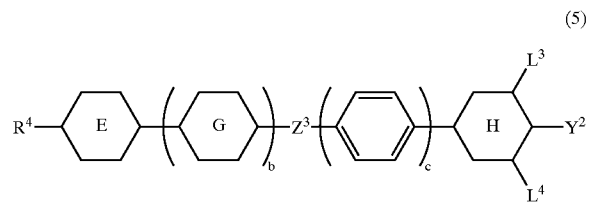

(6)

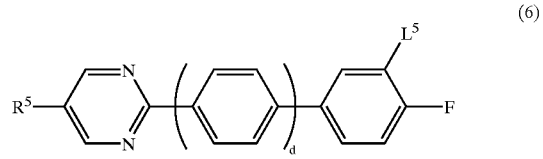

wherein $R^4$ and $R^5$ each independently represent an alkyl group having 1 to 10 carbon atoms in which alkyl group one or not adjacent two or more methylene groups may be replaced by an oxygen atom or —CH=CH—, and any hydrogen atom thereof may be replaced by a fluorine atom; $Y^2$ represents a —CN group or —C≡C—CN; ring E represents trans-1,4-cyclohexylene, 1,4-phenylene, 1,3-dioxane-2,5-diyl or pyrimidine-2,5-diyl; ring G represents trans-1,4-cyclohexylene, 1,4-phenylene 4-phenylene in which any hydrogen atom on the ring may be replaced by a fluorine atom or pyrimidine-2,5-diyl; ring H represents trans-1,4-cyclohexylene or 1,4-phenylene; $Z^3$ represents a 1,2-ethylene group, —COO— or a single bond; $L^3$, $L^4$ and $L^5$ each independently represent a hydrogen atom or a fluorine atom; and b, c and d each independently represent 0 or 1.

(9) A liquid crystal composition comprising, as a first component, at least one liquid crystalline compound recited in any one of paragraphs 1 to 5 above, and as a second component, at least one compound selected from the group consisting of the compounds expressed by any one of the formulas (7), (8) and (9):

(7)

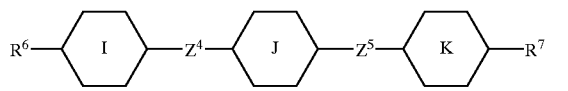
(8)

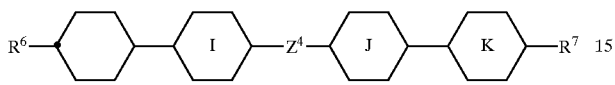
(9)

wherein $R^6$ and $R^7$ each independently represent an alkyl group having 1 to 10 carbon atoms in which alkyl group one or not adjacent two or more methylene groups may be replaced by an oxygen atom or —CH═CH—, and any hydrogen atom thereof may be replaced by a fluorine atom; rings I, J and K each independently represent trans-1,4-cyclohexylene, pyrimidine-2,5-diyl or 1,4-phenylene in which any hydrogen atom on the ring may be replaced by a fluorine atom; and $Z^4$ and $Z^5$ each independently represent —C≡C—, —COO—, —CH$_2$CH$_2$—, —CH═CH— or a single bond.

(10) A liquid crystal composition comprising, as a first component, at least one liquid crystalline compound recited in any one of paragraphs 1 to 5 above, as a second component, at least one compound selected from the group consisting of the compounds expressed by any one of the formulas (2), (3) and (4) described above, and, as a third component, at least one compound selected from the group consisting of the compounds expressed by any one of the formulas (7), (8) and (9) described above.

(11) A liquid crystal composition comprising, as a first component, at least one liquid crystalline compound recited in any one of paragraphs 1 to 5 above, as a second component, at least one compound selected from the group consisting of the compounds expressed by any one of the formulas (10), (11) and (12):

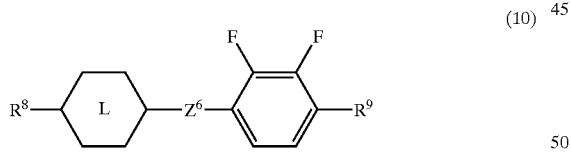
(10)

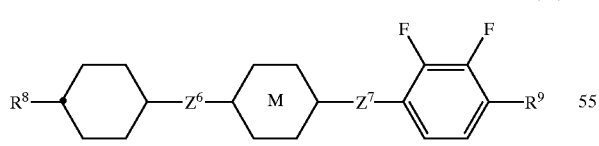
(11)

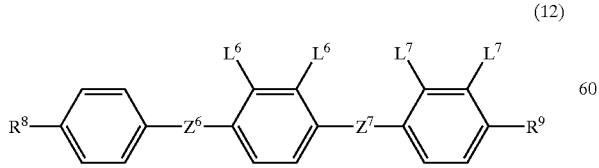
(12)

wherein $R^8$ and $R^9$ each independently represent an alkyl group having 1 to 10 carbon atoms in which alkyl group one or not adjacent two or more methylene groups may be replaced by an oxygen atom or —CH═CH—, and any hydrogen atom thereof may be replaced by a fluorine atom; rings L and M each independently represent trans-1,4-cyclohexylene or 1,4-phenylene; $L^6$ and $L^7$ each independently represent a hydrogen atom or a fluorine atom but never be hydrogen atoms at the same time; and $Z^6$ and $Z^7$ each independently represent —CH$_2$CH$_2$—, —CH$_2$O— or a single bond.

(12) A liquid crystal composition comprising, as a first component, at least one liquid crystalline compound recited in any one of paragraphs 1 to 5 above, as a second component, at least one compound selected from the group consisting of the compounds expressed by any one of the formulas (7), (8) and (9) described above, and, as a third component, at least one compound selected from the group consisting of the compounds expressed by any one of the formulas (10), (11) and (12) described above.

(13) A liquid crystal composition comprising, as a first component, at least one liquid crystalline compound recited in any one of paragraphs 1 to 5 above, as a second component, at least one compound selected from the group consisting of compounds expressed by the formulas (5) and (6) described above, and, as a third component, at least one compound selected from the group consisting of the compounds expressed by any one of the formulas (7), (8) and (9) described above.

(14) A liquid crystal composition comprising, as a first component, at least one liquid crystalline compound recited in any one of paragraphs 1 to 5 above, as a second component, at least one compound selected from the group consisting of the compounds expressed by any one of the formulas (2), (3) and (4) described above, as a third component, at least one compound selected from the group consisting of compounds expressed by the formulas (5) and (6) described above, and, as a fourth component, at least one compound selected from the group consisting of the compounds expressed by any one of the formulas (7), (8) and (9) described above.

(15) A liquid crystal composition recited in any one of paragraphs 6 to 14 wherein the liquid crystal composition further comprises an optically active compound.

(16) A liquid crystal display device comprising the liquid crystal composition as recited in any one of paragraphs 6 to 15.

BEST MODE FOR CARRYING OUT THE INVENTION

As described above, the liquid crystalline compound of the present invention is expressed by the general formula (1), and any compounds thereof have such excellent characteristics that they have a negative and absolutely large Δε value, being excellent in a compatibility with other liquid crystalline compounds, especially at a low temperature, having a low viscosity, and being stable chemically and physically.

Among them, the compounds expressed by one of the following formulas (1-1) to (1-87) can be mentioned as preferable examples thereof.

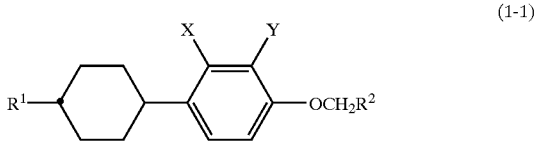
(1-1)

(1-2) 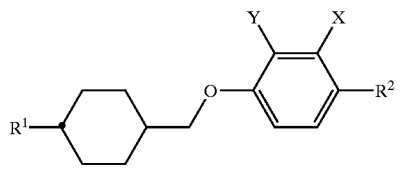
(1-3) 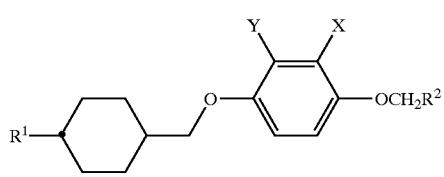
(1-4) 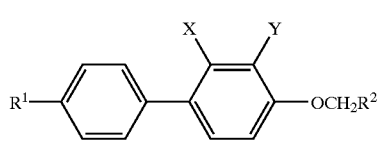
(1-5) 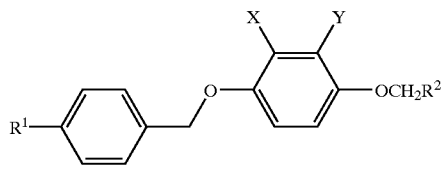
(1-6) 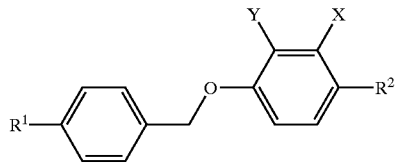
(1-7) 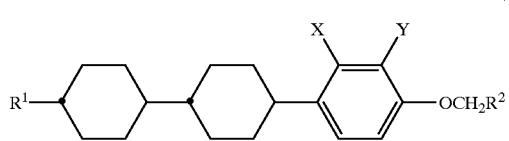
(1-8) 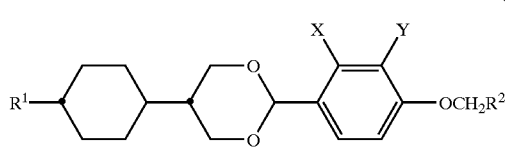
(1-9) 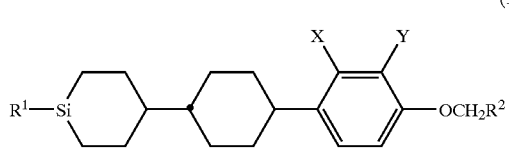
(1-10) 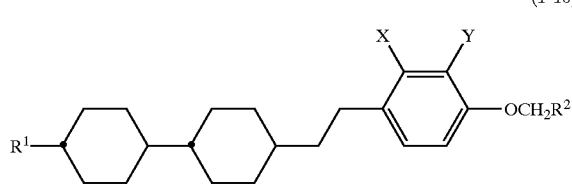
(1-11) 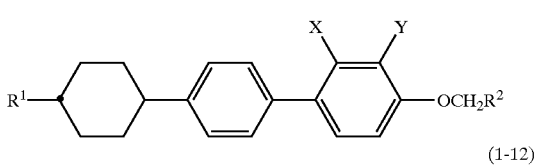
(1-12) 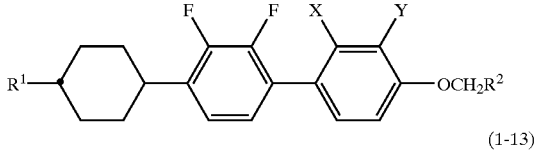
(1-13) 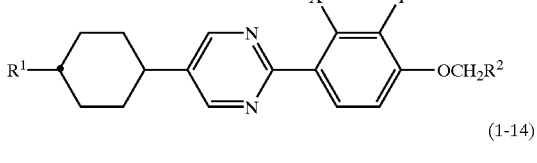
(1-14) 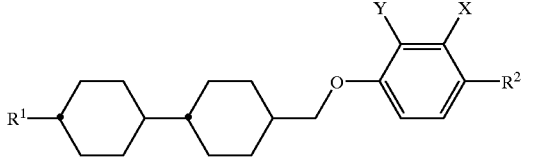
(1-15) 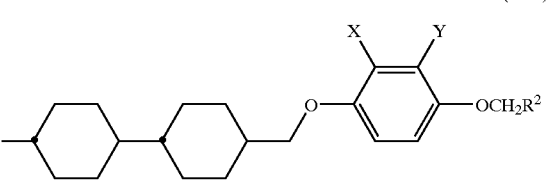
(1-16) 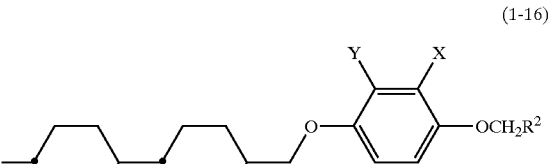
(1-17) 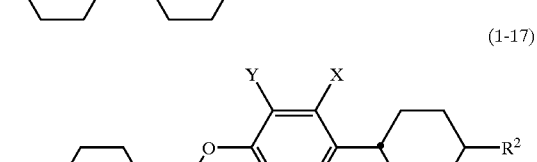
(1-18) 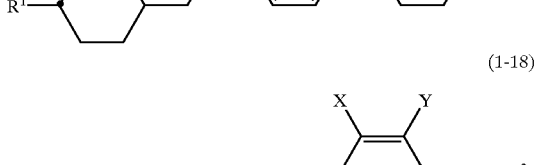
(1-19) 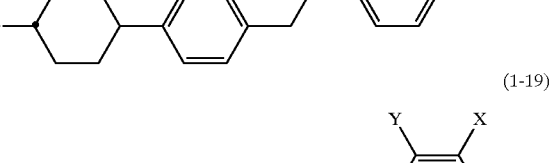
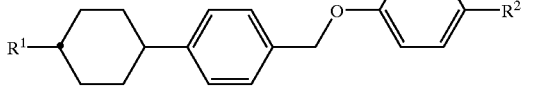

(1-20) 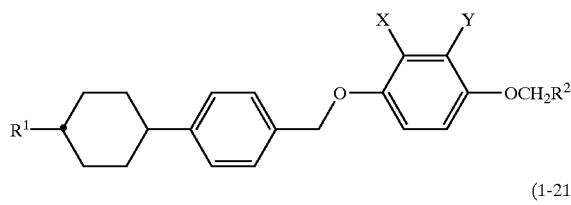
(1-21) 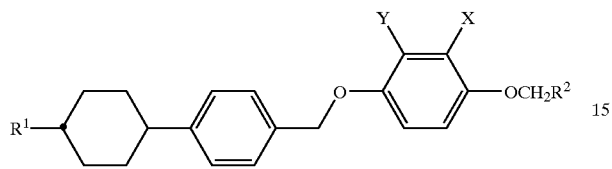
(1-22) 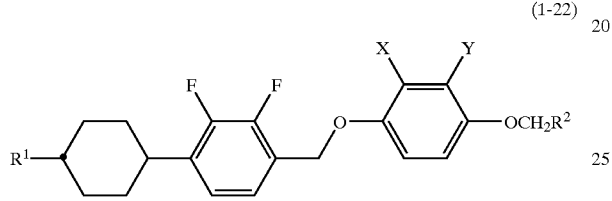
(1-23) 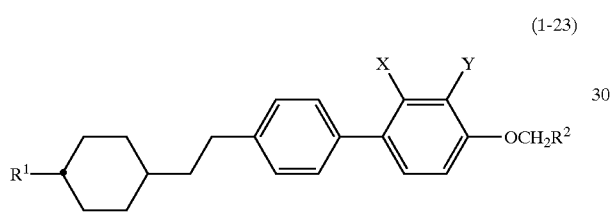
(1-24) 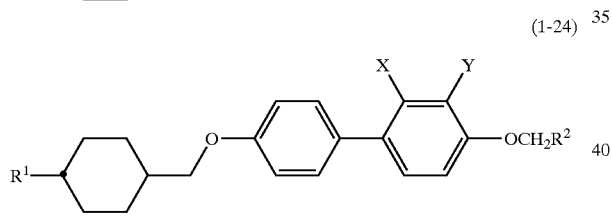
(1-25) 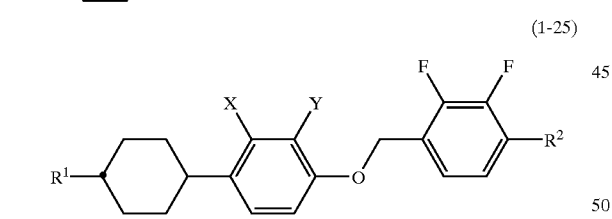
(1-26) 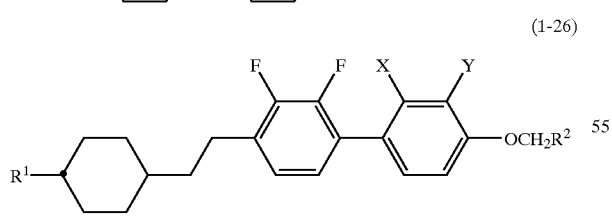
(1-27) 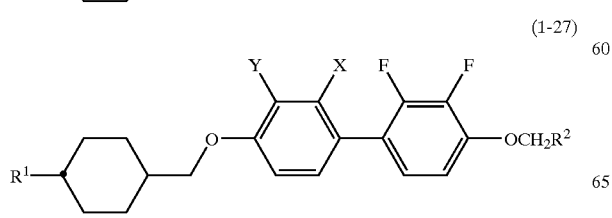
(1-28) 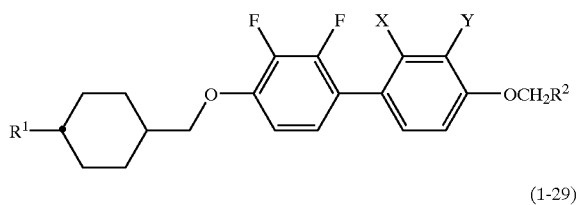
(1-29) 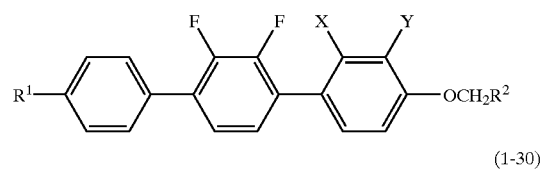
(1-30) 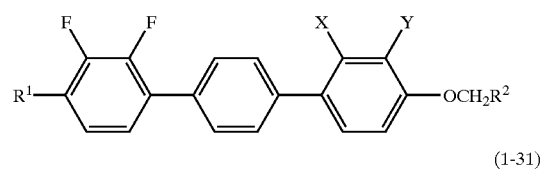
(1-31) 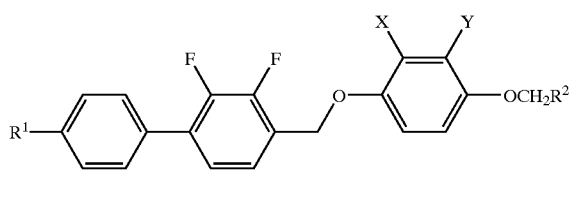
(1-32) 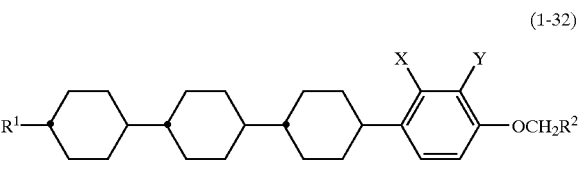
(1-33) 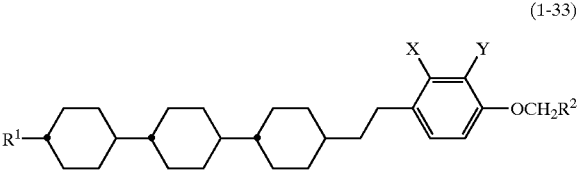
(1-34) 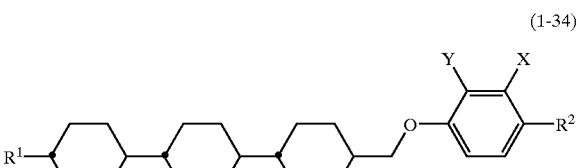
(1-35) 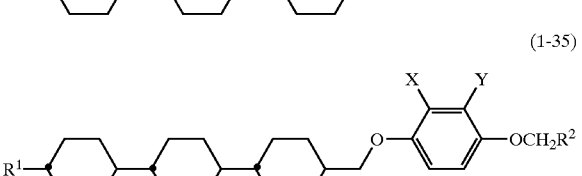
(1-36) 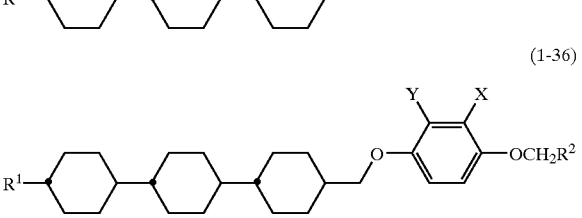

(1-37) 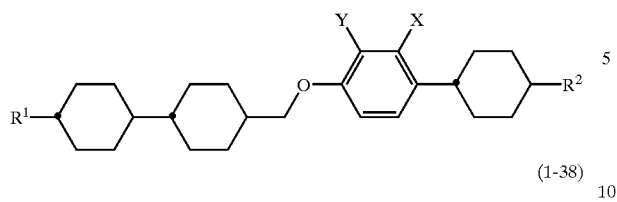
(1-38) 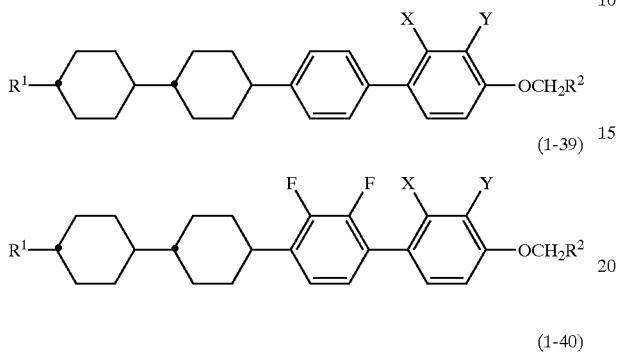
(1-39)
(1-40) 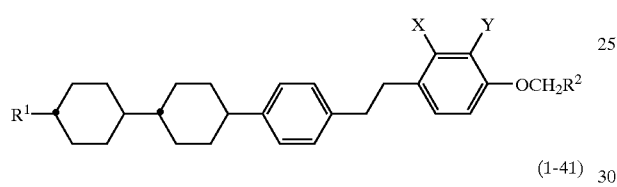
(1-41) 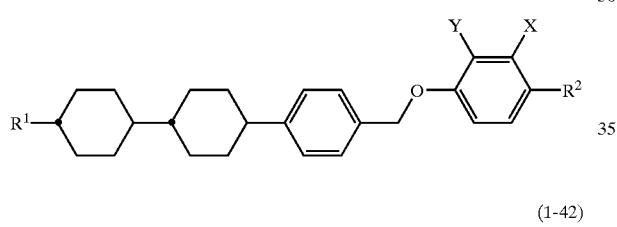
(1-42) 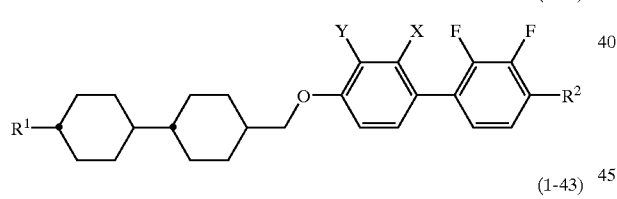
(1-43) 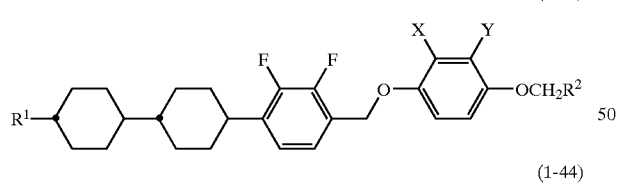
(1-44) 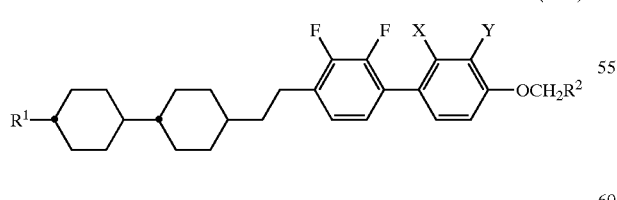
(1-45) 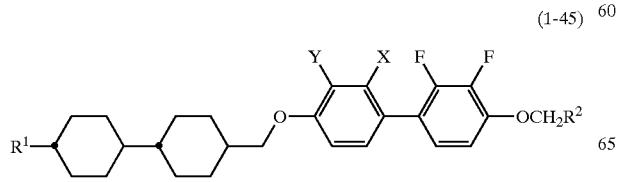
(1-46) 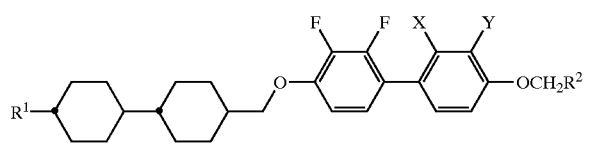
(1-47) 
(1-48) 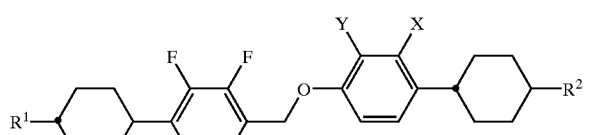
(1-49) 
(1-50) 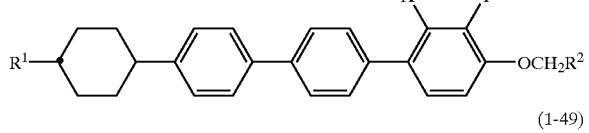
(1-51) 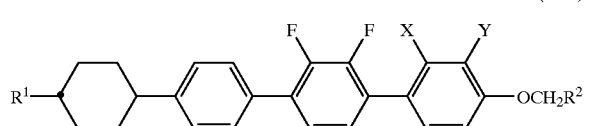
(1-52) 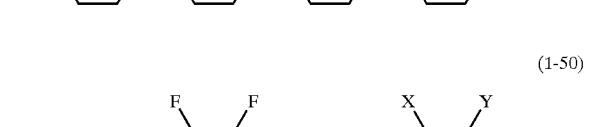
(1-53) 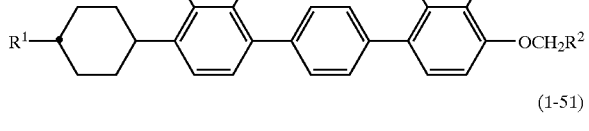
(1-54) 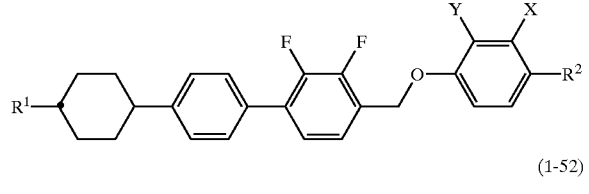

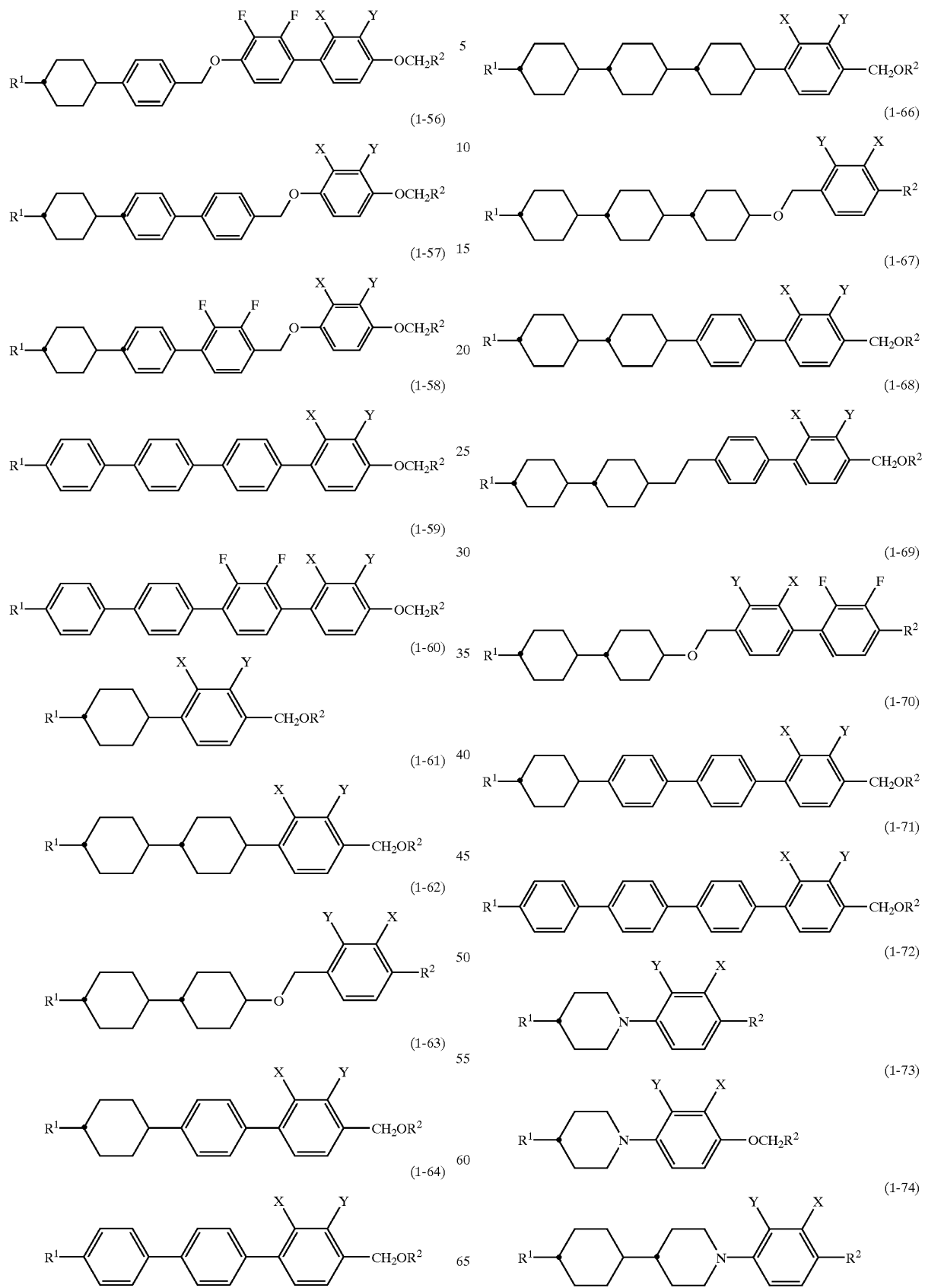

-continued (1-75)
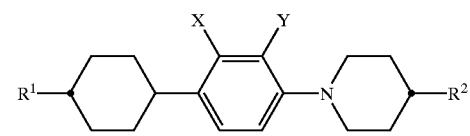

(1-77)
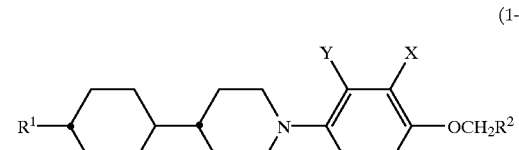

(1-78)
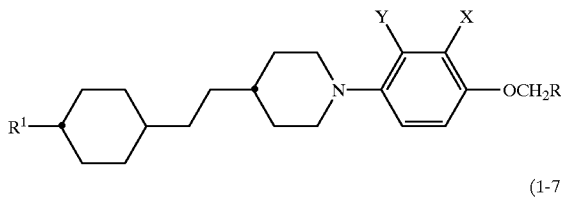

(1-79)
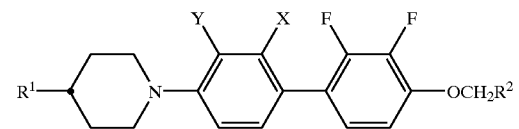

(1-80)
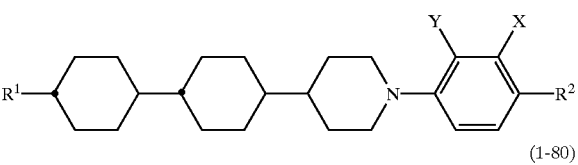

(1-81)
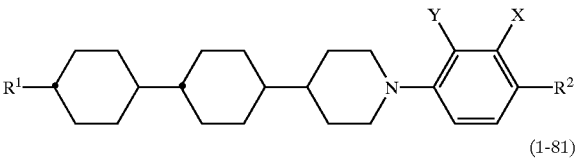

(1-82)
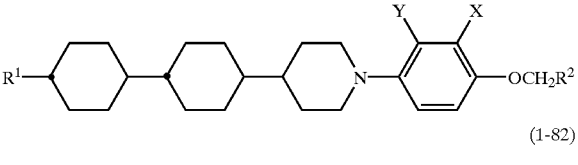

(1-83)
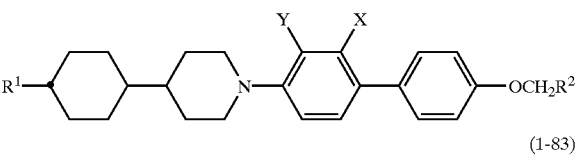

(1-84)
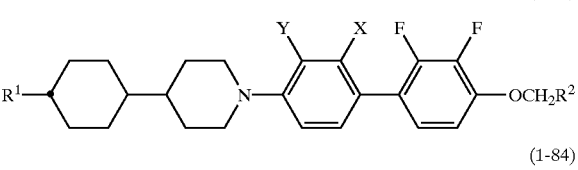

(1-85)
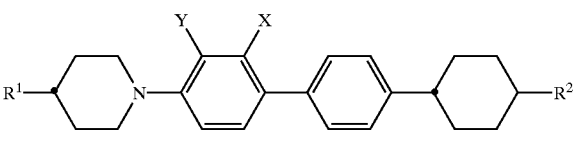

-continued (1-85)
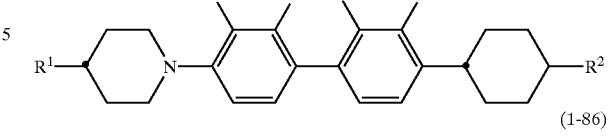

(1-86)
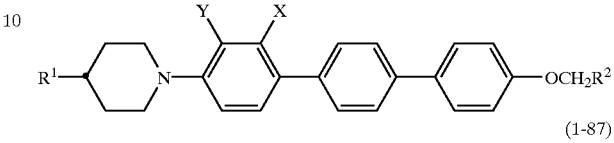

(1-87)
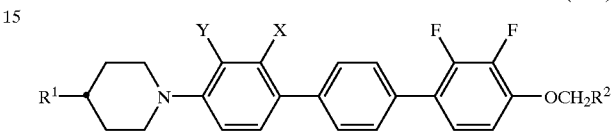

wherein X, Y, $R^1$ and $R^2$ have same meaning as described above.

The characteristics of the preferable compound of the present invention described above can be studied in light of Z in the general formula (1).

That is, the compounds expressed by the formulas (1-1) to (1-59) are compounds of a kind in which Z is represented by the partial structural formula (I) or (II). These compounds have a negative and in particular absolutely large Δ∈ value, and therefore should these compounds be added to a liquid crystal composition for a cell as one of the components, the cell can achieve both reduction of threshold voltage and increase of response speed.

The compounds expressed by the formulas (1-60) to (1-71) are compounds of a kind in which Z is represented by the partial structural formula (III) or (IV). These compounds have a negative and relatively large absolute Δ∈ value and a low viscosity, and therefore should these compounds be added to a liquid crystal composition for a cell as one of the components, the cell can achieve increase of response speed.

The compounds expressed by the formulas (1-72) to (1-87) are compounds of a kind in which Z is represented by the partial structural formula (V) or (VI). These compounds have a negative and absolutely large Δ∈ value and a large optical anisotropy value (Δn), and therefore should these compounds be added to a liquid crystal composition for a cell as one of the components, the cell can not only reduce threshold voltage of the cell but also can control the Δn.

Further, these compounds exhibit a wide temperature range of liquid crystal phase and therefore are useful for the purpose of widening temperature range of a liquid crystal composition for the cell.

In the liquid crystalline compound of the present invention expressed by the general formula (1), $A^1$, $A^2$, $A^3$ and $A^4$ each independently represent, as already described, a single bond, a 1,4-cyclohexylene, 1,4-phenylene which may be substituted with a fluorine atom(s), dioxane-2,5-diyl, pyrimidine-2,5-diyl, piperidine-1,4-diyl, piperidine-2,5-diyl which may be substituted with a fluorine atom(s) or 1-sila-1,4-cyclohexylene ring. While the single bond may preferably be selected in the numeral range of 1 to 4, this leads that ring groups out of $A^1$, $A^2$, $A^3$ and $A^4$ are in the numeral range of zero to three.

$B^1$, $B^2$, $B^3$ and $B^4$ each independently represent, as already described, a single bond, 1,2-ethylene, 1,2-ethenylene, 1,2-ethynylene, oxymethylene, methyleneoxy, carbonyloxy, oxycarbonyl or 1,4-butylene group, provided that when Z is a group represented by the partial structural formula (III), then $B^4$ is preferably neither oxymethylene nor oxycarbonyl group, and that when Z is a group represented by the partial structural formula (IV), then $B^3$ is preferably neither methyleneoxy nor carbonyloxy group.

$R^1$ and $R^2$ each represent those, which have already been described, and as their preferred examples, followings can be mentioned.

Alkyl group such asmethyl, ethyl, propyl, butyl, pentyl, hexyl or heptyl; alkoxy group such as methoxy, ethoxy, propoxy, butoxy, pentyloxy or heptoxy; alkoxyalkyl group such as methoxymethyl; alkenyl group such as vinyl, allyl, 1-propenyl, 3-butenyl, 4-pentenyl, trans-3-pentenyl or 5-hexenyl; fluoroalkyl group substituted with at least one fluorine atom such as difluoromethyl, trifluoromethyl, pentafluoroethyl or heptafluoromethyl; fluoroalkoxy group substituted with at least one fluorine atom such as difluoromethoxy, trifluoromethoxy, 2,2,2-trifluoroethoxy, 2,2,3,3,3-pentafluoropropoxy or 1,1,2,3,3,3-hexafluoropropoxy; fluoroalkenyloxy group substituted with at least one fluorine atom such as 3,3-difluoro-2-propenyloxy or 1,1-difluoro-2-propenyloxy; or alkylthio group such as ethylthio or butylthio.

Whereas a large part of the liquid crystalline compounds of the present invention expressed by the general formula (1) exhibit a liquid crystal phase, there are some that exhibit no liquid crystal phase. However, even such liquid crystalline compounds as exhibiting no liquid crystal phase, these are useful as components for a liquid crystal composition, since the compounds have a good compatibility with other liquid crystalline compounds, as is the case with those exhibiting a liquid crystal phase, and further, the compounds do not markedly reduce or retrench the nematic phase temperature range thereof when they are mixed with other liquid crystalline compounds.

The liquid crystal composition of the present invention comprises, as a first component, at least one liquid crystalline compound expressed by the general formula (1).

Its content is preferably to be in the range of 0.1 to 99.9% by weight based on the weight of the liquid crystal composition for developing excellent characteristics.

While the liquid crystal composition of the present invention may comprise only the first component described above, the compositions in which at least one compound selected from the group consisting of the compounds expressed by any one of the formulas (2), (3) and (4) (hereinafter referred to as second component A), at least one compound selected from the group consisting of compounds expressed by the formulas (5) and (6) (hereinafter referred to as a second component B), at least one compound selected from the group consisting of the compounds expressed by any one of the formulas (7), (8) and (9) described above (hereinafter referred to as a third component A) or at least one compound selected from the group consisting of the compounds expressed by any one of the formulas (10), (11) and (12) (hereinafter referred to as a third component B) are preferably mixed alone or in combination thereof. Besides, an optically active compound as another component, and a known compounds may be mixed for the purpose of adjusting the threshold voltage, the temperature range of liquid crystal phase, $\Delta n$, $\Delta \in$ or viscosity.

Among the second component A described above, the compounds expressed by one of the following formulas (2-1) to (2-9) can be mentioned as suitable examples of the ones included in the formula (2), the compounds expressed by one of the following formulas (3-1) to (3-69) can be mentioned as suitable examples of the ones included in the formula (3), and the compounds expressed by one of the following formulas (4-1) to (4-24) can be mentioned as suitable examples of the ones included in the formula (4), respectively.

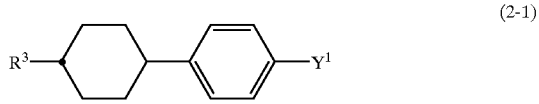

(2-1)

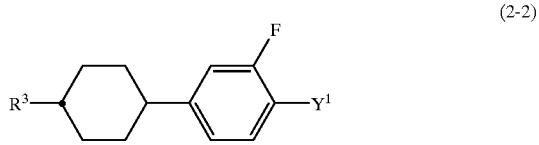

(2-2)

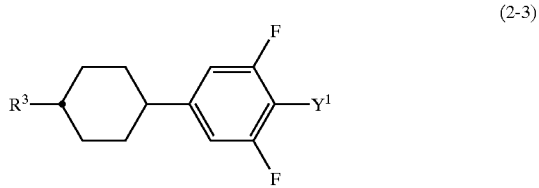

(2-3)

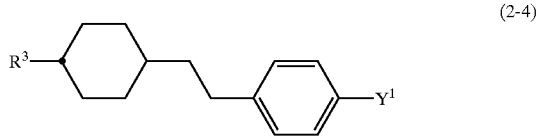

(2-4)

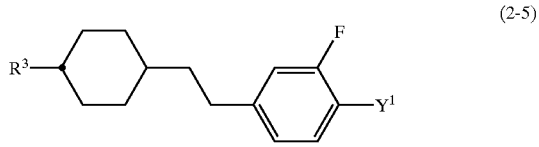

(2-5)

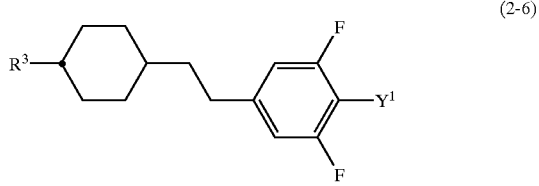

(2-6)

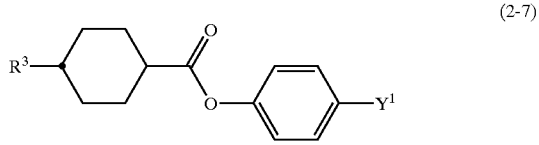

(2-7)

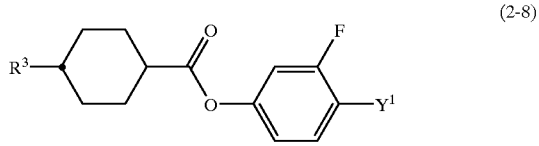

(2-8)

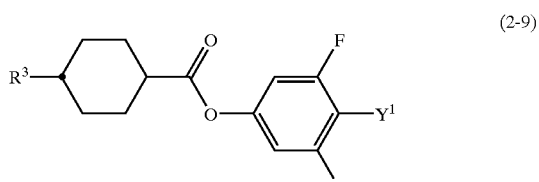

(2-9)

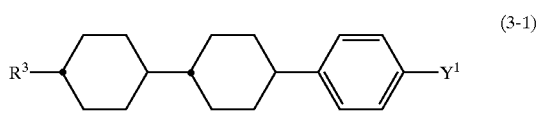

(3-1)

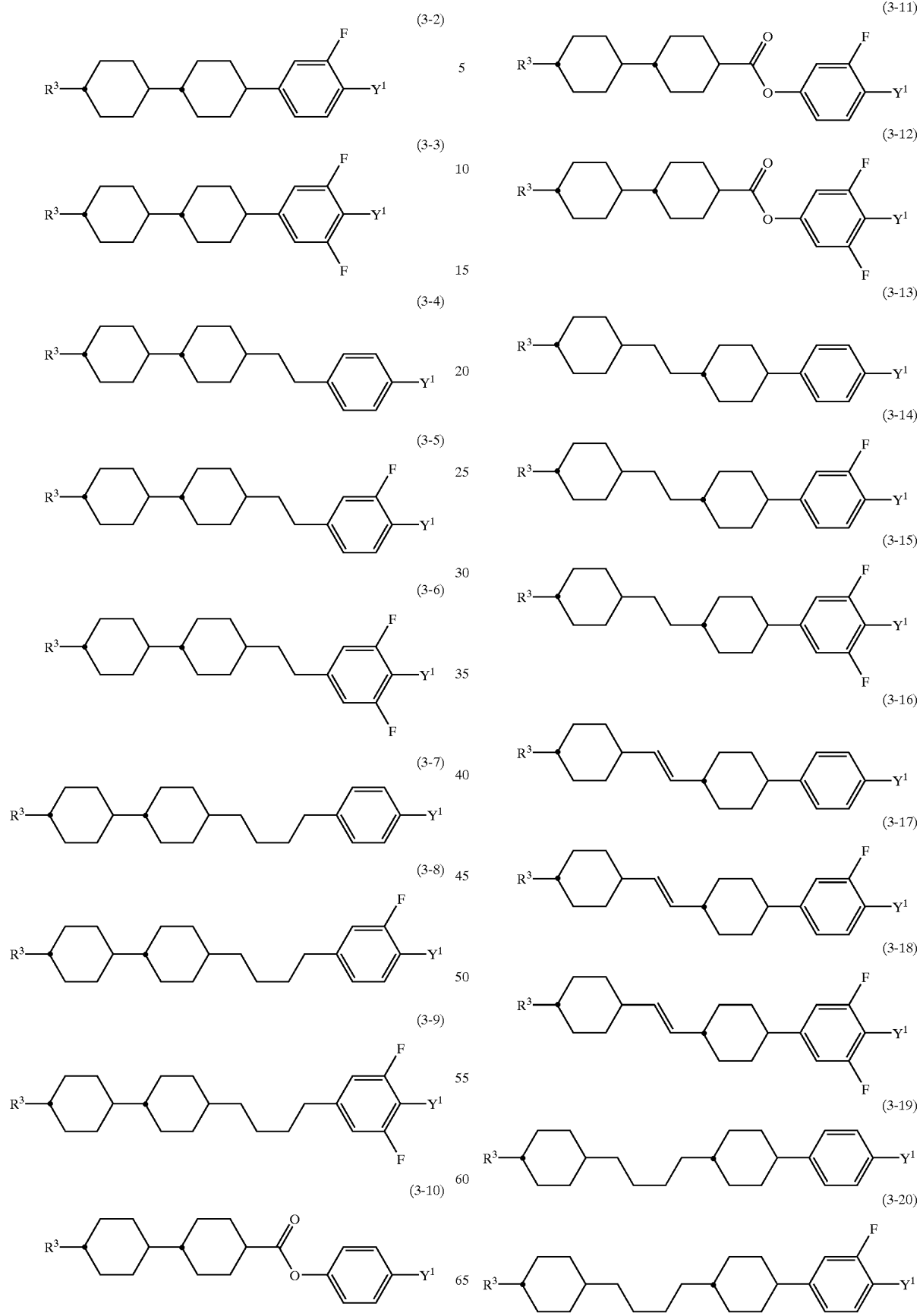

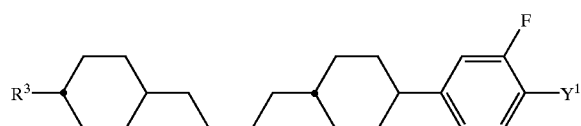
(3-21)
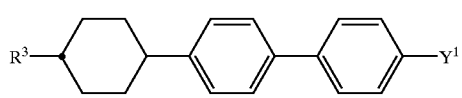
(3-22)
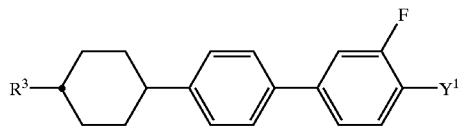
(3-23)
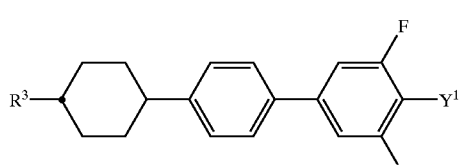
(3-24)
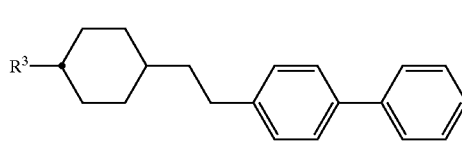
(3-25)
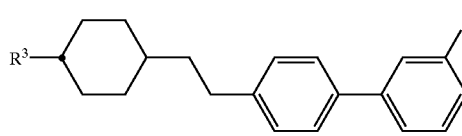
(3-26)
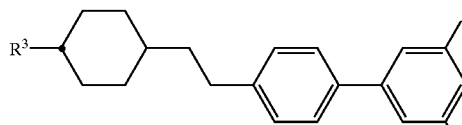
(3-27)
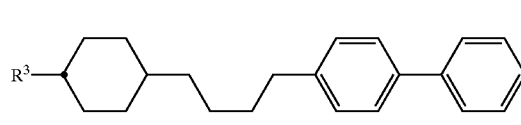
(3-28)
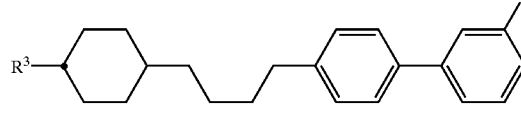
(3-29)
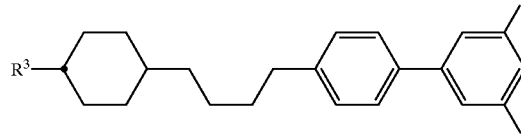
(3-30)
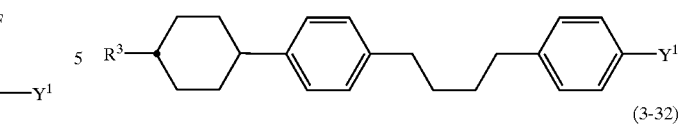
(3-31)
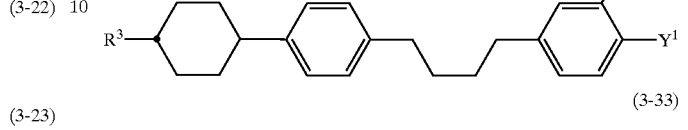
(3-32)
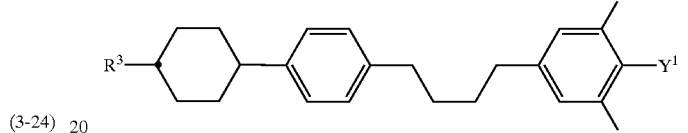
(3-33)
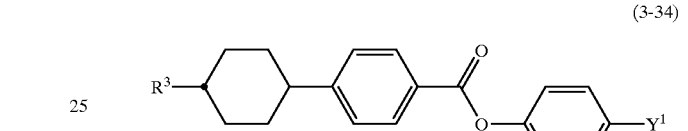
(3-34)
(3-35)
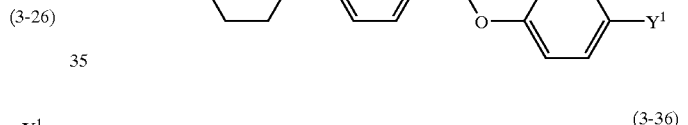
(3-36)
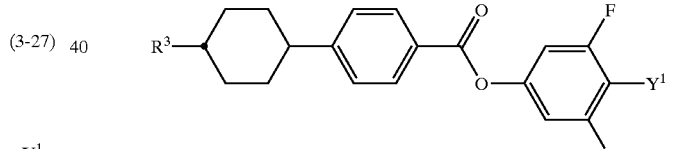
(3-37)
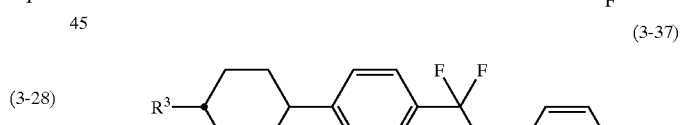
(3-38)
(3-39)

(3-40)
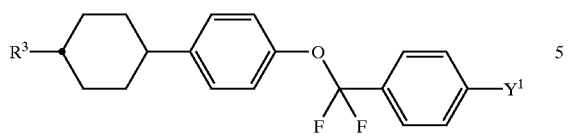
(3-41)
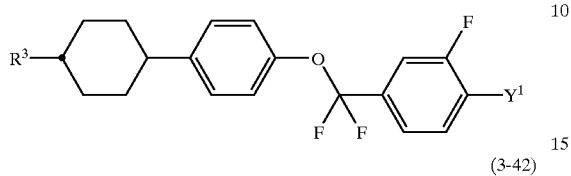
(3-42)
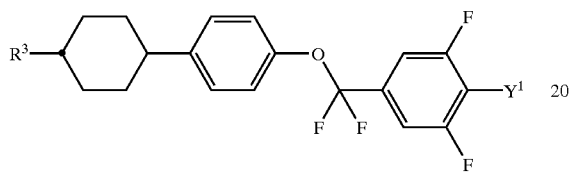
(3-43)
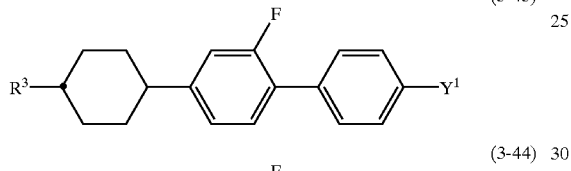
(3-44)
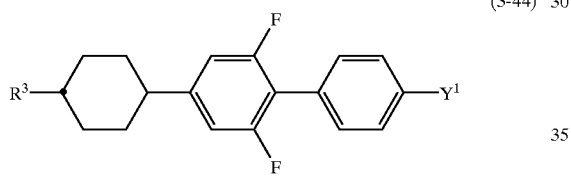
(3-45)
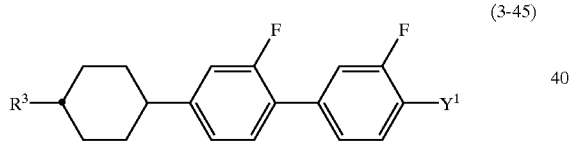
(3-46)
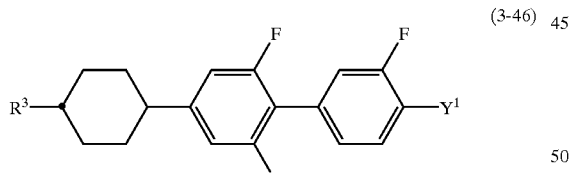
(3-47)
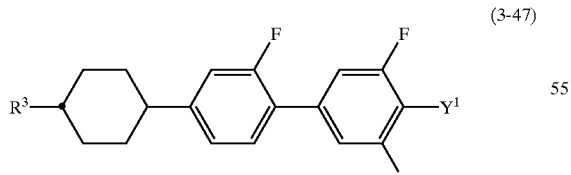
(3-48)
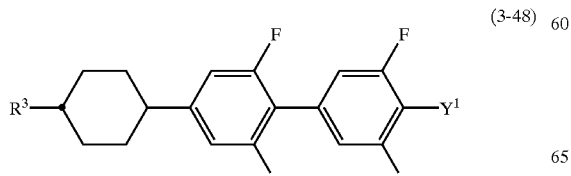
(3-49)
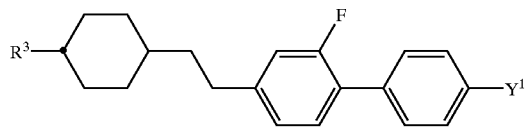
(3-50)
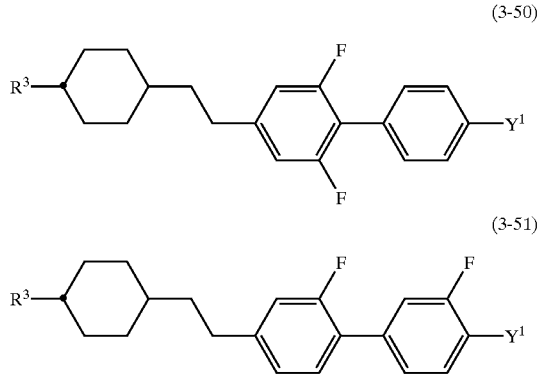
(3-51)
(3-52)
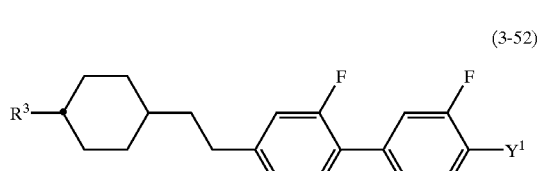
(3-53)
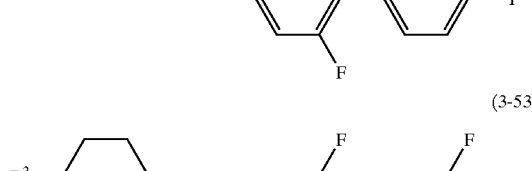
(3-54)
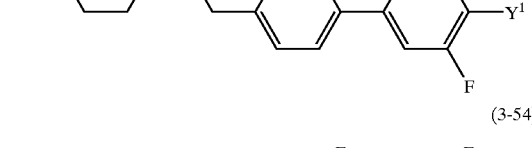
(3-55)
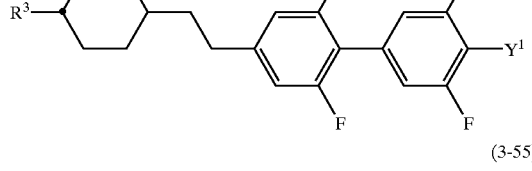
(3-56)
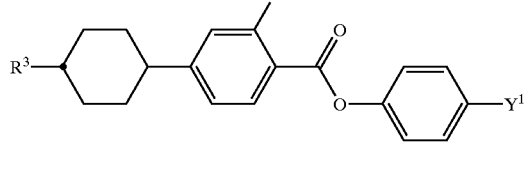
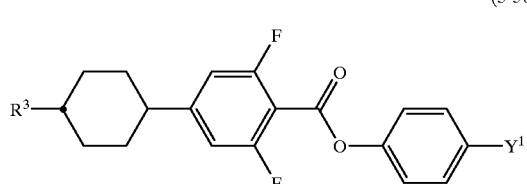

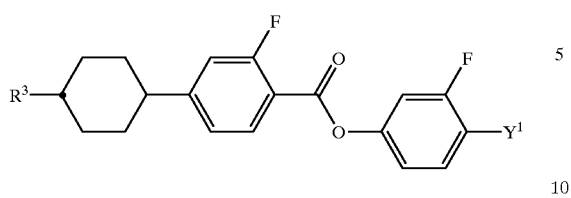
(3-57)
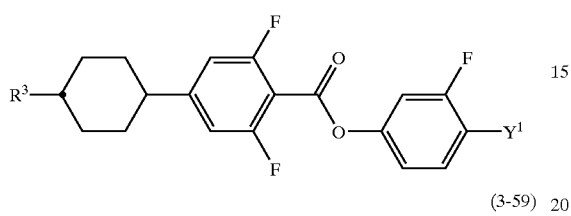
(3-58)
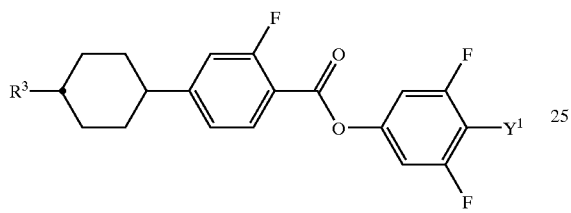
(3-59)
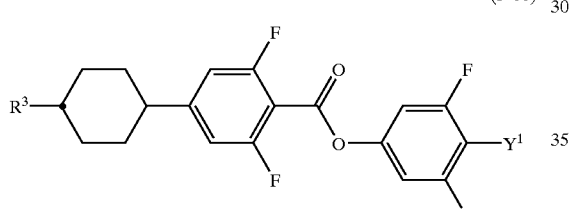
(3-60)
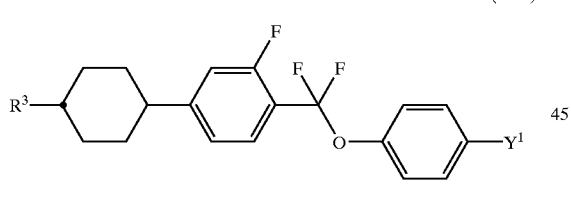
(3-61)
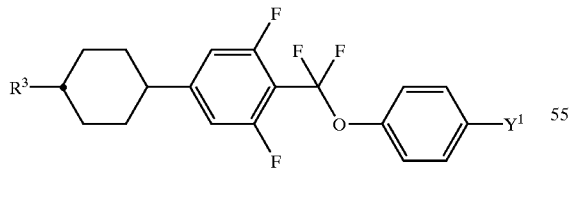
(3-62)
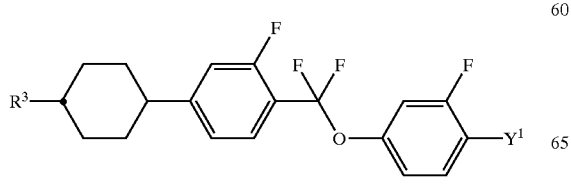
(3-63)
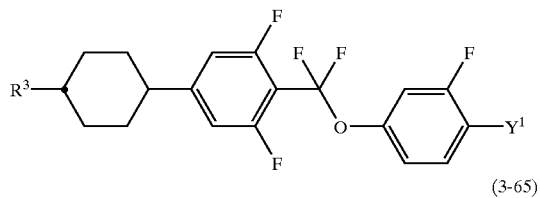
(3-64)
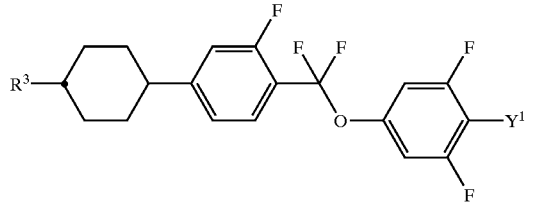
(3-65)
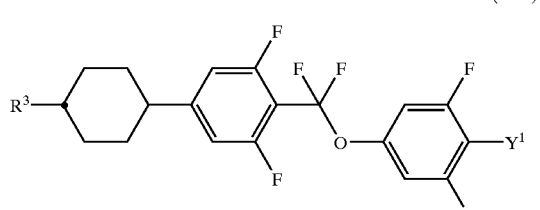
(3-66)
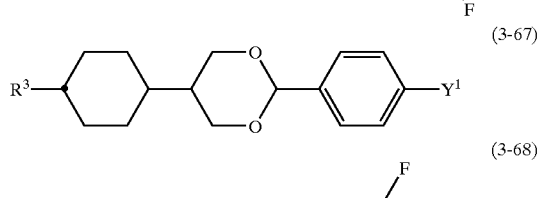
(3-67)
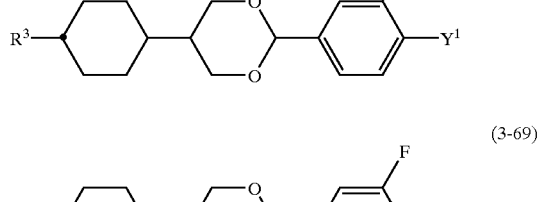
(3-68)
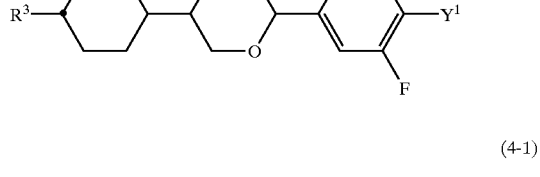
(3-69)
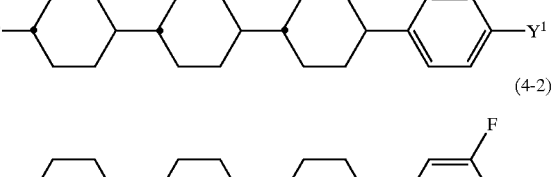
(4-1)
(4-2)
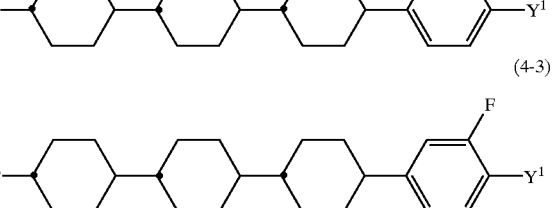
(4-3)

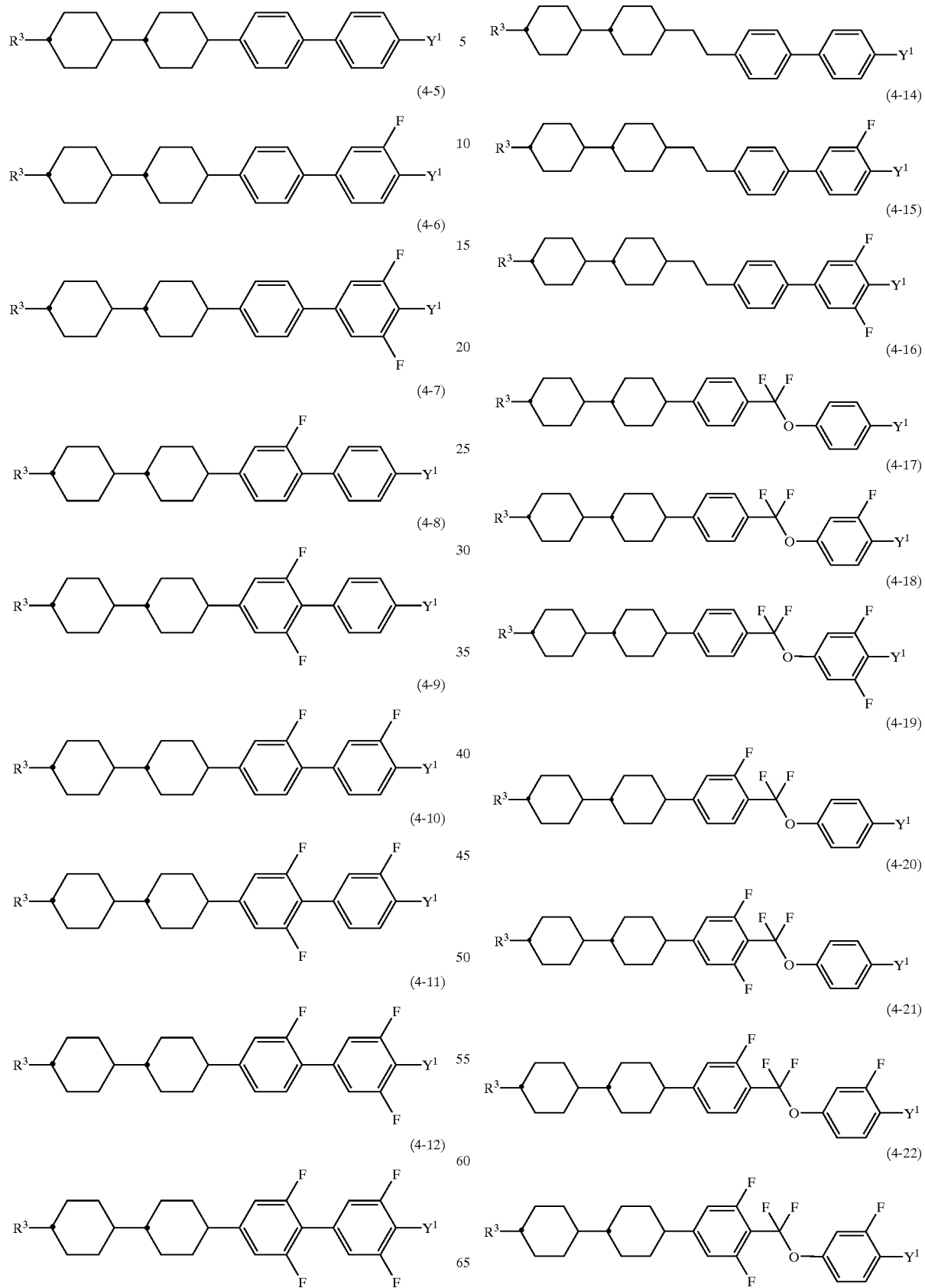

(4-23)

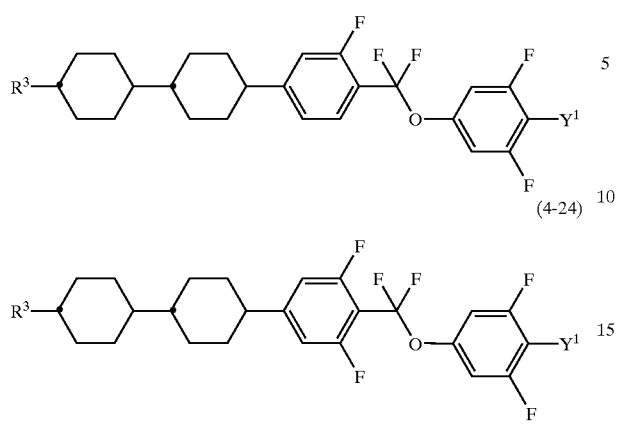

(4-24)

wherein $R^3$ and $Y^1$ have the same meaning as described above.

All of the compounds expressed by one of the formulas (2) to (4) exhibit a positive $\Delta\epsilon$ (P type compounds), are very excellent in thermal stability and chemical stability, and are indispensable when a liquid crystal composition for TFT (AM-LCD) of which a high reliability such as a high voltage-holding ratio (large specific resistance) is required are produced.

While the amount of the compound to be used is suitably in the range of 1 to 99.9% by weight based on the total amount of the liquid crystal composition when liquid crystal composition for TFT are produced, it is preferably 10 to 97% by weight and more desirably 40 to 97% by weight. In this case, liquid crystal compositions may further comprise a compound expressed by one of the formulas (7) to (9) for the purpose of adjusting viscosity.

While the compounds expressed by one of the formulas (2) to (4) described above can be used when liquid crystal compositions for STN display mode or TN display mode are produced, the amount of the compound to be used is preferably less than 50% by weight based on the total amount of liquid crystal composition since this compound is small in its effect of lowering threshold voltage of liquid crystal composition.

Next, among the second component B described above, the compounds of one of the formulas (5-1) to (5-40) can be mentioned as preferable examples of the ones included in formula (5), and the compounds of one of the formulas (6-1) to (6-3) can be mentioned as preferable examples of the ones included in formula (6), respectively.

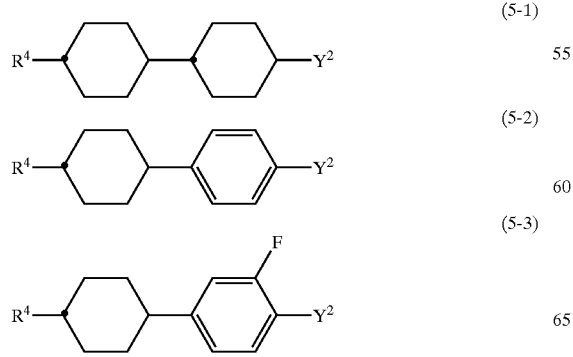

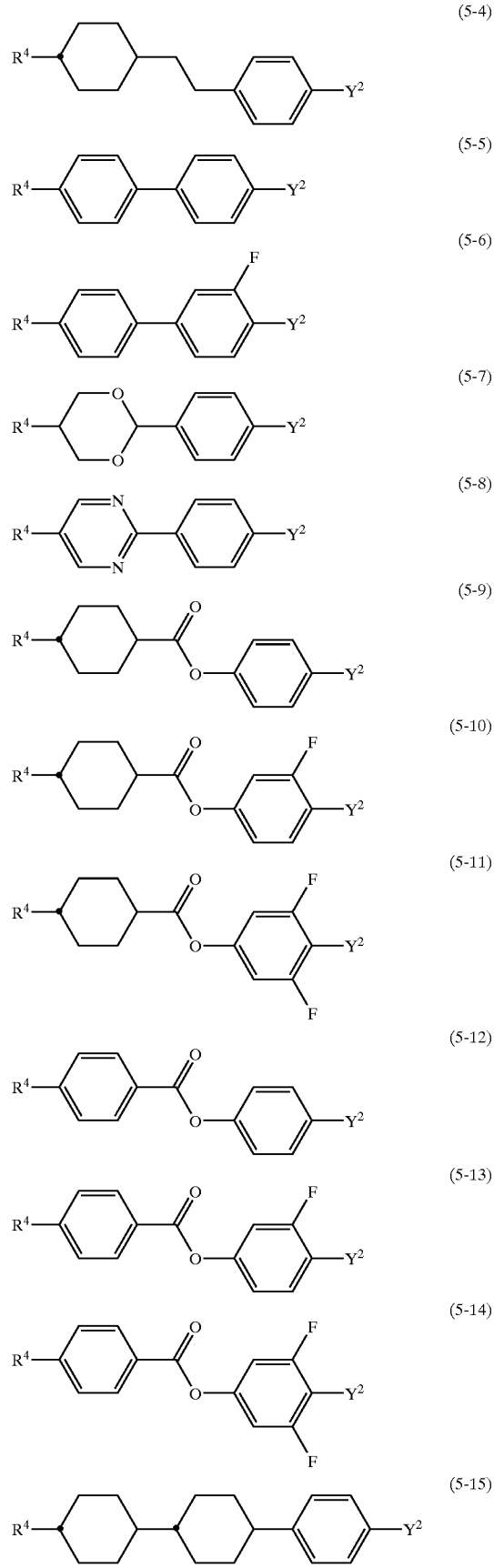

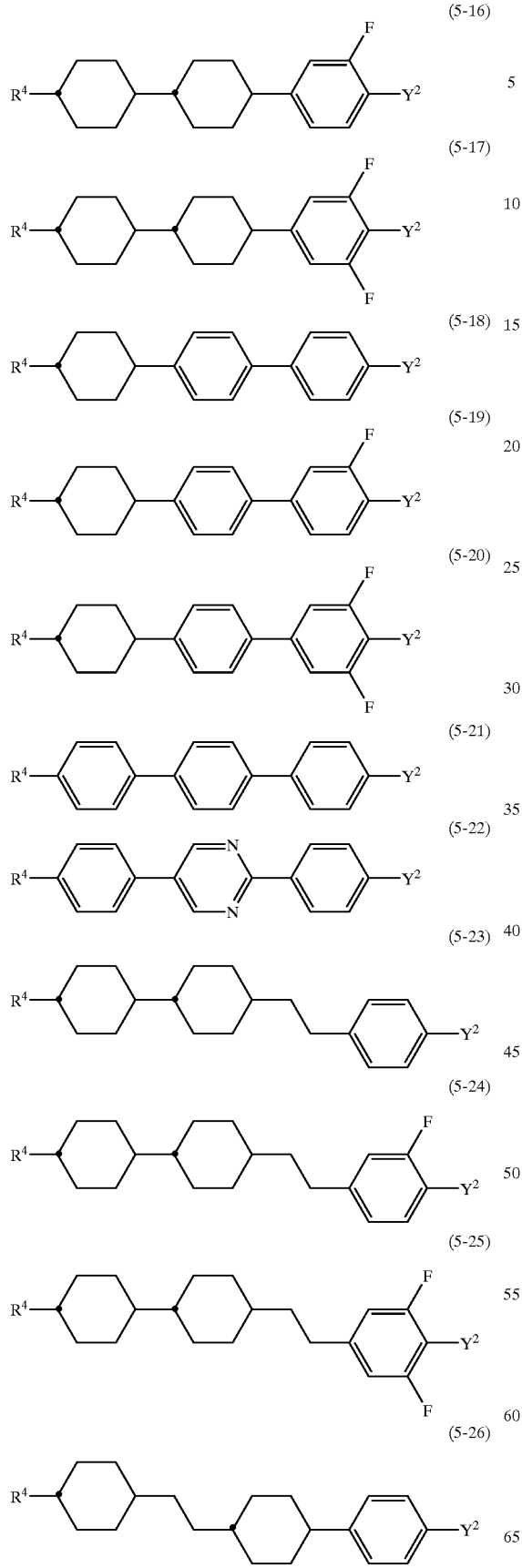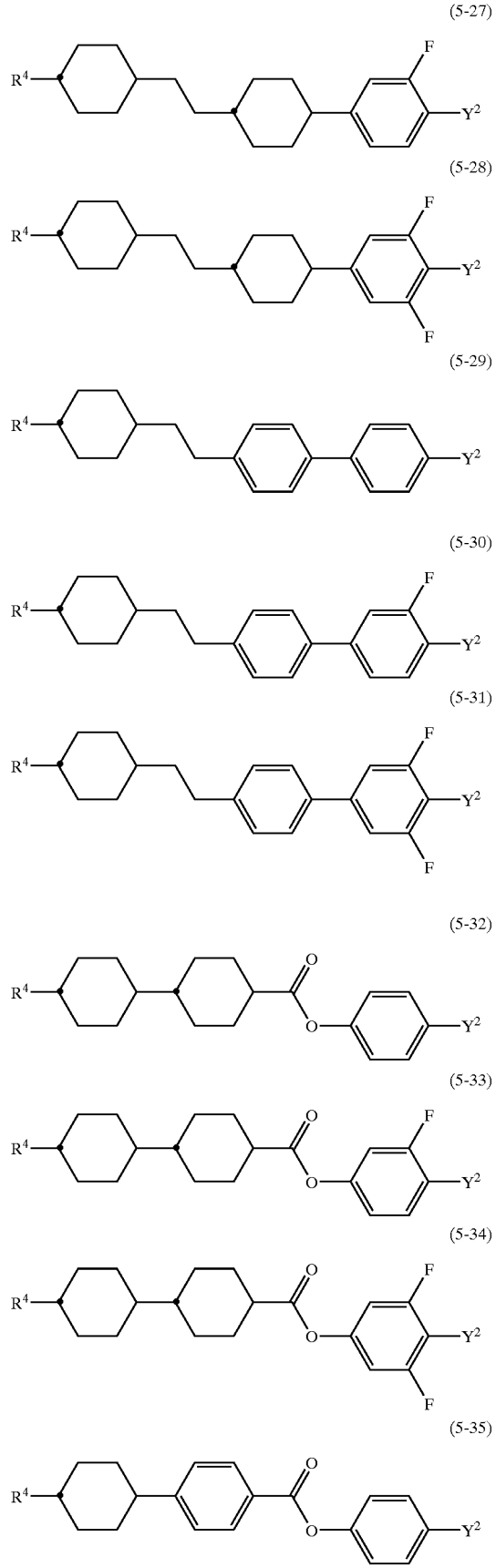

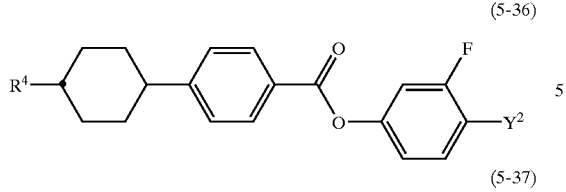 (5-36)

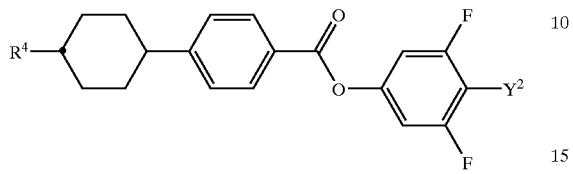 (5-37)

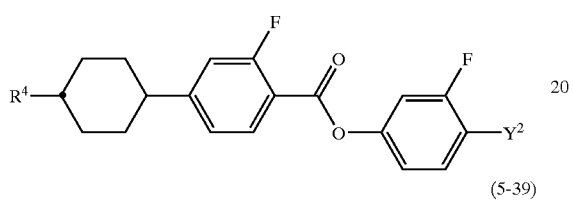 (5-38)

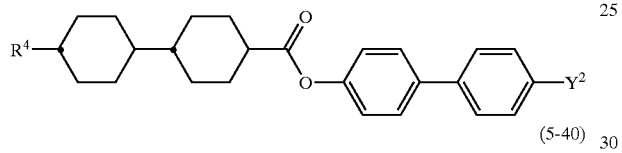 (5-39)

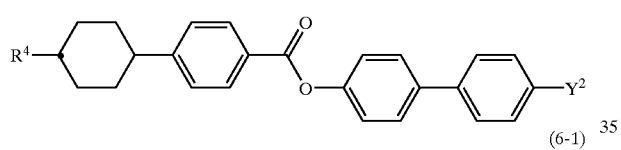 (5-40)

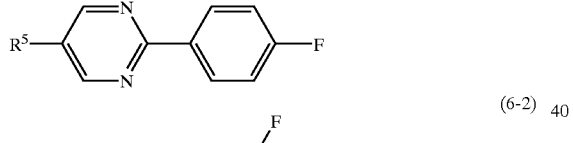 (6-1)

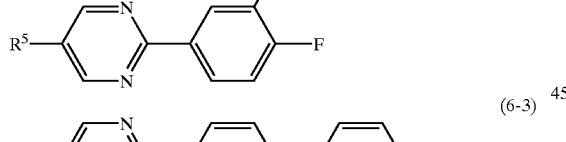 (6-2)

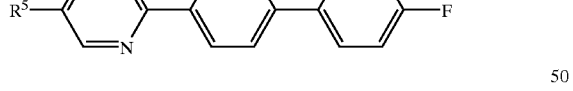 (6-3)

wherein $R^4$, $R^5$ and $Y^2$ have the same meaning as described above.

Any compounds expressed by formulas (5) or (6) have a positive and large $\Delta\varepsilon$ value, and are used particularly for the purpose of lowering threshold voltage of liquid crystal compositions.

Also, the compounds are used for the purpose of adjusting $\Delta n$ or widening temperature range of nematic phase by raising clearing point of liquid crystal compositions, and also for the purpose of improving the steepness of liquid crystal compositions for STN display mode or TN display mode, and thus are indispensable particularly when liquid crystal compositions for STN display mode or TN display mode are produced.

Whereas the compounds can lower threshold voltage of the liquid crystal compositions as their amount is increased, the use of the compounds brings about increase of the viscosity.

Accordingly, it is advantageous to use the compounds in a large amount for driving display devices at a low voltage so far as viscosity of liquid crystal compositions satisfies the required characteristics.

From such state of things, the amount of the compounds to be used is suitably in the range of 0.1 to 99.9% by weight, preferably 10 to 97% by weight, and more desirably 40 to 97% by weight based on the total amount of liquid crystal composition when liquid crystal composition for STN display mode or TN display mode are produced.

Among the third component A described above, the compounds of one of the formulas (7-1) to (7-11) can be mentioned as preferable examples of the ones included in formula (7), the compounds of one of the formulas (8-1) to (8-18) can be mentioned as preferable examples of the ones included in formula (8), and the compounds of one of the formulas (9-1) to (9-6) can be mentioned as preferable examples of the ones included in formula (9).

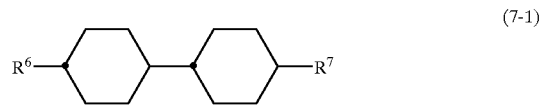 (7-1)

 (7-2)

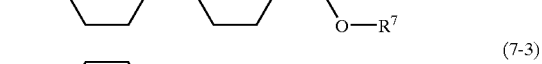 (7-3)

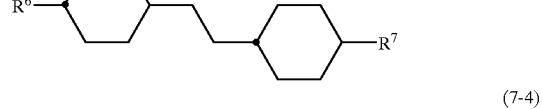 (7-4)

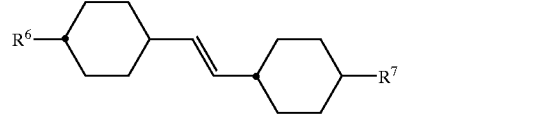 (7-5)

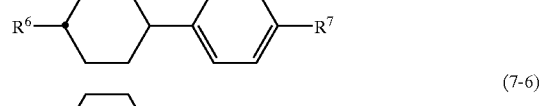 (7-6)

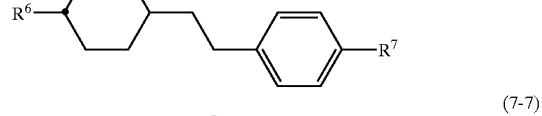 (7-7)

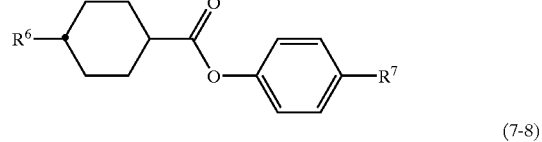 (7-8)

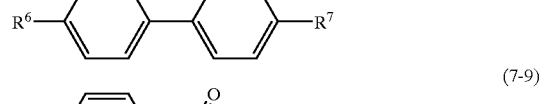 (7-9)

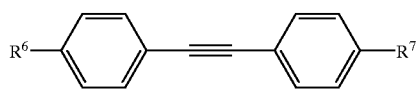
(7-10)
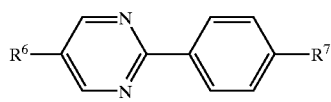
(7-11)
(8-1)
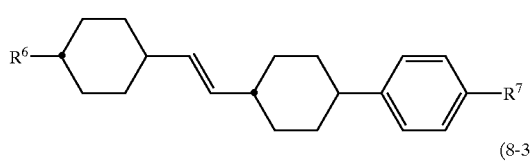
(8-2)
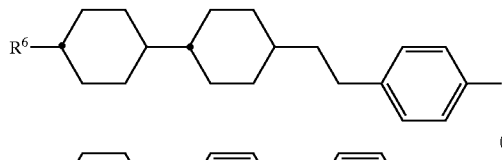
(8-3)
(8-4)
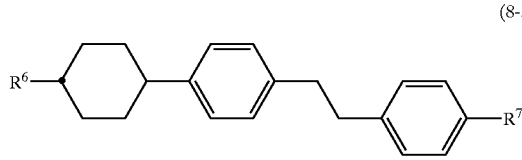
(8-5)
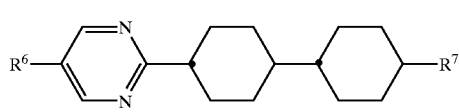
(8-6)
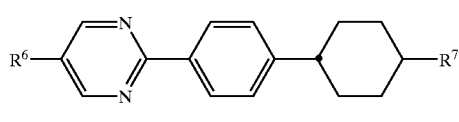
(8-7)
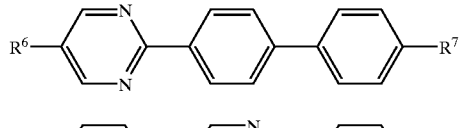
(8-8)
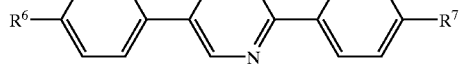
(8-9)
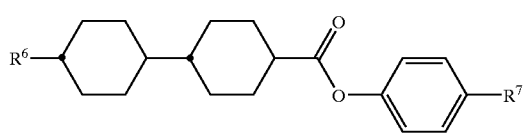
(8-10)
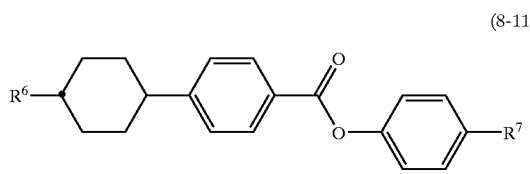
(8-11)
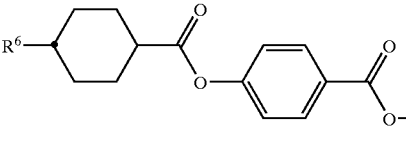
(8-12)
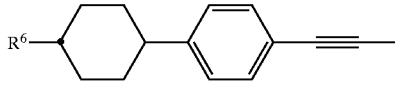
(8-13)
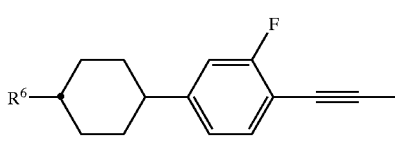
(8-14)
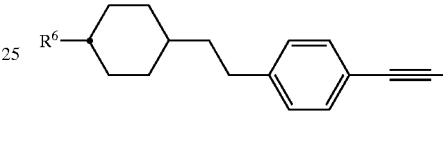
(8-15)
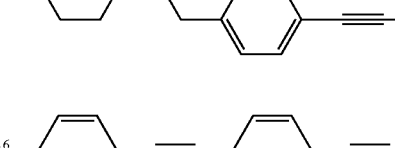
(8-16)
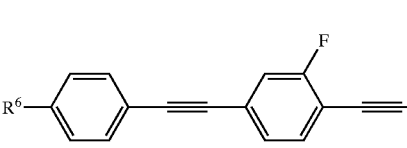
(8-17)
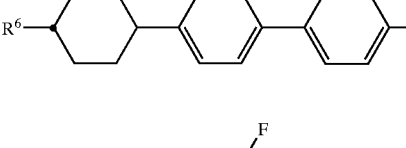
(8-18)
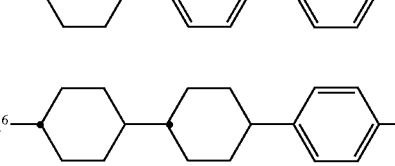
(9-1)
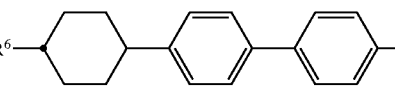
(9-2)
(9-3)
(9-4)

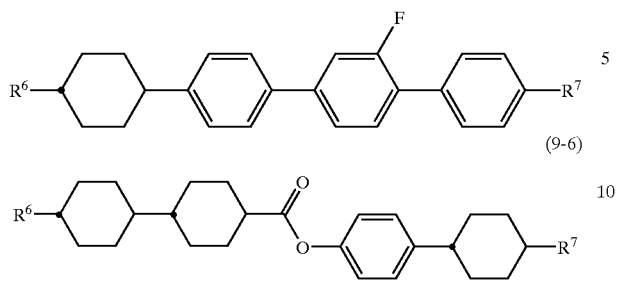

wherein $R^6$ and $R^7$ have the same meaning as described above.

Any compounds expressed by one of formulas (7) to (9) have a small absolute value of $\Delta\varepsilon$. Among them, the compounds of the formula (7) are used principally for the purpose of adjusting viscosity or adjusting $\Delta n$ of liquid crystal compositions, and the compounds of the formula (8) or (9) are used for the purpose of widening nematic range and adjusting $\Delta n$.

Whereas these compounds raise threshold voltage of liquid crystal compositions as their amount used is increased, the use of the compounds reduces the viscosity. Accordingly, it is desirable to use compounds in a larger amount so far as the threshold voltage of liquid crystal composition satisfies required value.

From such state of things, the amount of the compounds to be used is suitably 40% by weight or less and preferably 35% by weight or less based on the total amount of liquid crystal composition when liquid crystal compositions for TFT are produced.

On the other hand, when liquid crystal compositions for STN display mode or TN display mode are produced, the amount of use described above is 70% by weight or less, preferably 60% by weight or less based on the total amount of the liquid crystal composition.

Among the third component B described above, the compounds of one of the formulas (10-1) to (10-3) can be mentioned as preferable examples of the ones included in formula (10), the compounds of one of the formulas (11-1) to (11-5) can be mentioned as preferable examples of the ones included in formula (11), and the compounds of one of the formulas (12-1) to (12-3) can be mentioned as preferable examples of the ones included in formula (12).

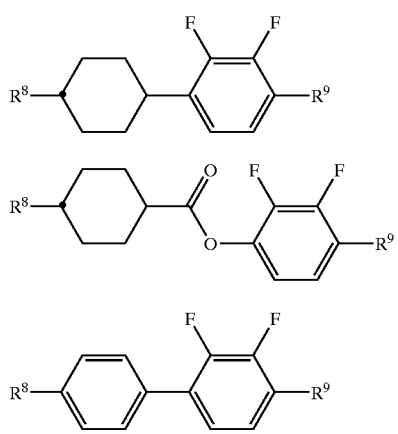

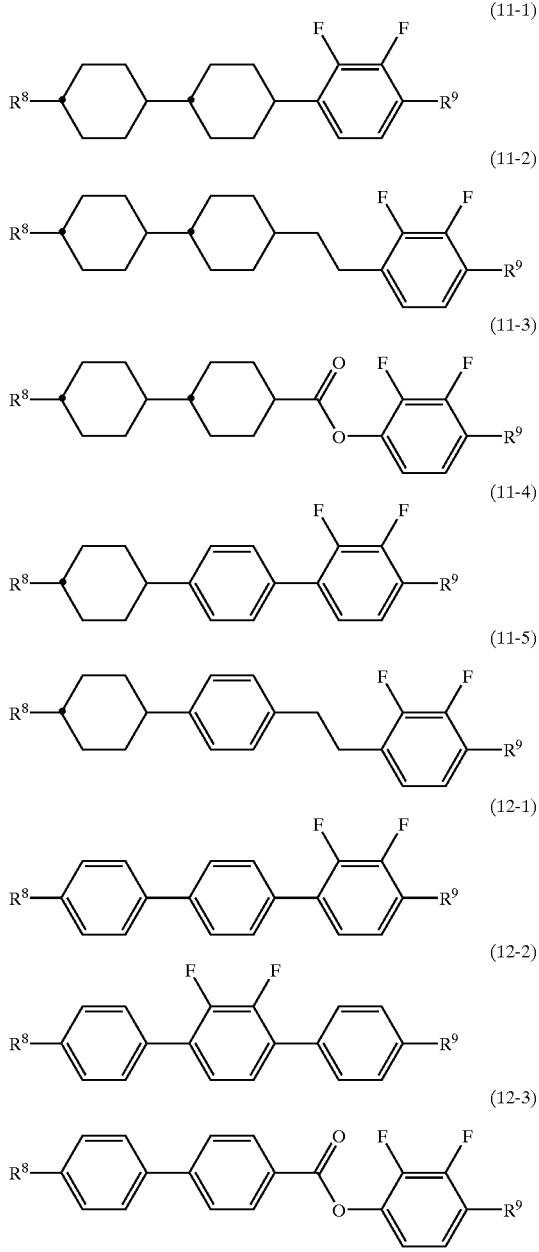

wherein $R^8$ and $R^9$ have the same meaning as described above.

Any compounds expressed by one of formulas (10) to (12) have a negative $\Delta\varepsilon$ (N type compounds).

The two-rings system compounds expressed by the formula (10) are used principally for the purpose of adjusting threshold voltage, viscosity or $\Delta n$ of liquid crystal compositions, and the compounds expressed by the formula (12) are used for the purpose of widening nematic range, lowering threshold voltage or enlarging absolute value of $\Delta\varepsilon$ in negative.

The compounds expressed by the formula (10) to (12) are used mainly as an N type compounds. Whereas these compounds lower threshold voltage while increase viscosity of liquid crystal compositions as their amount used is increased, it is desirable to use the compounds in a smaller amount so far as the threshold voltage of liquid crystal composition satisfies required value.

However, the compounds are disadvantageous for driving at a low voltage due to their smaller absolute value of Δ∈ as 5 or less, and therefore the amount to be used has to be settled in an effective level or more.

For example, the amount of the compounds to be used described above is suitably 40% by weight or more and preferably 50 to 95% by weight when liquid crystal compositions for TFT of N type are produced.

Further, the amount described above is preferably 30% by weight or less when liquid crystal compositions are produced by adding the compounds to a P type liquid crystal, for the purpose of controlling an elastic constant and a voltage-transmittance curve (V-T curve).

The compounds expressed by the formulas (1) to (12) explained above may be those in which a certain proportion of atoms constituting the molecules are replaced by their isotopes.

The reason is that even the compounds thus replaced by isotopes are found to have no difference from the non-replaced compounds in view of liquid crystal characteristics.

Among other components described above, an optically active compound is usually added for the purpose of inducing helical structure of liquid crystal compositions to adjust required twist angle and to prevent reverse twist, with the exception of specific cases, for instance, the case of liquid crystal compositions for OCB (Optically Compensated Birefringence) mode.

While the optically active compound is widely selected from known compounds so far as the purpose described above can be achieved, the optically active compounds expressed by one of the following formulas (Op-1) to (Op-8) can preferably be mentioned.

(Op-1)
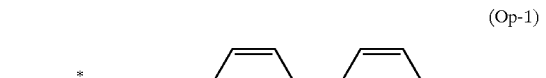

(Op-2)
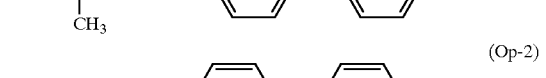

(Op-3)
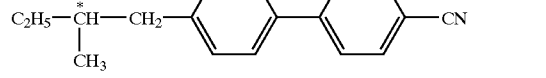

(Op-4)
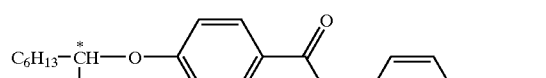

(Op-5)
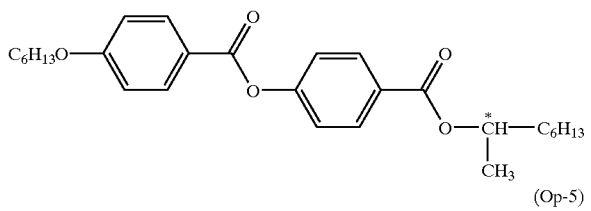

(Op-6)
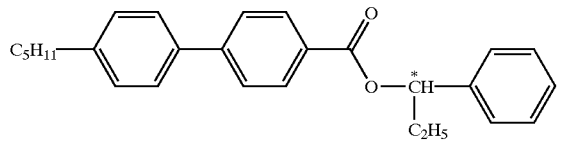

(Op-7)
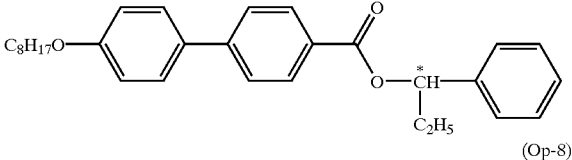

(Op-8)
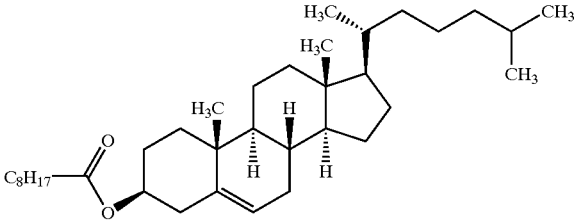

Pitch length of the twist in liquid crystal compositions is adjusted by adding these optically active compounds. The twist pitch length is preferably adjusted in the range of 40 to 200 μm in the case of liquid crystal compositions for TFT or TN, preferably adjusted in the range of 60 to 20 μm in the case of the compositions for STN, and preferably adjusted in the range of 1.5 to 4 μm in the case of the compositions for bistable TN mode, respectively. In such cases, two or more kinds of optically active compounds may be added for the purpose of adjusting the dependency of pitch length on temperature.

Liquid crystal compositions of the present invention can be produced by methods, which are conventional. For instance, the compositions are produced by a method in which various components are dissolved in one another at a high temperature.

Further, the compositions can be used as ones for guest-host (GH) mode by adding a dichroic dye such as merocyanine type, styryl type, azo type, azomethine type, azoxy type, quinophthalone type, anthraquinone type, or tetrazine type thereto. Alternatively, the liquid crystal compositions can be used as NCAP which is prepared by microencapsulation of a nematic liquid crystal, or as liquid crystal compositions for polymer dispersed liquid crystal display devices (PDLCD) represented by polymer network liquid crystal display devices (PNLCD) prepared by forming a polymer of three-dimensional reticulated structure in a liquid crystal.

Still further, the liquid crystal compositions can be used as ones for electrically controlled birefringence (ECB) mode or dynamic scattering (DS) mode.

The liquid crystal compositions of the present invention are produced in such a manner as described above, and examples thereof (Composition Examples) are shown below.

In each of the Composition examples, compounds used as the components are shown s by referring to the definitions given in Table 1. Compound No. appended to the compounds means that the compounds are the same as those shown in Examples described later, and the content of compounds means % by weight unless otherwise specified.

Further, data of characteristics of compositions in Composition Examples are indicated by NI (phase transition temperature of nematic-isotropic liquid, or clearing point), η (viscosity: determined at 20° C.), Δn (optical anisotropy value: determined at 25° C.) and Vth (threshold voltage: determined at 25°C.).

[Table 1]

TABLE 1

Notation of Compounds by Using Symbols
R—(A$_1$)—Z$_1$—...—Z$_n$—(A$_n$)—X

| 1) Left terminal group R— | Symbol |
|---|---|
| C$_n$H$_{2n+1}$— | n- |
| C$_n$H$_{2n+1}$O— | nO- |
| C$_n$H$_{2n+1}$OC$_m$H$_{2m}$— | nOm- |
| CH$_2$=CH— | V- |
| CH$_2$=CHC$_n$H$_{2n}$— | Vn- |
| C$_n$H$_{2n+1}$CH=CHC$_m$H$_{2m}$— | nVm- |
| C$_n$H$_{2n+1}$CH=CHC$_m$H$_{2m}$CH=CHC$_k$H$_{2k}$— | nVmVk- |

| 2) Bonding group —Z$_1$—, —Z$_n$— | Symbol |
|---|---|
| —C$_2$H$_4$— | 2 |
| —C$_4$H$_8$— | 4 |
| —COO— | E |
| —C≡C— | T |
| —CH=CH— | V |
| —CF$_2$O— | CF2O |
| —OCF$_2$— | OCF2 |

| 3) Ring structure —(A1)—, —(An)— | Symbol |
|---|---|
| 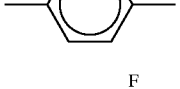 | B |
| 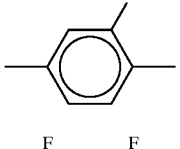 | B(F) |
| 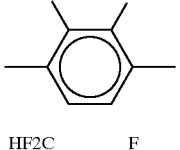 | B(2F, 3F) |
| 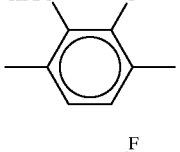 | B(2CF2H, 3F) |
| 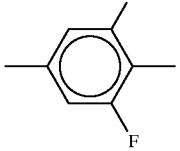 | B(F, F) |
| 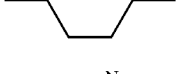 | H |
|  | Py |

TABLE 1-continued

Notation of Compounds by Using Symbols
R—(A$_1$)—Z$_1$—...—Z$_n$—(A$_n$)—X

| | |
|---|---|
| 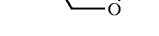 | D |
|  | Ch |

| 4) Right terminal group —X | Symbol |
|---|---|
| —F | -F |
| —Cl | -CL |
| —CN | -C |
| —CF$_3$ | -CF3 |
| —OCF$_3$ | -OCF3 |
| —OCF$_2$H | -OCF2H |
| —C$_n$H$_{2n+1}$ | -n |
| —OC$_n$H$_{2n+1}$ | -On |
| —COOCH$_3$ | -EMe |
| —C$_n$H$_{2n}$CH=CH$_2$ | -nV |
| —C$_m$H$_{2m}$CH=CHC$_n$H$_{2n+1}$ | -mVn |
| —C$_m$H$_{2m}$CH=CHC$_n$H$_{2n}$F | -mVnF |
| —CH=CF$_2$ | -VFF |
| —C$_n$H$_{2n}$CH=CF$_2$ | -nVFF |
| —C≡C—CN | -TC |

5) Notation example

Example 1 3-H2B(F, F)B(F)—F

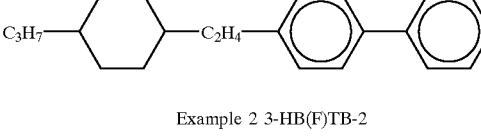

Example 2 3-HB(F)TB-2

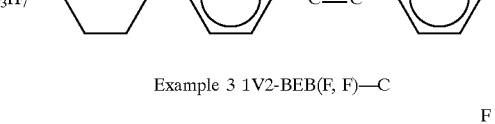

Example 3 1V2-BEB(F, F)—C

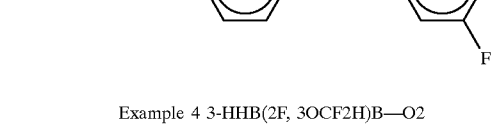

Example 4 3-HHB(2F, 3OCF2H)B—O2

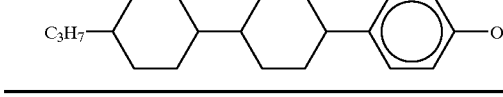

Composition Example 1

Liquid crystal composition comprising the following components in the amount shown below was prepared:

| | | |
|---|---|---|
| 3-HHB(CF2H)-02 | (No. 22) | 15.0% |
| 3-HB10B(2CF2H)-1 | (No. 201) | 5.0% |
| 3-HEB-04 | | 24.0% |
| 4-HEB-O2 | | 16.0% |
| 5-HEB-O1 | | 16.0% |
| 3-HEB-O2 | | 14.0% |
| 5-HEB-O2 | | 10.0% |

Characteristics of this composition were determined to be as follows:

NI=73.8(°C.)
$\eta$=25.9(mPa·s)
$\Delta$n=0.087
$\Delta\epsilon$=−1.9

Composition Example 2

Liquid crystal composition comprising the following components in the amount shown below was prepared:

| | | |
|---|---|---|
| 3-HHB(CF2H)-02 | (No. 22) | 10.0% |
| 3-HH-2 | | 5.0% |
| 3-HH-4 | | 6.0% |
| 3-HH-O1 | | 4.0% |
| 3-HH-O3 | | 5.0% |
| 5-HH-O1 | | 4.0% |
| 3-HX-O2 | | 12.0% |
| 5-HX-O2 | | 11.0% |
| 3-HHX-O2 | | 10.0% |
| 5-HHX-O2 | | 9.0% |
| 3-HHX-2 | | 24.0% |

Characteristics of this composition were determined to be as follows:

NI=83.3(°C.)
$\Delta$n=0.080
$\Delta\epsilon$=−3.8

Composition Example 3

Liquid crystal composition comprising the following components in the amount shown below was prepared:

| | | |
|---|---|---|
| 3-HB10B(2CF2H,F)-1 | (No. 202) | 7.0% |
| 3-HH-5 | | 5.0% |
| 3-HH-4 | | 5.0% |
| 3-HH-O1 | | 6.0% |
| 3-HH-O3 | | 6.0% |
| 3-HB-O1 | | 5.0% |
| 3-HB-O2 | | 5.0% |
| 3-HX-O2 | | 10.0% |
| 5-HX-O2 | | 3.0% |
| 3-HHX-O2 | | 12.0% |
| 5-HHX-O2 | | 13.0% |
| 3-HHX-2 | | 4.0% |
| 2-HHX-1 | | 4.0% |
| 3-HHEH-3 | | 5.0% |
| 3-HHEH-5 | | 5.0% |
| 4-HHEH-3 | | 5.0% |

Characteristics of this composition were determined to be as follows:

NI=87.4(°C.)
$\Delta$n=0.079
$\Delta\epsilon$=−3.4

Composition Example 4

Liquid crystal composition comprising the following components in the amount shown below was prepared:

| | | |
|---|---|---|
| 3-HHB(CF2H)-02 | (No. 22) | 5.0% |
| 3-HB10B(2CF2H,F)-1 | (No. 202) | 5.0% |
| 3-BX-O2 | | 10.0% |
| 5-BB-5 | | 9.0% |
| 5-BB-O6 | | 9.0% |
| 5-BB-O8 | | 3.0% |
| 1-BEB-5 | | 3.0% |
| 3-BEB-5 | | 4.0% |
| 5-BEB-5 | | 3.0% |
| 3-HEB-O2 | | 20.0% |
| 5-BBX-7 | | 9.0% |
| 3-H2BB(2F)-5 | | 20.0% |

Characteristics of this composition were determined to be as follows:

NI=78.8(°C.)
$\Delta$n=0.150
$\Delta\epsilon$=−3.1

Composition Example 5

Liquid crystal composition comprising the following components in the amount shown below was prepared:

| | | |
|---|---|---|
| 3-HHB(CF2H)-02 | (No.22) | 15.0% |
| 3-HHB(2F,3CF2H)-O2 | (No.25) | 8.0% |
| 3-HHB(2F,3OCF2H)-O2 | (No.30) | 8.0% |
| 3-BX-O2 | | 12.0% |
| 3-BX-O4 | | 10.0% |
| 5-BX-O4 | | 4.0% |
| 2-BXB-3 | | 15.0% |
| 3-BXB-5 | | 13.0% |
| 5-BXB-5 | | 10.0% |
| 5-BXB-7 | | 5.0% |

Composition Example 6

Liquid crystal composition comprising the following components in the amount shown below was prepared:

| | | |
|---|---|---|
| 5-HB(2F,3F)B(CF2H)-02 | (No. 49) | 5.0% |
| 3-HHB(2F,3CF2H)-O2 | (No. 25) | 5.0% |
| 3-HHB(2F,3OCF2H)-O2 | (No. 30) | 5.0% |
| 3-HB-O1 | | 15.0% |
| 3-HB-O2 | | 6.0% |
| 3-HEX-O2 | | 9.0% |
| 5-HEX-O2 | | 9.0% |
| 2-BB2B-O2 | | 6.0% |
| 3-BB2B-O2 | | 6.0% |
| 5-BB2B-O1 | | 6.0% |
| 1-B2BB(2F)-5 | | 7.0% |
| 3-B2BB(2F)-5 | | 7.0% |
| 5-B(F)BB-O2 | | 7.0% |
| 3-BXB-3 | | 7.0% |

Composition Example 7

Liquid crystal composition comprising the following components in the amount shown below was prepared:

| | | |
|---|---|---|
| 3-HHB(2F,3OCF2H)-O2 | (No. 30) | 7.0% |
| 3-HH1OB(2CF2H,F)-O2 | (No. 202) | 3.0% |
| 3-HB-O1 | | 9.0% |
| 3-HB-O2 | | 9.0% |
| 3-HB-O4 | | 9.0% |
| 2-BTB-O1 | | 5.0% |
| 1-BTB-O2 | | 5.0% |
| 3-BTX-O2 | | 13.0% |
| 5-BTX-O2 | | 3.0% |
| 3-XTX-O4 | | 4.0% |
| 5-XTX-O4 | | 4.0% |
| 3-HBTB-O1 | | 5.0% |
| 3-HBTB-O2 | | 5.0% |
| 3-HBTB-O3 | | 5.0% |
| 3-HHX-O2 | | 6.0% |
| 5-HBX-O2 | | 5.0% |
| 5-BPr(F)-O2 | | 3.0% |

Composition Example 8

Liquid crystal composition comprising the following components in the amount shown below was prepared:

| | | |
|---|---|---|
| 3-HHB(CF2H)-O2 | (No. 22) | 8.0% |
| 1V2-BEB(F,F)-C | | 5.0% |
| 3-HB-C | | 20.0% |
| V2-HB-C | | 6.0% |
| 1-BTB-3 | | 5.0% |
| 2-BTB-1 | | 10.0% |
| 1O1-HH-3 | | 3.0% |
| 3-HH-4 | | 11.0% |
| 3-HHB-1 | | 3.0% |
| 3-HHB-3 | | 3.0% |
| 3-H2BTB-2 | | 4.0% |
| 3-H2BTB-3 | | 4.0% |
| 3-H2BTB-4 | | 4.0% |
| 3-HB(F)TB-2 | | 6.0% |
| 3-HB(F)TB-3 | | 5.0% |
| 3-HHB-C | | 3.0% |

Characteristics of this composition were determined to be as follows:

NI=85.6(°C.)
η=18.7(mPa·s)
Δn=0.158
Δ∈=6.8
Vth=2.13(V)

Optically active compound expressed by the formula (Op-4) described above in an amount of 0.8 part by weight was mixed to 100 parts by weight of the primary composition described just above to obtain a secondary composition, and the secondary composition was determined to have pitch of 10.5 μm.

Composition Example 9

Liquid crystal composition comprising the following components in the amount shown below was prepared:

| | | |
|---|---|---|
| 3-HHB(CF2H)-O2 | (No. 22) | 5.0% |
| 3-HB10B(2CF2H)-1 | (No. 201) | 2.0% |
| 5-BEB(F)-C | | 5.0% |
| V-HB-C | | 11.0% |
| 5-PYB-C | | 6.0% |
| 4-BB-3 | | 11.0% |
| V2V-HH-5 | | 4.0% |
| 3-HH-2V | | 10.0% |
| 5-HH-V | | 7.0% |
| V-HHB-1 | | 7.0% |
| V2-HHB-1 | | 15.0% |
| 3-HHB-1 | | 2.0% |
| 1V2-HBB-2 | | 10.0% |
| 3-HHEBH-3 | | 5.0% |

Characteristics of this composition were determined to be as follows:

NI=84.2(°C.)
η=18.1(mPa·s)
Δn=0.114
Δ∈=4.5
Vth=2.41(V)

Composition Example 10

Liquid crystal composition comprising the following components in the amount shown below was prepared:

| | | |
|---|---|---|
| 3-HHB(CF2H)-O2 | (No. 22) | 5.0% |
| 5-HB(2F,3F)B(CF2H)-O2 | (No. 49) | 4.0% |
| 2O1-BEB(F)-C | | 5.0% |
| 3O1-BEB(F)-C | | 12.0% |
| 5O1-BEB(F)-C | | 4.0% |
| 1V2-BEB(F,F)-C | | 10.0% |
| 3-HEB-O4 | | 4.0% |
| 3-HH-EMe | | 6.0% |
| 3-HB-O2 | | 18.0% |
| 7-HEB-F | | 2.0% |
| 3-HHEB-F | | 2.0% |
| 5-HHEB-F | | 2.0% |
| 3-HBEB-F | | 4.0% |
| 2O1-HBEB(F)-C | | 2.0% |
| 3-HB(F)EB(F)-C | | 2.0% |
| 3-HBEB(F,F)-C | | 2.0% |
| 3-HHB-F | | 3.0% |
| 3-HHB-O1 | | 3.0% |
| 3-HHB-3 | | 2.0% |
| 3-HEBEB-F | | 2.0% |
| 3-HEBEB-1 | | 2.0% |
| 3-HHB(F)-C | | 4.0% |

Composition Example 11

Liquid crystal composition comprising the following components in the amount shown below was prepared:

| | | |
|---|---|---|
| 3-HHB(2F,3CF2H)-O2 | (No. 25) | 5.0% |
| 3-HHB(2F,3OCF2H)-O2 | (No. 30) | 6.0% |
| V2-HB-TC | | 10.0% |
| 3-HB-TC | | 10.0% |
| 3-HB-C | | 10.0% |
| 5-HB-C | | 7.0% |
| 5-BB-C | | 3.0% |
| 2-BTB-1 | | 10.0% |
| 2-BTB-O1 | | 5.0% |
| 3-HH-4 | | 5.0% |
| 3-HHB-1 | | 5.0% |
| 3-HHB-3 | | 5.0% |
| 3-H2BTB-2 | | 3.0% |
| 3-HB(F)TB-2 | | 3.0% |
| 5-BTB(F)TB-3 | | 10.0% |
| 3-PyBB-F | | 3.0% |

Composition Example 12

Liquid crystal composition comprising the following components in the amount shown below was prepared:

| | | |
|---|---|---|
| 3-HHB(CF2H)-O2 | (No. 22) | 8.0% |
| 3-HB10B(2CF2H)-1 | (No. 201) | 8.0% |
| 5-HB(2F,3F)B(CF2H)-O2 | (No. 49) | 8.0% |
| 1V2-BEB(F,F)-C | | 6.0% |
| 3-HB-C | | 18.0% |
| 2-BTB-1 | | 5.0% |
| 5-HH-VFF | | 16.0% |
| 1-BHH-VFF | | 8.0% |
| 1-BHH-2VFF | | 6.0% |
| 3-H2BTB-2 | | 5.0% |
| 3-H2BTB-3 | | 4.0% |
| 3-H2BTB-4 | | 4.0% |
| 3-HHB-1 | | 4.0% |

Composition Example 13

Liquid crystal composition comprising the following components in the amount shown below was prepared:

| | | |
|---|---|---|
| 3-HHB(CF2H)-O2 | (No. 22) | 12.0% |
| 3-HB-CL | | 10.0% |
| 5-HB-CL | | 4.0% |
| 7-HB-CL | | 4.0% |
| 1O1-HH-5 | | 5.0% |
| 2-HBB(F)-F | | 8.0% |
| 3-HBB(F)-F | | 8.0% |
| 5-HBB(F)-F | | 14.0% |
| 4-HHB-CL | | 2.0% |
| 5-HHB-CL | | 2.0% |
| 3-H2HB(F)-CL | | 4.0% |
| 3-HBB(F,F)-F | | 10.0% |
| 5-H2BB(F,F)-F | | 9.0% |
| 3-HB(F)VB-2 | | 4.0% |
| 3-H2BTB-2 | | 4.0% |

Characteristics of this composition were determined to be as follows:

NI=87.1(°C.)

η=24.6(mPa·s)

Δn=0.125

Δ∈=4.4

Vth=2.42(V)

Composition Example 14

Liquid crystal composition comprising the following components in the amount shown below was prepared:

| | | |
|---|---|---|
| 3-HB10B(2CF2H,F)-1 | (No. 202) | 5.0% |
| 7-HB(F,F)-F | | 5.0% |
| 3-H2HB(F,F)-F | | 12.0% |
| 4-H2HB(F,F)-F | | 6.0% |
| 3-HHB(F,F)-F | | 10.0% |
| 4-HHB(F,F)-F | | 5.0% |
| 3-HBB(F,F)-F | | 5.0% |
| 3-HHEB(F,F)-F | | 10.0% |
| 4-HHEB(F,F)-F | | 3.0% |
| 5-HHEB(F,F)-F | | 3.0% |
| 2-HBEB(F,F)-F | | 3.0% |
| 3-HBEB(F,F)-F | | 5.0% |
| 5-HBEB(F,F)-F | | 3.0% |
| 3-HDB(F,F)-F | | 15.0% |

-continued

| | | |
|---|---|---|
| 3-HBCF2OB-OCF3 | | 4.0% |
| 3-HHBB(F,F)-F | | 6.0% |

Characteristics of this composition were determined to be as follows:

NI=74.0(°C.)

η=36.1(mPa·s)

Δn=0.083

Δ∈=12.8

Vth 1.48(V)

Composition Example 15

Liquid crystal composition comprising the following components in the amount shown below was prepared:

| | | |
|---|---|---|
| 3-HHB(CF2H)-O2 | (No. 22) | 5.0% |
| 5-HB(2F,3F)B(CF2H)-O2 | (No. 49) | 4.0% |
| 3-HHB(2F,3CF2H)-O2 | (No. 25) | 5.0% |
| 5-HB-F | | 12.0% |
| 6-HB-F | | 9.0% |
| 7-HB-F | | 7.0% |
| 2-HHB-OCF3 | | 7.0% |
| 5-HHB-OCF3 | | 5.0% |
| 3-HH2B-OCF3 | | 4.0% |
| 5-HH2B-OCF3 | | 4.0% |
| 3-HHB(F,F)-OCF3 | | 5.0% |
| 3-HBB(F)-F | | 10.0% |
| 5-HBB(F)-F | | 10.0% |
| 3-HH2B(F)-F | | 3.0% |
| 3-HB(F)BH-3 | | 3.0% |
| 5-HBBH-3 | | 3.0% |
| 3-HHB(F,F)-OCF2H | | 4.0% |

Composition Example 16

Liquid crystal composition comprising the following components in the amount shown below was prepared:

| | | |
|---|---|---|
| 3-HHB(CF2H)-O2 | (No. 22) | 4.0% |
| 3-HB10B(2CF2H)-1 | (No. 201) | 4.0% |
| 3-HHB(2F,3OCF2H)-O2 | (No. 30) | 4.0% |
| 5-H4HB(F,F)-F | | 7.0% |
| 5-H4HB-OCF3 | | 10.0% |
| 3-H4HB(F,F)-CF3 | | 5.0% |
| 5-H4HB(F,F)-CF3 | | 6.0% |
| 3-HB-CL | | 6.0% |
| 5-HB-CL | | 4.0% |
| 2-H2BB(F)-F | | 5.0% |
| 3-H2BB(F)-F | | 10.0% |
| 5-HVHB(F,F)-F | | 5.0% |
| 3-HHB-OCF3 | | 5.0% |
| 3-H2HB-OCF3 | | 5.0% |
| V-HHB(F)-F | | 5.0% |
| 3-HHB(F)-F | | 5.0% |
| 5-HHEB-OCF3 | | 2.0% |
| 3-HBEB(F,F)-F | | 5.0% |
| 5-HH-V2F | | 3.0% |

Composition Example 17

Liquid crystal composition comprising the following components in the amount shown below was prepared:

| | | |
|---|---|---|
| 3-HHB(CF2H)-O2 | (No. 22) | 5.0% |
| 3-HB1OB(2CF2H)-1 | (No. 201) | 5.0% |
| 3-HB1OB(2CF2H,F)-1 | (No. 202) | 6.0% |
| 5-HB(2F,3F)B(CF2H)-O2 | (No. 49) | 4.0% |
| 2-HHB(F)-F | | 2.0% |
| 3-HHB(F)-F | | 2.0% |
| 5-HHB(F)-F | | 2.0% |
| 2-HBB(F)-F | | 6.0% |
| 3-HBB(F)-F | | 6.0% |
| 5-HBB(F)-F | | 10.0% |
| 2-H2BB(F)-F | | 9.0% |
| 3-H2BB(F)-F | | 9.0% |
| 3-HBB(F,F)-F | | 15.0% |
| 5-HBB(F,F)-F | | 9.0% |
| 1O1-HBBH-4 | | 5.0% |
| 1O1-HBHH-5 | | 5.0% |

Compounds of the present invention expressed by the general formula (1) can be prepared by such a known method of ordinary organic synthesis as following.

(A) Production of compounds expressed by the general formula (1) in which Z is represented by the partial structural formula (I), (II), (III) or (IV):

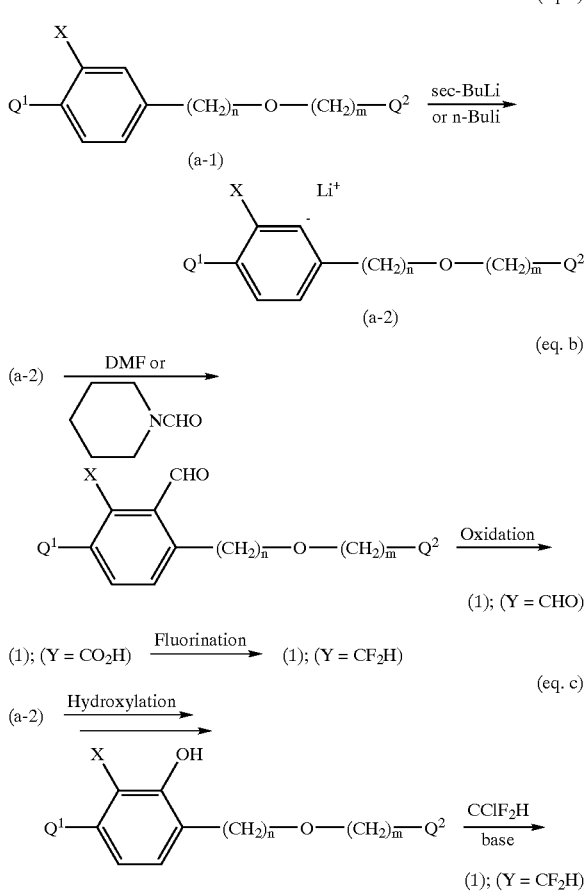

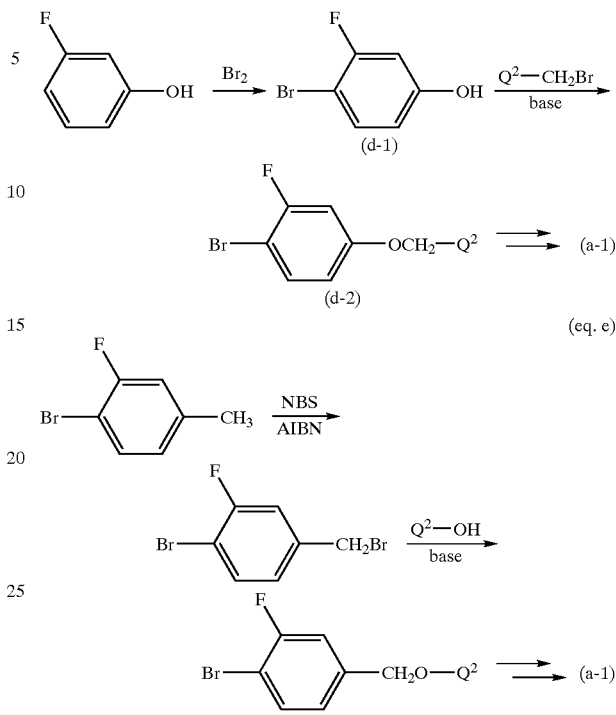

wherein X has the same meaning as described above; m and n each independently are 0 or 1 with proviso that m+n is 1; $Q^1$ and $Q^2$ each independently represent $R^1$-$A^1$-$B^1$-$A^2$-$B^2$-$A^3$-$B^3$ or $R^2$-$A^4$-$B^4$ with proviso that $Q^1 \neq Q^2$.

The compound expressed by a formula (a-1) is reacted with n-BuLi or sec-BuLi to obtain a lithiation compound (a-2), and this compound is then reacted with DMF or N-formylpiperidine or the like to obtain the compound example of the present invention (1) in which Y in the partial structural formula described above is formyl.

Thus obtained compound is oxidized with a Jone's reagent or the like or fluorinated with diethylaminosulfur trifluoride (DAST) or the like to obtain the compound example of the present invention (1) in which Y in the partial structural formula described above is carboxyl (see eq. a) or Y is difluoromethyl (cf. eq. b).

Further, the compound (a-2) is subjected to hydroxylation via boric acid, and then reacted with chlorodifluoromethane or the like to obtain the compound example of the present invention (1) in which Y is difluoromethoxy (cf. eq. c).

Still further, the compound expressed by the formula (a-1) described above which is a starting material can readily be synthesized by such a method as following.

That is, the compound in which Z is given as either the partial structural formula (I) or (III) and X is a fluorine atom can be synthesized according to the known method, such as the one described in Liq. Cryst., 21, 279 (1996), by brominating 3-fluorophenol to obtain the compound (d-1), then reacting it with an appropriate bromomethyl derivative to obtain the compound (d-2) and then subjecting this compound to several known reaction steps (cf. eq. d).

Similarly, the compound as above in which X is a hydrogen atom can be synthesized in the same manner as described above, except that 4-bromoanisole is used in place of the compound (d-1).

The compound in which Z is given as either the partial structural formula (II) or (IV) and X is a fluorine atom can be synthesized by reacting 4-boromo-3-fluorotoluene with NBS (N-bromosuccinimide) or the like to brominate the former's methyl group, followed by reacting thus obtained compound with an appropriate hydroxymethyl derivative and then followed by subjecting thus obtained compound to several known reaction steps (cf. eq. e). Similarly, the compound as above in which X is a hydrogen atom can be synthesized in the same manner as described above, except that 4-bromotoluene is used in place of 4-boromo-3-fluorotoluene.

(B) Production of compounds expressed by the general formula (1) in which Z is represented by the partial structural formula (V) or (VI):

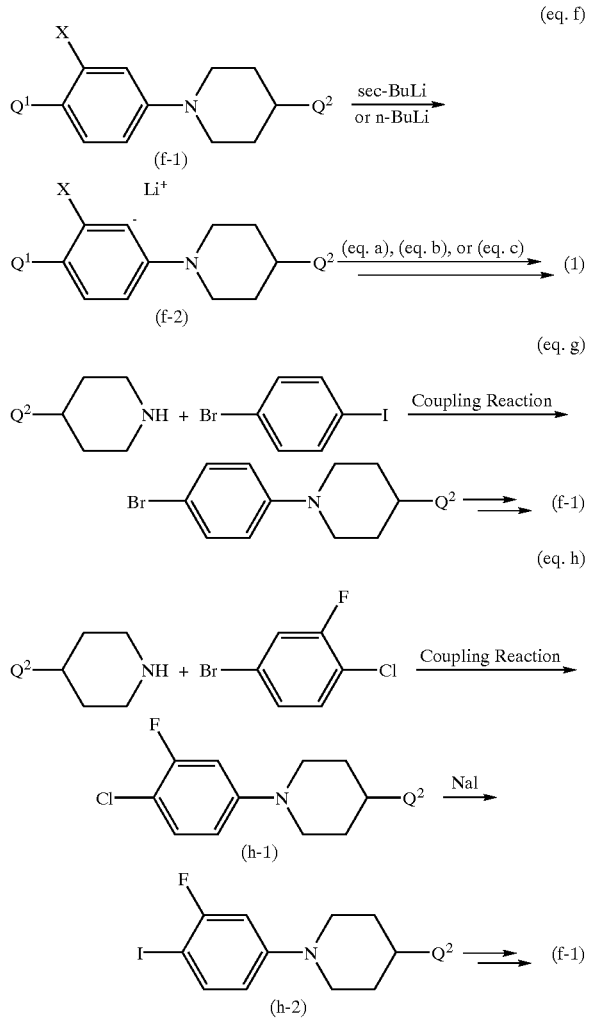

wherein $Q^1$ and $Q^2$ have the same meaning as described above.

The compound expressed by a formula (f-1) is reacted with n-BuLi or sec-BuLi to obtain a lithiation compound (f-2), and followed by a reaction in the same manner as in the cases of (eq. a), (eq. b) or (eq. c), except that the lithiation compound (f-2) thus obtained is used in place of the lithiation compound (a-2) (cf. eq. f).

Still further, the compound expressed by the formula (f-1) described above which is a starting material can readily be synthesized by such methods as followings.

That is, a suitable piperidine derivative is subjected to a coupling reaction with 4-bromoiodobenzene according to the method described in J. Org. Chem., 62, 6066 (1997) or the like to convert it to a compound (g-1), followed by a reaction in which a bromine atom of this compound is converted to various substituents along with the objects of the present invention (cf eq. g), or a suitable piperidine derivative is subjected to a coupling reaction with 4-chloro-3-fluorobromobenzene according to the method described in J. Am. Chem. Soc., 118, 7215 (1996) to convert it to a compound (h-1), followed by a reaction in which a chlorine atom of thus obtained compound is converted to an iodine atom according to the method described in J. Org. Chem., 23, 305 (1958) to obtain a compound (h-2), followed further by a reaction in which the iodine atom is converted to various substituents along with the objects of the present invention (cf. eq. h).

The compound example of the present invention (1) thus obtained can readily be isolated by subjecting the reaction solution obtained after the reaction is finished to a conventional extraction treatment, and further by carrying out refining operations such as distillation, recrystallization or column chromatography or the like.

The present invention will be explained below in more detail with reference to Examples. However, it should be understood that the scope of the present invention is by no means restricted by such specific Examples.

In each of the Examples, M⁺ in mass spectrum (MS) indicates molecular ion peak; C indicates crystal, N indicates nematic phase and I indicates isotropic liquid phase, while those parenthesized show monotropic liquid crystal phases; and the unit of all phase transition is °C.

EXAMPLE 1

Synthesis of 2-ethoxy-5-(4-propylcyclohexyl)-cyclohexylbenzaldehyde (compound expressed by the general formula (I) wherein Z is the partial structural formula (I), $R^1$ is n-propyl group, $R^2$ is methyl group, $A^1$ and $A^2$ are both cyclohexylene groups, $A^3, A^4, B^1, B^2, B^3$ and $B^4$ are all single bonds, X is a hydrogen atom, and Y is formyl group (Compound No. 21))

(No. 21)

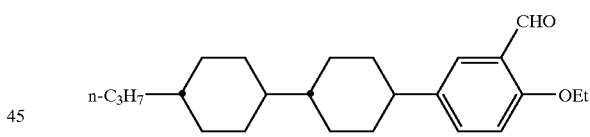

A tetrahydrofuran (THF) solution (50 ml) of 1-hydroxy-4-(4-propylcyclohexyl)cyclohexylbenzene (10 g, 33 mmol) synthesized according to a method described in Japanese Patent Application Laid-Open No. 285271/1996 was added to a THF solution (50 ml) of sodium hydride (60%, 2.0 g) and stirred for 30 minutes.

A THF solution (20 ml) of methoxymethyl chloride (4.0 ml, 53 mmol) was added to this mixture at such a rate that mild refluxing took place. After stirring a night at a room temperature, the solvent was distilled off under reduced pressure. Salt water (200 ml) and toluene (100 ml) were added to the residue. The organic layer was separated, and the aqueous layer was further extracted with toluene (100 ml). The organic layer, which was put together was dried on anhydrous magnesium sulfate and then filtered, and the solvent was distilled off under reduced pressure. The residue was refined by means of column chromatography (heptane:toluene=1:1) to obtain 1-methoxymethoxy-4-(4-propylcyclohexyl)cyclohexylbenzene in the form of colorless crystal. Yield: 8.1 g (71%).

Added to a THF solution (150 ml) of this compound (8.1 g, 23 mmol) was sec-butyl lithium (1.43 M, 25 ml) at −50° C. or lower, and the solution was further stirred for 15 minutes. A THF solution (50 ml) of dimethylformamide (DMF, 2.6 g, 36 mmol) was added to this reaction mixture at −50° C. or lower. After stirring at a room temperature for 30 minutes, a saturated ammonium chloride aqueous solution (200 ml) was added thereto.

Subsequently, the same extraction treatment as described above was carried out, and the resulting crude product was recrystallized from heptane, whereby 2-methoxymethoxy-5-(4-propylcyclohexyl)cyclohexylbenzaldehyde was obtained in the form of colorless crystal. Yield: 4.0 g (46%).

The aldehyde derivative (4.0 g, 11 mmol) described above was stirred in ethanol (150 ml) while blowing hydrogen chloride gas thereinto. After distilling the solvent off under reduced pressure, the same extraction treatment as described above was carried out with an ethyl acetate-water medium to obtain 5-(4-propylcyclohexyl)cyclohexylsalicylaldehyde in the form of colorless crystal. Yield: 3.4 g (94%).

This compound was used for subsequent reaction as it was without being refined.

The mixture of the salicylaldehyde derivative (3.4 g, 10 mmol) described above, ethyl iodide (1.1 ml, 14 mmol), potassium carbonate (2.1 g, 15 mmol) and potassium iodide (170 mg, 1.0 mmol) was refluxed in acetone (50 ml) for 3 days. After cooling down, the reaction mixture was filtered, and the solvent was distilled off under reduced pressure. The residue was refined by means of column chromatography (toluene) and a recrystallization operation (heptane) to obtain the objective compound.

Yield: 1.6 g (43%).

MS; 356 (M+)

$^1$H NMR (CDCl$_3$); δ (ppm) 10.5 (s, 1H, CHO), 7.67 (d, 1H, Ar6H, J=2.45 Hz), 7.37 (dd, 1H, Ar4H, J=8.60, 2.45 Hz), 6.89 (d, 1H, Ar3H, J=8.65 Hz),4.12(q, 2H, OCH$_2$, 6.95 Hz),2.39–2.42 (m, 1H, CHAr), 0.80–1.90 (m,25H, aliphatic protons).

$^{13}$C NMR (CDCl$_3$); δ (ppm) 190.2, 159.7, 140.0, 134.5, 126.0, 124.6, 112.5, 64.2, 43.6, 43.4, 42.8, 39.8, 37.6, 34.6, 33.6, 30.3, 30.1, 20.0, 14.7, 14.4.

Phase transition point: C.116.1.N.145.1.I

EXAMPLE 2

Synthesis of 2-difluoromethyl-1-ethoxy-4-(4-propylcyclohexyl)cyclohexylbenzene (compound expressed by the general formula (I) wherein Z is the partial structural formula (I), R$^1$ is n-propyl group, R$^2$ is methyl group, A$^1$ and A$^2$ are both cyclohexylene groups, A$^3$, A$^4$, B$^1$, B$^2$, B$^3$and B4are all single bonds, X is a hydrogen atom, and Y is difluoromethyl group (Compound No. 22))

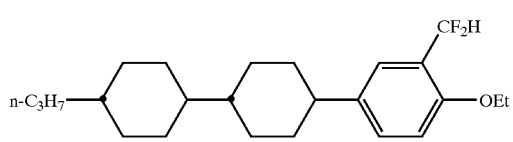

(No. 22)

The benzaldehyde derivative (1.3 g, 3.6 mmol) obtained in Example 1 was dissolved in methylene chloride (40 ml), and DAST (1.2 ml) was added to this solution at a room temperature and stirred a night at a room temperature. After cooling down to 5° C. on an ice bath, distilled water (50 ml) was slowly added.

Further, a saturated sodium carbonate aqueous solution was added to alkalize the aqueous layer, and then the organic layer was extracted with toluene (70 ml×2). The extracted organic layer was dried on anhydrous magnesium sulfate and filtered, and then the solvent was distilled off under reduced pressure. The residue was refined by means of column chromatography (heptane:toluene=5:1) and a recrystallization operation (heptane-ethanol) to obtain the objective compound. Yield: 870 mg (63%).

MS; 378 (M$^+$)

$^1$H NMR (CDCl$_3$); δ (ppm) 7.47 (s, 1H, Ar3H), 7.22 (d, 1H, Ar5H, J=10.3 Hz), 6.96 (t, 1H, CF$_2$H, J$_{H\,F}$=55.9 Hz), 6.83 (d, 1H, Ar6H J=10.3 Hz), 4.05 (q, 2H, OCH$_2$, J=7.10 Hz), 2.40–2.44 (m, 1H, CHAr), 0.80–1.90 (m, 25H, aliphatic protons).

$^{19}$F NMR (CDCl$_3$); δ (ppm); −115.3 (d, 2F, J$_{HF}$=56.5 Hz).

Phase transition point: C.83.6.N.106.9.I

EXAMPLE 3

Synthesis of 3-difluoromethyl-4-(4-(4-propylcyclohexyl)benzyloxy)toluene (compound expressed by the general formula (I) wherein Z is the partial structural formula (II), R$^1$ is n-propyl group, R$^2$ is methyl group, A$^1$ is cyclohexylene group, A$^2$ is 1,4-phenylene group, A$^3$, A$^4$, B$^1$, B$^2$, B$^3$ and B$^4$ are all single bonds, X is a hydrogen atom, and Y is difluoromethyl group (Compound No. 201))

(No. 201)

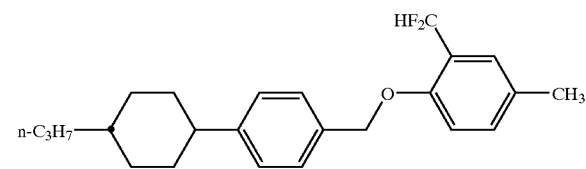

4-(4-Propyl)cyclohexylbenzyl bromide (15 g, 51 mmol) synthesized according to a method described in DE 3332692 and 5-methylsalicylaldehyde (7.5 g, 55 mmol) synthesized according to a method described in Ber., 55, 2664 (1922) were refluxed in acetone (150 ml) for 10 hours in the presence of potassium carbonate (8.4 g, 61 mmol). After cooling down, the solvent was distilled off under reduced pressure, and an extraction operation was carried out with an ethyl acetate-water medium in the same manner as in Example 1.

The extract was refined by means of column chromatography (heptane:toluene=1:1) to obtain 2-(4-propyl)cyclohexylbenzyloxy-5-methylbenzaldehyde.

Yield: 12 g (67%).

The reaction was carried out in the same manner as in Example 2, except that the benzaldehyde derivative was used in place of the aldehyde described above, and the product was refined by means of column chromatography (heptane:toluene=1:1) and a recrystallization operation (ethanol) to obtain 3-difluoromethyl-4-(4-(4-propylcyclohexyl)benzyloxy)toluene in the form of colorless crystal. Yield: 2.4 g (56%).

MS; 371(M−1$^+$)

$^1$H NMR (CDCl$_3$); δ (ppm) 7.38 (d, 1H, Tol2H), 7.32 (d, 2H, Ph2, 6H, J=8.05 Hz), 7.22 (d, 2H, Ph$_3$, 5H, J=8.05 Hz), 7.21 (dd, 1H, Tol6H, J=9.95 Hz), 6.99 (t, 1H, CF$_2$H, J$_H$ $_F$=55.6 Hz), 6.88 (d, 1H, Tol5H, J=9.55 Hz), 5.05 (s, 2H, CH2O), 2.44–2.50 (m, 1H, CHPh), 2.32 (s, 3H, PhCH$_3$), 0.87–1.90 (m, 16H, aliphatic protons).

$^{19}$F NMR (CDCl$_3$); δ (ppm) –115.5 (d, 2F, J$_{HF}$=56.5 Hz).

Phase transition point: C.44.2(.N.5.8).I

EXAMPLE 4

Synthesis of 2-(4-(4-propylcyclohexyl)benzyloxy)-5-methylbenzoic acid (compound expressed by the general formula (I) wherein Z is the partial structural formula (II), R$^1$ is n-propyl group, R$^2$ is methyl group, A$^1$ is cyclohexylene group, A$^2$ is 1,4-phenylene group, A$^3$, A$^4$, B$^1$, B$^2$, B$^3$ and B$^4$ are all single bonds, X is a hydrogen atom, and Y is carboxyl group (Compound No. 203))

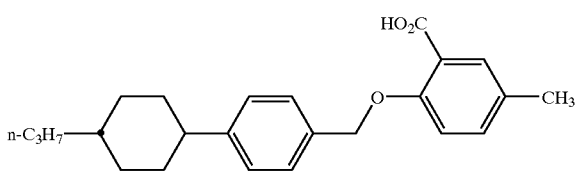

(No. 203)

A Jone's reagent was added to an acetone solution (50 ml) of the aldehyde derivative (3.7 g, 11 mmol) obtained in Example 3 until the time when a brown color remained had never disappeared, and the solution was stirred at a room temperature for 2 days.

After distilling the solvent off under reduced pressure, an extraction operation was carried out in the same manner as in Example 3, except that a toluene-water medium was used in place of the ethyl acetate-water medium, and then the product was refined by means of column chromatography (toluene:acetone=20:1) and a recrystallization operation (toluene) to obtain 2-(4-(4-propylcyclohexyl)benzyloxy)-5-methylbenzoic acid.

Yield: 1.4 g (44%).

$^1$H NMR (CDCl$_3$); δ (ppm) 10.98 (brs, 1H, CO$_2$H), 8.00 (d, 2H, Tol2H, J=2.25 Hz), 7.32–7.35 (m, 3H, Ph$_2$, 6H, Tol6H), 7.24–7.26 (m, 2H, Ph$_3$, 5H), 7.03 (d, 1H, Tol5H, J=8.50 Hz), 5.21 (s, 2H, CH$_2$O), 2.44–2.50 (m, 1H, CHPh), 2.33 (s, 3H, PhCH$_3$), 0.87–1.90 (m, 16H, aliphatic protons).

$^{13}$C NMR (CDCl$_3$); δ (ppm) 165.5, 155.4, 149.1, 135.5, 133.9, 132.0, 131.7, 128.1, 127.5, 117.5, 113.0, 75.3, 44.4, 39.6, 36.9, 34.2, 33.4, 20.2, 20.9, 14.4.

Phase transition point: C.121.1.I

EXAMPLE 5

Synthesis of 3-difluoromethyl-2-fluoro-4-(4-(4-propylcyclohexyl)benzyloxy)toluene (compound expressed by the general formula (I) wherein Z is the partial structural formula (II), R$^1$ is n-propyl group, R$^2$ is methyl group, A$^1$ is cyclohexylene group, A$^2$ is 1,4-phenylene group, A$^3$, A$^4$, B$^1$, B$^1$, B$^3$ and B$^4$ are all single bonds, X is a fluorine atom, and Y is difluoromethyl group (Compound No. 202))

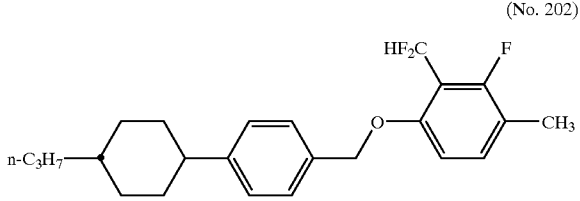

(No. 202)

A Grignard reagent prepared from 4-boromo-2-fluorotoluene (25 g, 130 mmol) and magnesium (3.5 g, 140 mmol) by a conventional method was added to a THF solution (200 ml) of trimethyl borate (30 ml, 260 mmol) at a room temperature. After further stirring a night at a room temperature, a 3M hydrochloric acid aqueous solution (100 ml) was added thereto at –20° C. or lower, and the solution was stirred at a room temperature for 2 hours. Brine (150 ml) was added to this reaction mixture, and the solution was extracted with ether (150 ml×2). The solution was dried on anhydrous magnesium sulfate and then filtered, and the solvent was distilled off under reduced pressure, followed by adding heptane (100 ml) to filter non-dissolved crystal off.

A 31% hydrogen peroxide aqueous solution (31 ml) was added to a THF solution (300 ml) of the unrefined boric acid derivative (24 g, 160 mmol) obtained above at 0° C., and the solution was stirred a day at a room temperature. A 5% sodium thiosulfate aqueous solution (50 ml) was carefully added to this reaction mixture. 3N hydrochloric acid (100 ml) was further added to the reaction solution, and then the organic layer was separated.

The aqueous layer was further extracted with toluene (200 ml), and the organic layers were put together and washed with water (200 ml), followed by drying on anhydrous magnesium sulfate.

After filtering, the solvent was distilled off under reduced pressure, and the residue was refined by distillation under reduced pressure (60° C./4.0 mm Hg) to obtain 3-fluoro-4-methylphenol 10 g (60%).

A THF solution (30 ml) of this phenol (5.0 g, 40 mmol) was added to NaH (60%, 1.7 g) immersed in THF (60 ml), and a THF solution (40 ml) of 4-(4-propyl)cyclohexylbenzyl bromide (11 g, 37 mmol) described in Example 3 was further added thereto. This reaction mixture was refluxed for 2 days, and after cooling down, the solvent was distilled off under reduced pressure. The same extraction operation as in Example 4 was carried out with a toluene-brine medium, and then recrystallization from heptane was carried out to thereby obtain 2-fluoro-4-(4-(4-propylcyclohexyl)benzyloxy)toluene. Yield: 7.2 g (53%).

This compound (7.2 g, 21 mmol), n-BuLi (8.4 ml) and DMF (1.8 ml) were used to carry out formylation by the same method as in Example 1. The product was refined by means of column -chromatography (toluene) and a recrystallization operation (heptane) to obtain 2-fluoro-3-methyl-6-(4-(4-propylcyclohexyl)benzyloxy)benzaldehyde in the form of colorless crystal. Yield: 4.5 g (58%).

This compound (3.0 g, 8.1 mmol) and DAST (2.7 ml, 20 mmol) were used to carry out fluorination by the same method as in Example 2.

The product was refined by means of column chromatography (heptane:toluene=5:1) and a recrystallization operation (ethanol) to obtain 3-difluoromethyl-2-fluoro-4-(4-(4-propylcyclohexyl)benzyloxy)toluene in the form of colorless crystal. Yield: 1.7 g (53%).

MS; 389 (M-1$^+$)

$^1$H NMR (CDCl$_3$); δ (ppm) 7.31 (d, 2H, Ph2, 6H, J=8.10 Hz), 7.23 (d, 2H, Ph$_3$, 5H, J=8.10 Hz), 7.18 (d, 1H, Tol6H, J=8.7 Hz), 7.07 (t, 1H, CF$_2$H, J$_{HF}$=53.4 Hz), 6.69 (d, 1H, Tol5H, J=8.70 Hz), 5.05 (s, 2H, CH$_2$O), 2.44–2.50 (m, 1H, CHPh), 2.21–2.22 (m, 3H, PhCH$_3$), 0.87–1.90 (m, 16H, aliphatic protons).

$^{19}$F NMR (CDCl$_3$); δ (ppm) –115.3 (dd, 2F, CF$_2$H, J$_{HF}$=56 Hz, 14 Hz), –118.7 (q, 1F, ArF, J=14 Hz).

Phase transition point: C.43.5(.N.1.7).I

EXAMPLE 6

Synthesis of 1-ethoxy-2-difluoromethyl-4-(2,3-difluoro-4-(4-propylcyclohexyl)phenyl)benzene (compound expressed by the general formula (I) wherein Z is the partial structural formula (I), $R^1$ is n-butyl group, $R^2$ is methyl group, $A^1$ is cyclohexylene group, $A^2$ is 2,3-difluoro-1,4-phenylene group, $A^3$, $A^4$, $B^1$, $B^2$, $B^3$ and $B^4$ are all single bonds, X is a hydrogen atom, and Y is difluoromethyl group (Compound No. 49))

(No. 49)

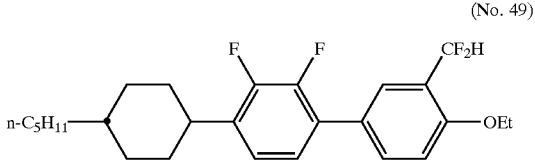

4-Butylcyclohexyl-2,3-difluorophenylboric acid synthesized by the same method as that described in WO 94/06885 was reacted with 5-bromo-2-ethoxybenzaldehyde in DMF in the presence of diethylamine and Pd(PPh$_3$)$_4$ as a catalyst according to a method described in J. Org. Chem. Soc., 49, 5237 (1984) to obtain 2-ethoxy-5-(2,3-difluoro-4-(4-propylcyclohexyl)phenyl)benzaldehyde.

The compound thus obtained was subjected to fluorination by the same method as in Example 2 to obtain 1-ethoxy-2-difluoromethyl-4-(2,3-difluoro-4-(4-propylcyclohexyl) phenyl)benzene.

MS; 436(M$^+$)

$^1$H NMR (CDCl$_3$); δ (ppm) 7.8–6.3 (m, 6H, aromatic protons, CF$_2$H), 4.10 (q, 2H, OCH$_2$, J=7.11 Hz), 2.6–3.1 (m, 1H, CHPh), 1.8–2.1 (m, 20H, aliphatic protons).

$^{19}$F NMR (CDCl$_3$); δ (ppm) –115.4 (d, 2F, CF$_2$H, J$_{HF}$=57 Hz), –144.6 s, 2F, ArF).

Phase transition point: C.54.3,.N.75.1° C.I

EXAMPLE 7

Synthesis of 3-difluoromethyl-4-(4-(4-propylcyclohexyl)-1-piperidyl)toluene (compound expressed by the general formula (I) wherein Z is the partial structural formula (VI), $R^1$ is n-propyl group, $R^2$ is methyl group, $A^1$ is cyclohexylene group, $A^2$,$A^3$, $A^4$, $B^1$, $B^2$, $B^3$ and $B^4$ are all single bonds, X is a hydrogen atom, and Y is difluoromethyl group (Compound No. 313))

(No. 313)

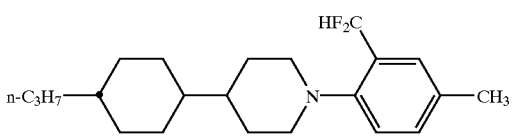

3-Chloropyridine (50 g, 440 mmol) synthesized according to a method described in Heterocycles, 35, 151 (1993) was subjected to lithiation with LDA (480 ml) and then reacted with 4-propylcyclohexanone (62 g, 440 mmol) to obtain a crude product of 1-((2-chloro)-4-pyridyl)-4-propylcyclohexanol.

Conc. sulfuric acid (22 ml) was added to this compound, and the solution was refluxed in toluene (1.3 1) while removing resulting water. After cooling down, a 2M sodium hydroxide aqueous solution (400 ml) was added thereto.

After separating the organic layer, the aqueous layer was further extracted with toluene (400 ml), and the organic layers were put together and washed with pure water (400 ml). The organic layer was dried on anhydrous magnesium sulfate and then filtered, and the solvent was distilled off under reduced pressure. The residue was refined by means of column chromatography (toluene:ethyl acetate=10:1) to obtain 3-chloro-4-(4-propyl)-1-cyclohexenyl)pyridine.

Yield: 61 g (58%).

This compound (60 g, 250 mmol) was hydrogenated in ethanol (600 ml) in the presence of sodium carbonate (27 g, 250 mmol) and 5% Pd/C (6.0 g) as a catalyst. The reaction mixture was filtered, and then the solvent was distilled off under reduced pressure.

The residue was subjected to the same extraction operation as in Example 5 with a toluene-water medium to obtain a crude product of 4-(4-propyl)cyclohexylpyridine. Then, this was refined by distillation under reduced pressure (134° C./3.8 mm Hg).

This compound (12 g, 59 mmol) was subjected to hydrogenation reaction in acetic acid (200 ml) at a hydrogen pressure of 8 kg/cm$^2$ in the presence of platinum oxide (300 ml) as a catalyst. The catalyst was filtered off, and the solvent was distilled off under reduced pressure. Then, a 10M sodium hydroxide aqueous solution (200 ml) was added thereto, and the solution was extracted with toluene (200 ml×2). The organic layer was dried on anhydrous sodium carbonate and then filtered, and the solvent was distilled off under reduced pressure to obtain 4-(4-propyl) cyclohexylpiperidine. This compound was used for a subsequent reaction as it was without being refined.

Sodium t-butoxide (3.3 g, 34 mmol) was added to a mixture of this piperidine derivative (5.0 g, 24 mmol), 4-boromotoluene (4.1 g, 24 mmol), dibenzylidene palladium (O) ((Pd$_2$(dba)$_3$) (66 mg, 0.072 mmol) and 2,2'-bis (diphenylphosphino)-1,1'-binaphthyl (BINAP) (134 mg, 0.21 mmol), and they were reacted in toluene (40 ml) at 80° C. for 3 hours under helium atmosphere. After cooling down, the reaction solution was filtered, and water (60 ml) was added thereto, followed by extracting the solution with toluene (60 ml). The organic layer was dried on anhydrous sodium sulfate and then filtered, and the solvent was distilled off under reduced pressure. The residue was refined by means of column chromatography (heptane:toluene= 1:1→toluene) to obtain 4-(4-(4-propylcyclohexyl)-1-piperidyl)-toluene in the form of colorless crystal. Yield: 3.0 g (42 ).

This compound was subjected to formylation by the same method as in Example 1. Further, it was subjected to fluorination by the same method as in Example 2 to obtain 3-difluoromethyl-4-(4-(4-propylcyclohexyl)-1-piperidyl) toluene.

EXAMPLE 8

Synthesis of 2-difluoromethyl-3-fluoro-1-ethoxy-4-(4-propylcyclohexyl)cyclohexylbenzene (compound expressed by the general formula (I) wherein Z is the partial structural formula (I), $R^1$ is n-propyl group, $R^2$ is methyl group, $A^1$ and $A^2$ are cyclohexylene groups, $A^3$, $A^4$, $B^1$, $B^2$, $B^3$ and $B^4$ are all single bonds, X is a fluorine atom, and Y is difluoromethyl group (Compound No. 25))

(No. 25)

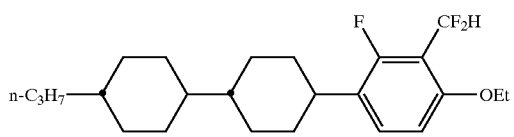

3-Fluoro-1-ethoxy-4-(4-propylcyclohexyl)-cyclohexylbenzene synthesized according to a method described in Liq. Cryst., 21, 279 (1996) and Japanese Patent Application Laid-Open No. 285271/1996 was subjected to formylation by the same method as in Example 5 to obtain 2-formyl-3-fluoro-1-ethoxy-4-(4-propylcyclohexyl) cyclohexylbenzene. This compound was subjected to fluorination by the same method as in Example 2 to obtain 2-difluoromethyl-3-fluoro-1-ethoxy-4-(4-propylcyclohexyl) cyclohexylbenzene in the form of colorless crystal.

This compound had the following spectral data and phase transition point.

MS; 369($M^+$)

$^1$H NMR (CDCl$_3$); δ ((ppm); 7.22 (t, 1H, J=8.4 Hz, aromatic 5H), 7.05 (t, 1H, CF$_2$H, $J_{H\ F}$=53.9 Hz), 6.64(d, 1H, J=8.75 Hz, aromatic 6H), 4.05(q, 2H, OCH$_2$, J=6.95 Hz), 2.7–2.8 (m, 1H, benzyl proton), 0.8–1.9 (m, 29H, aliphatic proton).

$^{19}$F NMR(CDCl$_3$); δ (ppm); −115.6 (dd, 2F, CF$_2$H, $J_{H\ F}$=54.0, 14.0 Hz), −121.9–121.8 (m, 1F)

Phase transition point: C.87.6B 93.1,.N.116.4.I

EXAMPLE 9

Synthesis of 2-difluoromethoxy-3-fluoro-1-ethoxy-4-(4-propylcyclohexyl)cyclohexylbenzene (compound expressed by the general formula (I) wherein Z is the partial structural formula (I), R$^1$ is n-propyl group, R$^2$ is methyl group, A$^1$ and A$^2$ are cyclohexylene groups, A$^3$, A$^4$, B$^1$, B$^2$, B$^3$ and B$^4$ are all single bonds, X is a fluorine atom, and Y is difluoromethoxy group (Compound No. 30))

(No. 30)

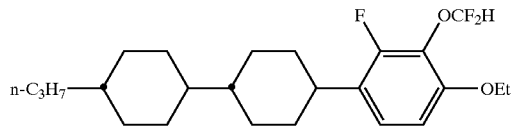

3-Fluoro-1-ethoxy-4-(4-propylcyclohexyl)-cyclohexylbenzene synthesized in Example 8 was used for a starting material to synthesize the above compound by the same method as that described in DE 4027840 A1 or the like.

Based on the descriptions in Examples 1 to 9, the following compounds No. 1 to 338 can be produced.

In the following, compounds of No. 21, 22, 25, 30, 49, 201, 202, 203 and 313 produced in Examples 1 to 9 are shown again.

| No. | R¹ | A¹—B¹—A²—B²—A³—B³ (Z = (I)) | A⁴—B⁴ | R² | X | Y |
|---|---|---|---|---|---|---|
| 1 | $C_3H_7$ | cyclohexane | — | Me | H | CHO |
| 2 | $C_3H_7$ | cyclohexane | — | Me | H | $CF_2H$ |
| 3 | $C_5H_{11}$ | cyclohexane | — | Me | H | $CF_2H$ |
| 4 | $C_3H_7$ | cyclohexane | — | $C_3H_7$ | H | $CF_2H$ |
| 5 | $C_3H_7$ | 1,3-dioxane | — | Me | H | $CF_2H$ |
| 6 | $C_5H_{11}$ | cyclohexane | — | Me | F | $CF_2H$ |
| 7 | $C_3H_7$ | cyclohexane | — | $C_3H_7$ | F | $CF_2H$ |
| 8 | $C_3H_7$ | cyclohexane | — | Me | F | $CF_2H$ |
| 9 | $C_3H_7$ | cyclohexane | — | Me | H | $CO_2H$ |
| 9 | $C_3H_7$ | cyclohexane | — | Me | H | $OCF_2H$ |

-continued

| No. | R¹ | A¹—B¹—A²—B²—A³—B³ | A⁴—B⁴ | R² | X | Y |
|---|---|---|---|---|---|---|
| 10 | $C_3H_7$ | cyclohexyl | — | Me | F | $OCF_2H$ |
| 11 | $C_5H_{11}$ | cyclohexyl | — | Me | F | $OCF_2H$ |
| 12 | 2-pentenyl | cyclohexyl | — | Me | F | $OCF_2H$ |
| 13 | $C_3H_7$ | cyclohexyl-$CO_2$- | — | Me | F | $CF_2H$ |
| 14 | $C_5H_{11}$ | cyclohexyl-$CO_2$- | — | 2-pentenyl | F | $OCF_2H$ |
| 15 | $C_3H_7$ | phenyl | — | Me | F | $CF_2H$ |
| 16 | $C_5H_{11}$ | pyrimidinyl | — | Me | F | $CF_2H$ |
| 17 | $C_3H_7$ | phenyl | — | Me | H | $OCF_2H$ |
| 18 | $C_3H_7$ | phenyl | — | Me | F | $OCF_2H$ |
| 19 | $C_3H_7$ | phenyl-C≡C- | — | $CH_2CF_3$ | F | $CF_2H$ |

-continued
| No. | R¹ | A¹—B¹—A²—B²—A³—B³ | A⁴—B⁴ | R² | X | Y |
|---|---|---|---|---|---|---|
| 20 | $C_3H_7$ | 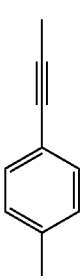 | — | Me | F | $OCF_2H$ |
| 21 | $C_3H_7$ | 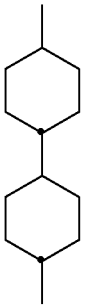 | — | Me | H | CHO |
| 22 | $C_3H_7$ | 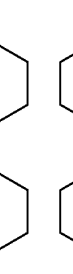 | — | Me | H | $CF_2H$ |
| 23 | $C_5H_{11}$ | 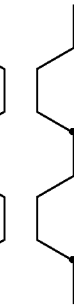 | — | Me | H | $CF_2H$ |
| 24 | $C_3H_7$ | 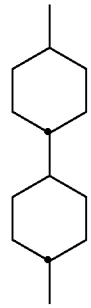 | — | $C_3H_7$ | H | $CF_2H$ |
| 25 | $C_3H_7$ | 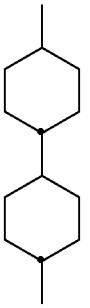 | — | Me | F | $CF_2H$ |
| 26 | $C_5H_{11}$ | 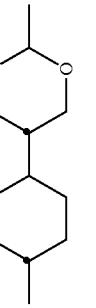 | — | Me | F | $CF_2H$ |
| 27 | $C_3H_7$ | 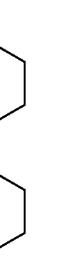 | — | $C_3H_7$ | F | $CF_2H$ |
| 28 | $C_3H_7$ |  | — | Me | H | $CO_2H$ |

| No. | R¹ | A¹—B¹—A²—B²—A³—B³ | A⁴—B⁴ | R² | X | Y |
|---|---|---|---|---|---|---|
| 29 | C₃H₇ | 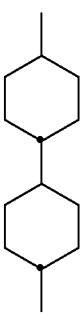 | — | Me | H | OCF₂H |
| 30 | C₃H₇ |  | — | Me | F | OCF₂H |
| 31 | C₅H₁₁ | 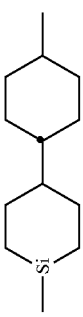 | — | Me | F | OCF₂H |
| 32 | C₅H₁₁ | 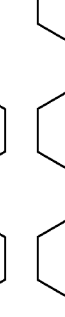 | — | Me | F | OCF₂H |
| 33 | C₃H₇ | 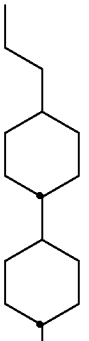 | — | Me | H | CF₂H |
| 34 | CH₂=CHCH₂CH₂— | 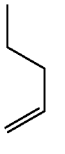 | — | Me | H | CF₂H |
| 35 | C₃H₇ | 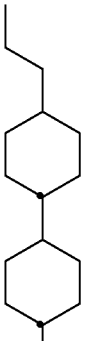 | — | Me | F | CF₂H |
| 36 | C₃H₇ | 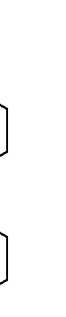 | — | Me | F | OCF₂H |
| 37 | C₃H₇ |  | — | C₃H₇ | F | OCF₂H |

-continued

| No. | R¹ | A¹—B¹—A²—B²—A³—B³ | A⁴—B⁴ | R² | X | Y |
|---|---|---|---|---|---|---|
| 38 | C₃H₇ | (cyclohexyl-CH₂CH₂-cyclohexyl) | — | Me | F | CF₂H |
| 39 | C₃H₇ | (cyclohexyl-CH₂O-cyclohexyl) | — | Me | H | CF₂H |
| 40 | CH₂CH=CHCH₂CH₃ | (cyclohexyl-CH₂O-cyclohexyl) | — | Me | H | CF₂H |
| 41 | C₃H₇ | (cyclohexyl-CH₂O-cyclohexyl) | — | Me | F | CF₂H |
| 42 | C₅H₁₁ | (cyclohexyl-CH₂O-cyclohexyl) | — | Me | F | CF₂H |
| 43 | C₃H₇ | (cyclohexyl-CH₂O-cyclohexyl) | — | Me | F | OCF₂H |
| 44 | C₃H₇ | (cyclohexyl-CH₂O-cyclohexyl) | — | C₃H₇ | F | OCF₂H |
| 45 | C₃H₇ | (cyclohexyl-CO₂-cyclohexyl) | — | Me | F | CF₂H |
| 46 | C₃H₇ | (cyclohexyl-CO₂-cyclohexyl) | — | Me | F | OCF₂H |

-continued

| No. | R¹ | A¹—B¹—A²—B²—A³—B³ | A⁴—B⁴ | R² | X | Y |
|---|---|---|---|---|---|---|
| 47 | C₃H₇ | (cyclohexyl-phenyl) | — | Me | H | CF₂H |
| 48 | C₃H₇ | (cyclohexyl-difluorophenyl) | — | Me | H | CF₂H |
| 49 | C₅H₁₁ | (cyclohexyl-difluorophenyl) | — | Me | H | CF₂H |
| 50 | C₃H₇ | (cyclohexyl-difluorophenyl) | — | Me | F | CF₂H |
| 51 | C₅H₁₁ | (cyclohexyl-difluorophenyl) | — | Me | F | CF₂H |
| 52 | C₃H₇ | (cyclohexyl-pyrimidinyl) | — | Me | H | CHO |
| 53 | C₃H₇ | (cyclohexyl-difluorophenyl) | — |  | H | OCF₂H |

-continued
| No. | R¹ | A¹—B¹—A²—B²—A³—B³ | A⁴—B⁴ | R² | X | Y |
|---|---|---|---|---|---|---|
| 54 | $C_3H_7$ | 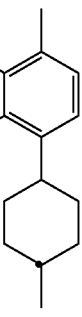 | — | Me | F | $OCF_2H$ |
| 55 | 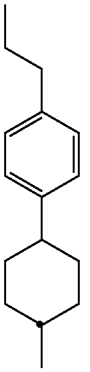 | 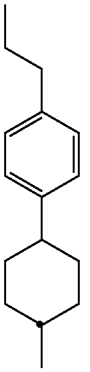 | — | Me | H | $CF_2H$ |
| 56 | $C_3H_7$ | 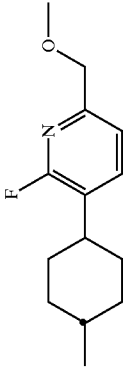 | — | Me | H | $CF_2H$ |
| 57 | $C_5H_{11}$ | 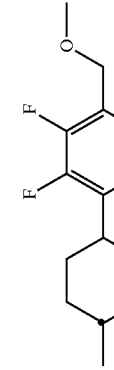 | — | Me | F | $CF_2H$ |
| 58 | $C_3H_7$ | 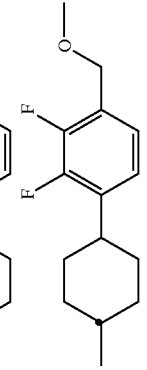 | — | Me | F | $OCF_2H$ |
| 59 | $C_3H_7$ | 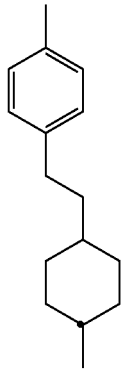 | — | Me | H | $CF_2H$ |
| 60 | $C_5H_{11}$ | 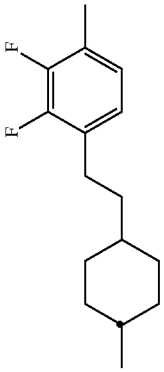 | — | Me | F | $CF_2H$ |

-continued

| No. | R¹ | A¹—B¹—A²—B²—A³—B³ | A⁴—B⁴ | R² | X | Y |
|---|---|---|---|---|---|---|
| 61 | C₃H₇ | 2-methylpyrimidine-CH₂CH₂-cyclohexyl | — | Me | F | OCF₂H |
| 62 | C₃H₇ | 4-methylphenyl-O-CH₂-cyclohexyl | — | Me | H | CF₂H |
| 63 | (2-hexenyl) | 2,3-difluoro-4-methylphenyl-O-CH₂-cyclohexyl | — | Me | F | CF₂H |
| 64 | C₃H₇ | 2,3-difluoro-4-methylphenyl-O-CH₂-cyclohexyl | — | Me | H | OCF₂H |
| 65 | C₃H₇ | 2,3-difluoro-4-methylphenyl-O-CH₂-cyclohexyl | — | Me | F | OCF₂H |
| 66 | C₃H₇ | 4-methylphenyl-CO₂-cyclohexyl | — | Me | F | CF₂H |
| 67 | C₂H₅ | 4-methylphenyl-CO₂-cyclohexyl | — | Me | F | OCF₂H |

-continued

| No. | R¹ | A¹—B¹—A²—B²—A³—B³ | A⁴—B⁴ | R² | X | Y |
|---|---|---|---|---|---|---|
| 68 | CH₂=CHCH₂CH₂— (pentenyl) | cyclohexyl-phenyl-C≡C— | — | Me | F | CF₂H |
| 69 | C₂H₅ | cyclohexyl-phenyl-C≡C— | — | Me | F | OCF₂H |
| 70 | C₃H₇ | cyclohexyl | 2,3-difluorophenyl | Me | H | CF₂H |
| 71 | C₃H₇ | cyclohexyl | 2,3-difluorophenyl | Me | F | OCF₂H |
| 72 | C₃H₇ | biphenyl | — | Me | H | CF₂H |
| 73 | C₃H₇ | biphenyl | — | Me | F | CF₂H |
| 74 | CH₂=CHCH₂CH₂— (pentenyl) | biphenyl | — | Me | F | CF₂H |
| 75 | C₃H₇ | 2,3-difluoro-biphenyl | — | Me | F | CF₂H |

-continued

| No. | R¹ | A¹—B¹—A²—B²—A³—B³ | A⁴—B⁴ | R² | X | Y |
|---|---|---|---|---|---|---|
| 76 | C₃H₇ | F,F-phenyl-Me-phenyl (biphenyl with 2,3-diF) | — | Me | F | CF₂H |
| 77 | C₃H₇ | pyrimidine-phenyl-Me | — | Me | H | OCF₂H |
| 78 | C₃H₇ | biphenyl-Me | — | Me | F | OCF₂H |
| 79 | C₃H₇ | F-biphenyl-Me | — | Me | F | OCF₂H |
| 80 | CH₂=CHCH₂CH₂— | F,F-biphenyl-Me | — | Me | F | OCF₂H |
| 81 | C₃H₇ | propyl-biphenyl-Me | — | Me | H | CF₂H |
| 82 | C₃H₇ | propyl-biphenyl-Me | — | Me | F | CF₂H |
| 83 | C₃H₇ | propyl-F,F-biphenyl-Me | — | Me | F | CF₂H |

| No. | R¹ | A¹—B¹—A²—B²—A³—B³ | A⁴—B⁴ | R² | X | Y |
|---|---|---|---|---|---|---|
| 84 | C₃H₇ | 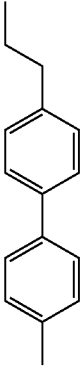 | — | Me | F | OCF₂H |
| 85 | C₃H₇ | 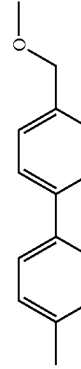 | — | Me | H | CF₂H |
| 86 |  | 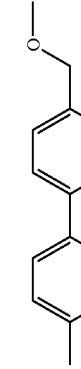 | — | Me | F | CF₂H |
| 87 | C₃H₇ | 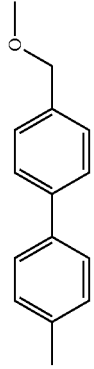 | — | Me | F | CF₂H |
| 88 | C₃H₇ | 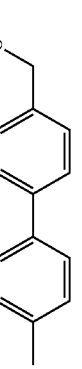 | — | Me | F | CF₂H |
| 89 | C₃H₇ | 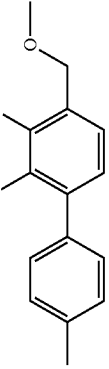 | — | Me | F | OCF₂H |
| 90 | C₃H₇ | 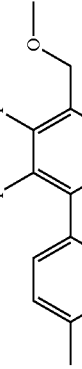 | — | Me | F | CF₂H |
| 91 | C₃H₇ | 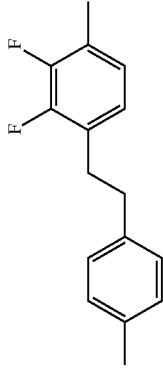 | — | Me | F | CF₂H |

-continued

| No. | R¹ | A¹—B¹—A²—B²—A³—B³ | A⁴—B⁴ | R² | X | Y |
|---|---|---|---|---|---|---|
| 92 | $C_3H_7$ | 2,3-difluoro-4-methylphenyl-CH₂CH₂-(4-methylphenyl) | — | Me | F | $OCF_2H$ |
| 93 | $C_3H_7$ | 2,3-difluoro-4-methylphenyl-O-CH₂-(4-methylphenyl) | — | Me | F | $CF_2H$ |
| 94 | $C_3H_7$ | 2,3-difluoro-4-methylphenyl-O-CH₂-(4-methylphenyl) | — | Me | F | $OCF_2H$ |
| 95 | $C_3H_7$ | (4-methylphenyl)-C≡C-(4-methylphenyl) | — | Me | H | $CF_2H$ |
| 96 | $C_3H_7$ | (4-methylphenyl)-C≡C-(4-methylphenyl) | — | Me | F | $OCF_2H$ |
| 97 | $C_3H_7$ | (4-methylphenyl)-(4-phenyl)-C≡C-(4-methylphenyl) | — | Me | F | $CF_2H$ |
| 98 | $C_3H_7$ | (4-methylphenyl)-(4-phenyl)-C≡C-(4-methylphenyl) | — | Me | H | $OCF_2H$ |
| 99 | $C_3H_7$ | (4-methylcyclohexyl)-(cyclohexyl)-(4-methylcyclohexyl) | — | Me | H | CHO |

| No. | R¹ | A¹—B¹—A²—B²—A³—B³ | A⁴—B⁴ | R² | X | Y |
|---|---|---|---|---|---|---|
| 100 | C₃H₇ | three rings | — | Me | F | CHO |
| 101 | C₃H₇ | three rings | — | Me | H | CF₂H |
| 102 | C₅H₁₁ | three rings | — | Me | F | CF₂H |
| 103 | C₃H₇ | three rings | — | C₃H₇ | F | CF₂H |
| 104 | CH₂=CHCH₂CH₂— | three rings | — | Me | F | CF₂H |
| 105 | C₃H₇ | three rings | — | Me | H | OCF₂H |
| 106 | C₅H₁₁ | three rings | — | Me | F | OCF₂H |
| 107 | C₂H₅ | three rings | — | C₃H₇ | F | OCF₂H |
| 108 | CH₂=CHCH₂CH₂— | three rings | — | Me | F | OCF₂H |
| 109 | C₃H₇ | four rings | — | Me | F | CHO |

-continued

| No. | R¹ | A¹—B¹—A²—B²—A³—B³ | A⁴—B⁴ | R² | X | Y |
|---|---|---|---|---|---|---|
| 110 | $C_3H_7$ | | — | Me | H | $CF_2H$ |
| 111 | $C_5H_{11}$ | | — | Me | F | $CF_2H$ |
| 112 | $C_3H_7$ | | — | Me | F | $OCF_2H$ |
| 113 | $C_3H_7$ | | — | Me | H | $CF_2H$ |
| 114 | $C_3H_7$ | | — | Me | F | $CF_2H$ |
| 115 | $C_5H_{11}$ | | — | Me | F | $CF_2H$ |
| 116 | $C_3H_7$ | | — | Me | H | $OCF_2H$ |
| 117 | $C_3H_7$ | | — | Me | F | $OCF_2H$ |
| 118 | $C_3H_7$ | | — | $C_3H_7$ | F | $OCF_2H$ |

-continued

| No. | R¹ | A¹—B¹—A²—B²—A³—B³ | A⁴—B⁴ | R² | X | Y |
|---|---|---|---|---|---|---|
| 119 | C₂H₅ | cyclohexyl-cyclohexyl-phenyl | — | Me | F | CF₂H |
| 120 | C₃H₇ | cyclohexyl-cyclohexyl-phenyl | — | Me | F | CF₂H |
| 121 | C₂H₅ | cyclohexyl-cyclohexyl-phenyl | — | Me | F | CF₂H |
| 122 | C₃H₇ | cyclohexyl-cyclohexyl-phenyl | — | Me | F | CF₂H |
| 123 | C₃H₇ | cyclohexyl-cyclohexyl-(2,3-difluoro)phenyl | — | Me | F | CF₂H |
| 124 | C₃H₇ | cyclohexyl-cyclohexyl-(2,3-difluoro)phenyl | — | Me | F | OCF₂H |
| 125 | C₃H₇ | cyclohexyl-cyclohexyl-phenyl-propyl | — | Me | F | OCF₂H |
| 126 | C₂H₅ | cyclohexyl-cyclohexyl-phenyl-OMe | — | Me | F | CF₂H |
| 127 | C₃H₇ | cyclohexyl-cyclohexyl-phenyl-OMe | — | Me | F | CF₂H |

-continued

| No. | $R^1$ | $A^1$—$B^1$—$A^2$—$B^2$—$A^3$—$B^3$ | $A^4$—$B^4$ | $R^2$ | X | Y |
|---|---|---|---|---|---|---|
| 128 | $C_5H_{11}$ | Cy-Cy-CH$_2$O-Ph | — | Me | F | OCF$_2$H |
| 129 | $C_3H_7$ | Cy-Cy-CH$_2$CH$_2$-Ph | — | Me | F | CF$_2$H |
| 130 | $C_3H_7$ | Cy-Cy-CH$_2$CH$_2$-Ph(2,3-F$_2$) | — | Me | F | OCF$_2$H |
| 131 | $C_2H_5$ | Cy-Cy-CH$_2$O-Ph | — | Me | F | CF$_2$H |
| 132 | $C_3H_7$ | Cy-Cy-CH$_2$O-Ph | — | Me | F | OCF$_2$H |
| 133 | $C_3H_7$ | Cy-Cy-CH$_2$O-Ph(2,3-F$_2$) | — | Me | F | CF$_2$H |

-continued

| No. | R¹ | A¹—B¹—A²—B²—A³—B³ | A⁴—B⁴ | R² | X | Y |
|---|---|---|---|---|---|---|
| 134 | C₃H₇ | (cyclohexyl-cyclohexyl-CH₂O-2,3-difluorophenyl) | — | Me | F | OCF₂H |
| 135 | C₃H₇ | (cyclohexyl-cyclohexyl-phenyl-CO₂-) | — | Me | H | CF₂H |
| 136 | C₃H₇ | (cyclohexyl-cyclohexyl-2,3-difluorophenyl-CO₂-) | — | Me | H | CF₂H |
| 137 | C₃H₇ | (cyclohexyl-cyclohexyl-phenyl-C≡C-) | — | Me | F | CF₂H |
| 138 | (pentenyl) | (cyclohexyl-phenyl-phenyl-) | — | Me | F | CF₂H |
| 139 | C₃H₇ | (cyclohexyl-phenyl-phenyl-) | — | Me | F | CF₂H |
| 140 | C₃H₇ | (cyclohexyl-phenyl-phenyl-) | — | Me | F | OCF₂H |
| 141 | C₃H₇ | (cyclohexyl-phenyl-2,3-difluorophenyl-) | — | Me | F | CF₂H |

| No. | R¹ | A¹—B¹—A²—B²—A³—B³ | A⁴—B⁴ | R² | X | Y |
|---|---|---|---|---|---|---|
| 142 | C₃H₇ | (cyclohexyl-phenyl-2,3-difluoro-4-methylphenyl) | — | Me | F | OCF₂H |
| 143 | C₃H₇ | (cyclohexyl-2,3-difluorophenyl-4-methylphenyl) | — | Me | F | CF₂H |
| 144 | C₃H₇ | (cyclohexyl-2,3-difluorophenyl-4-methylphenyl) | — | Me | F | OCF₂H |
| 145 | C₃H₇ | (cyclohexyl-phenyl-4-methoxymethylphenyl) | — | Me | F | CF₂H |
| 146 | C₃H₇ | (cyclohexyl-phenyl-4-methoxymethylphenyl) | — | Me | F | OCF₂H |
| 147 | C₃H₇ | (cyclohexyl-phenyl-2-fluoro-5-methoxymethylpyridyl) | — | Me | F | CF₂H |
| 148 | C₃H₇ | (cyclohexyl-phenyl-2,3-difluoro-4-methoxymethylphenyl) | — | Me | F | OCF₂H |

-continued

| No. | R¹ | A¹—B¹—A²—B²—A³—B³ | A⁴—B⁴ | R² | X | Y |
|---|---|---|---|---|---|---|
| 149 | C₃H₇ | (cyclohexyl-phenyl-CH₂CH₂-phenyl-Me) | — | Me | F | CF₂H |
| 150 | C₃H₇ | (cyclohexyl-phenyl-O-(2,3-difluoro-4-methylphenyl)) | — | Me | F | CF₂H |
| 151 | C₃H₇ | (cyclohexyl-phenyl-CH₂O-(2,3-difluoro-4-methylphenyl)) | — | Me | F | OCF₂H |
| 152 | C₃H₇ | (cyclohexyl-phenyl-C≡C-phenyl-Me) | — | Me | F | CF₂H |
| 153 | C₃H₇ | (cyclohexyl-phenyl-C≡C-(2,3-difluoro-4-methylphenyl)) | — | Me | F | CF₂H |
| 154 | C₃H₇ | (cyclohexyl-phenyl-C≡C-phenyl-Me) | — | Me | F | OCF₂H |
| 155 | C₃H₇ | (cyclohexyl-phenyl-C≡C-(2,3-difluoro-4-methylphenyl)) | — | | F | OCF₂H |

-continued

| No. | R¹ | A¹—B¹—A²—B²—A³—B³ | A⁴—B⁴ | R² | X | Y |
|---|---|---|---|---|---|---|
| 156 | C₃H₇ | [phenyl-phenyl-phenyl] | — | Me | H | CF₂H |
| 157 | C₃H₇ | [phenyl-phenyl-phenyl] | — | Me | F | CF₂H |
| 158 | C₃H₇ | [phenyl-phenyl-pyrimidinyl] | — | Me | F | CF₂H |
| 159 | C₃H₇ | [phenyl-phenyl-fluoropyridinyl] | — | Me | F | OCF₂H |
| 160 | C₃H₇ | [phenyl-phenyl-phenyl] | — | Me | F | OCF₂H |
| 161 | CH₂=CHCH₂CH₂CH₂– | [phenyl-phenyl-difluorophenyl] | — | Me | F | CF₂H |
| 162 | C₃H₇ | [phenyl-phenyl-difluorophenyl] | — | Me | F | CF₂H |
| 163 | C₃H₇ | [phenyl-phenyl-difluorophenyl] | — |  | F | OCF₂H |

| No. | R¹ | A¹—B¹—A²—B²—A³—B³ | A⁴—B⁴ | R² | X | Y |
|---|---|---|---|---|---|---|
| 164 | C₃H₇ | (three-ring biphenyl-alkyne-phenyl) | — | Me | F | CF₂H |
| 165 | C₃H₇ | (three-ring phenyl-alkyne-biphenyl) Z = (II) | — | Me | F | CF₂H |
| 166 | C₃H₇ | cyclohexyl | — | C₃H₇ | H | CHO |
| 167 | C₃H₇ | cyclohexyl | — | C₃H₇ | F | CF₂H |
| 168 | C₅H₁₁ | cyclohexyl | — | C₃H₇ | F | CF₂H |
| 169 | C₅H₁₁ | cyclohexyl | — | C₂H₅ | F | CF₂H |
| 170 | C₃H₇ | cyclohexyl | — | C₃H₇ | F | CF₂H |
| 171 | C₃H₇ | cyclohexyl | — | C₃H₇ | H | CO₂H |
| 172 | C₅H₁₁ | cyclohexyl | — | C₃H₇ | F | OCF₂H |

-continued
| No. | R¹ | A¹—B¹—A²—B²—A³—B³ | A⁴—B⁴ | R² | X | Y |
|---|---|---|---|---|---|---|
| 173 | $C_3H_7$ |  | —OCH₂— | $C_3H_7$ | F | $CF_2H$ |
| 174 | $C_5H_{11}$ | 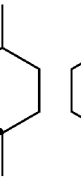 | —OCH₂— | $C_3H_7$ | F | $OCF_2H$ |
| 175 | $C_3H_7$ | 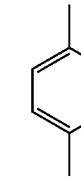 | —OCO— | $C_3H_7$ | F | $CF_2H$ |
| 176 | $C_3H_7$ | 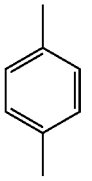 | — | $C_3H_7$ | H | CHO |
| 177 | $C_3H_7$ | 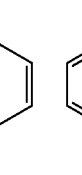 | — | $C_3H_7$ | F | $CF_2H$ |
| 178 | $C_3H_7$ | 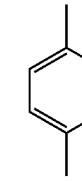 | — | $C_3H_7$ | F | $CF_2H$ |
| 179 | $C_3H_7$ | 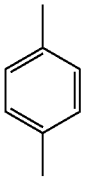 | — | $C_3H_7$ | H | $CO_2H$ |
| 180 | $C_5H_{11}$ | 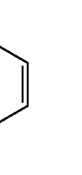 | — | $C_3H_7$ | F | $OCF_2H$ |
| 181 | $C_3H_7$ |  | —OCH₂— | $C_3H_7$ | F | $CF_2H$ |
| 182 | $C_5H_{11}$ |  | —OCH₂— | $C_3H_7$ | F | $OCF_2H$ |

-continued
| No. | R¹ | A¹—B¹—A²—B²—A³—B³ | A⁴—B⁴ | R² | X | Y |
|---|---|---|---|---|---|---|
| 183 | $C_3H_7$ | 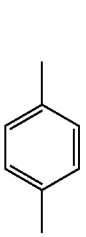 | —OCO— | $C_3H_7$ | F | $CF_2H$ |
| 184 | $C_3H_7$ | 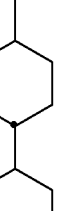 | — | Me | H | $CF_2H$ |
| 185 | $C_3H_7$ | 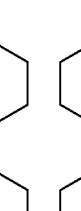 | — | $C_3H_7$ | H | $CF_2H$ |
| 186 | $C_5H_{11}$ | 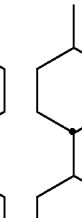 | — | Me | H | $CF_2H$ |
| 187 | $C_3H_7$ | 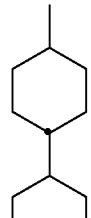 | — | Me | F | $CF_2H$ |
| 188 | $C_3H_7$ | 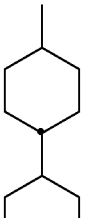 | — | $C_3H_7$ | F | $CF_2H$ |
| 189 | $C_5H_{11}$ | 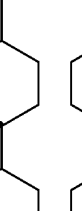 | — | Me | F | $CF_2H$ |
| 190 | $C_3H_7$ | 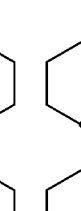 | — | Me | H | $OCF_2H$ |
| 191 | $C_3H_7$ |  | — | Et | H | $OCF_2H$ |
| 192 | $C_3H_7$ |  | — | Et | F | $OCF_2H$ |

| No. | R¹ | A¹—B¹—A²—B²—A³—B³ | A⁴—B⁴ | R² | X | Y |
|---|---|---|---|---|---|---|
| 193 | $C_5H_{11}$ | Cy-Cy | — | Me | F | $OCF_2H$ |
| 194 | $C_3H_7$ | Cy-Cy | —OCH$_2$— | Me | H | $CF_2H$ |
| 195 | $C_5H_{11}$ | Cy-Cy | —OCH$_2$— | Me | F | $CF_2H$ |
| 196 | $C_3H_7$ | Cy-Cy | —OCH$_2$— | Me | H | $OCF_2H$ |
| 197 | $C_3H_7$ | Cy-Cy | —OCH$_2$— | Me | F | $OCF_2H$ |
| 198 | $C_3H_7$ | Cy-Cy | —OCO— | Et | F | $CF_2H$ |
| 199 | $C_5H_{11}$ | Cy | Cy | OEt | F | $CF_2H$ |
| 200 | $C_3H_7$ | Cy | Cy | OEt | F | $OCF_2H$ |
| 201 | $C_3H_7$ | Cy-Ph | — | Me | H | $CF_2H$ |
| 202 | $C_3H_7$ | Cy-Ph | — | Me | F | $CF_2H$ |

-continued

| No. | R¹ | A¹—B¹—A²—B²—A³—B³ | A⁴—B⁴ | R² | X | Y |
|---|---|---|---|---|---|---|
| 203 | C₃H₇ | cyclohexyl-phenyl | — | Me | H | $CO_2H$ |
| 204 | C₃H₇ | cyclohexyl-phenyl | — | Me | H | $OCF_2H$ |
| 205 | C₃H₇ | cyclohexyl-pyrimidinyl | — | Et | F | $OCF_2H$ |
| 206 | C₃H₇ | cyclohexyl-phenyl | —OCH₂— | H | F | $CF_2H$ |
| 207 | C₃H₇ | cyclohexyl-phenyl | —OCH₂— | Me | F | $OCF_2H$ |
| 208 | C₃H₇ | cyclohexyl-(2,3-difluorophenyl) | — | Et | F | $CF_2H$ |
| 209 | C₃H₇ | cyclohexyl-(2,3-difluorophenyl) | — | Et | F | $OCF_2H$ |
| 210 | C₃H₇ | cyclohexyl | 2,3-difluorophenyl | OEt | F | $CF_2H$ |

| No. | R¹ | A¹—B¹—A²—B²—A³—B³ | A⁴—B⁴ | R² | X | Y |
|---|---|---|---|---|---|---|
| 211 | C₃H₇ | cyclohexyl | 2,3-difluoro-phenyl | OC₃H₇ | F | OCF₂H |
| 212 | C₃H₇ | biphenyl | — | Et | F | CF₂H |
| 213 | pentenyl | biphenyl | — | Et | F | OCF₂H |
| 214 | C₃H₇ | 2,3-difluoro-biphenyl | — | Et | F | CF₂H |
| 215 | C₃H₇ | 2,3-difluoro-biphenyl | — | C₃H₇ | F | OCF₂H |
| 216 | C₃H₇ | 2,3-difluoro-biphenyl | —OCH₂— | Et | F | CF₂H |
| 217 | C₃H₇ | bicyclohexyl | — | Et | H | OCF₂H |
| 218 | C₃H₇ | bicyclohexyl | — | Et | F | CF₂H |

| No. | R¹ | A¹—B¹—A²—B²—A³—B³ | A⁴—B⁴ | R² | X | Y |
|---|---|---|---|---|---|---|
| 219 | C₃H₇ | Cy-Cy-Cy | — | Et | H | OCF₂H |
| 220 | C₃H₇ | Cy-Cy-Cy | — | Me | F | OCF₂H |
| 221 | C₃H₇ | Cy-Cy-Cy | —OCH₂— | Me | F | CF₂H |
| 222 | C₃H₇ | Cy-Cy-Cy | —OCH₂— | Me | F | OCF₂H |
| 223 | C₃H₇ | Cy-Cy | Cy | Et | F | CF₂H |
| 224 | C₃H₇ | Cy-Cy | Cy | Et | F | OCF₂H |
| 225 | C₃H₇ | Cy-Cy-Ph | — | Et | F | CF₂H |
| 226 | C₃H₇ | Cy-Cy-Ph | —OCH₂— | Me | F | CF₂H |
| 227 | C₃H₇ | Cy-Cy-Ph | —OCH₂— | Me | F | OCF₂H |

| No. | R¹ | A¹—B¹—A²—B²—A³—B³ | A⁴—B⁴ | R² | X | Y |
|---|---|---|---|---|---|---|
| 228 | C₃H₇ | cyclohexyl-cyclohexyl-(2,3-difluoro-4-methylphenyl) | —OCH₂— | Me | F | CF₂H |
| 229 | C₃H₇ | cyclohexyl-cyclohexyl-(2,3-difluoro-4-methylphenyl) | —OCH₂— | Me | F | OCF₂H |
| 230 | C₃H₇ | cyclohexyl-cyclohexyl | 4-methylphenyl | Et | H | CF₂H |
| 231 | C₃H₇ | cyclohexyl-cyclohexyl | 2,3-difluoro-4-methylphenyl | Et | F | CF₂H |
| 232 | C₃H₁₁ | cyclohexyl-cyclohexyl | 2,3-difluoro-4-methylphenyl | Me | F | OCF₂H |
| 233 | C₃H₇ | cyclohexyl-cyclohexyl | 2,3-difluoro-4-methylphenyl | OEt | F | CF₂H |
| 234 | C₂H₅ | cyclohexyl-cyclohexyl | 2,3-difluoro-4-methylphenyl | OEt | F | OCF₂H |

-continued

| No. | R¹ | A¹—B¹—A²—B²—A³—B³ | A⁴—B⁴ | R² | X | Y |
|---|---|---|---|---|---|---|
| 235 | C₃H₇ | [cyclohexyl-difluorophenyl] | [cyclohexyl] | C₃H₇ | F | CF₂H |
| 236 | C₃H₇ | [cyclohexyl-phenyl] | [cyclohexyl] | Et | F | OCF₂H |
| 237 | C₃H₇ | [cyclohexyl-phenyl-phenyl] | —CH₂— | Et | F | CF₂H |
| 238 | C₃H₇ | [cyclohexyl-phenyl-difluorophenyl] | —OCH₂— | Me | F | CF₂H |
| 239 | C₃H₇ | [cyclohexyl-phenyl-difluorophenyl] | —OCH₂— | Me | F | OCF₂H |
| 240 | C₃H₇ | [cyclohexyl-phenyl-C≡C-phenyl] | —OCH₂— | Me | F | CF₂H |
| 241 | C₃H₇ | [cyclohexyl-phenyl-C≡C-phenyl] | —OCH₂— | Me | F | OCF₂H |
| 242 | C₃H₇ | [phenyl-phenyl-phenyl] | —CH₂— | Et | F | CF₂H |

-continued

| No. | R¹ | A¹—B¹—A²—B²—A³—B³ | A⁴—B⁴ | R² | X | Y |
|---|---|---|---|---|---|---|
| 243 | C₃H₇ | [2,3-difluoro-4-methyl biphenyl] | —OCH₂— | Me | F | CF₂H |
| 244 | C₃H₇ | [2,3-difluoro-4-methyl biphenyl] | —OCH₂— | Me | F | OCF₂H |
| 245 | C₃H₇ | [4-methylphenyl-C≡C-biphenyl], Z=(III) | —OCH₂— | Me | F | CF₂H |
| 246 | C₃H₇ | cyclohexyl | — | Me | F | CF₂H |
| 247 | C₅H₁₁ | cyclohexyl | — | Me | F | CF₂H |
| 248 | C₃H₇ | cyclohexyl | — | Me | F | OCF₂H |
| 249 | C₅H₁₁ | phenyl | — | Me | F | CF₂H |
| 250 | C₃H₇ | phenyl | — | C₃H₇ | H | OCF₂H |
| 251 | C₃H₇ | bicyclohexyl | — | Me | H | CF₂H |

-continued

| No. | R¹ | A¹—B¹—A²—B²—A³—B³ | A⁴—B⁴ | R² | X | Y |
|---|---|---|---|---|---|---|
| 252 | C₃H₇ | Cy-Cy | — | Me | F | CF₂H |
| 253 | C₃H₇ | Cy-Cy | — | C₃H₇ | F | CF₂H |
| 254 | C₃H₇ | Cy-Diox | — | C₃H₇ | F | CF₂H |
| 255 | C₃H₇ | Cy-Cy | — | Me | F | OCF₂H |
| 256 | C₃H₇ | Cy-Cy(CO₂) | — | Me | F | OCF₂H |
| 257 | CH=CHCH₂CH₃ (pentenyl) | Cy-Ph | — | Me | F | CF₂H |
| 258 | C₃H₇ | Cy-Ph | — | Me | H | CF₂H |
| 259 | C₃H₇ | Cy-Ph | — | Me | F | OCF₂H |
| 260 | C₃H₇ | Cy-Ph | — | C₃H₇ | F | OCF₂H |

-continued

| No. | R¹ | A¹—B¹—A²—B²—A³—B³ | A⁴—B⁴ | R² | X | Y |
|---|---|---|---|---|---|---|
| 261 | C₃H₇ | Cy-Ph-C≡C- | — | Me | F | CF₂H |
| 262 | C₃H₇ | Ph-Ph- | — | Me | F | CF₂H |
| 263 | C₃H₇ | Ph-Ph- | — | Me | F | OCF₂H |
| 264 | C₃H₇ | Cy-Cy-Ph- | — | Me | H | CF₂H |
| 265 | C₃H₇ | Cy-Cy-Ph- | — | Me | F | CF₂H |
| 266 | C₃H₇ | Cy-Cy-Ph- | — | Me | F | OCF₂H |
| 267 | C₃H₇ | Cy-Ph-Ph- | — | C₃H₇ | F | CF₂H |
| 268 | C₃H₇ | Cy-Ph-Ph- | — | Me | F | CF₂H |
| 269 | C₃H₇ | Cy-Cy-CH₂CH₂-Ph- | — | Me | F | OCF₂H |

-continued

| No. | R¹ | A¹—B¹—A²—B²—A³—B³ | A⁴—B⁴ | R² | X | Y |
|---|---|---|---|---|---|---|
| 270 | C₃H₇ | Cy-Cy-Cy | — | Me | H | CF₂H |
| 271 | C₃H₇ | Cy-Cy-Cy | — | Me | F | CH |
| 272 | C₃H₇ | Cy-Cy-Cy | — | Me | F | OCF₂H |
| 273 | C₃H₇ | Cy-Cy-Ph | — | C₃H₇ | F | CF₂H |
| 274 | C₃H₇ | Cy-Cy-Ph | — | Me | F | CCF₂H |
| 275 | C₃H₇ | Cy-Cy-Ph(F,F) | — | Me | F | CF₂H |
| 276 | C₃H₇ | Cy-Cy-Ph(F,F) | — | Me | F | OCF₂H |
| 277 | C₃H₇ | Cy-Cy-CH₂CH₂-Ph | — | Me | F | CF₂H |

| No. | R¹ | A¹—B¹—A²—B²—A³—B³ | A⁴—B⁴ | R² | X | Y |
|---|---|---|---|---|---|---|
| 278 | C₃H₇ | 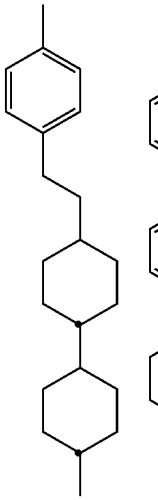 | — | Me | F | OCF₂H |
| 279 | C₃H₇ | 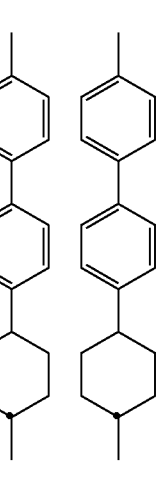 | — | C₃H₇ | F | CF₂H |
| 280 | C₃H₇ | 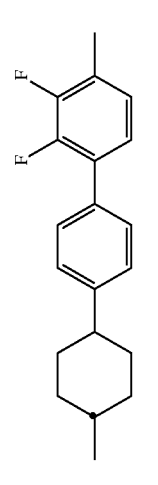 | — | Me | F | OCF₂H |
| 281 | C₃H₇ | 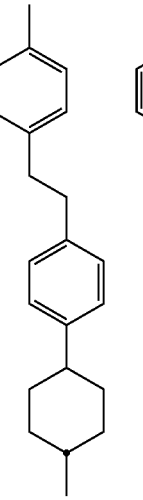 | — | C₃H₇ | F | CF₂H |
| 282 | C₃H₇ | 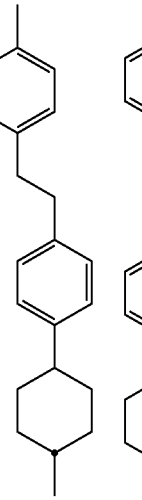 | — | Me | F | CF₂H |
| 283 | C₃H₇ | 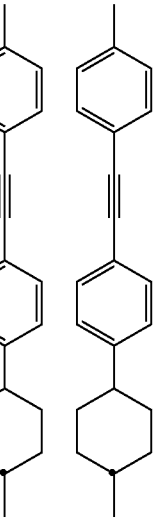 | — | Me | F | OCF₂H |
| 284 | C₃H₇ |  | — | Me | F | CF₂H |
| 285 | C₃H₇ |  | — | Me | F | OCF₂H |

-continued

| No. | R¹ | A¹—B¹—A²—B²—A³—B³ | A⁴—B⁴ | R² | X | Y |
|---|---|---|---|---|---|---|
| 286 | C₃H₇ | three phenyl rings | — | C₃H₇ | F | CF₂H |
| 287 | C₃H₇ | three phenyl rings | — | Me | F | OCF₂H |
| 288 | C₃H₇ | phenyl–C≡C–phenyl–phenyl | — | Me | F | CF₂H |
| 289 | C₃H₇ | phenyl–C≡C–phenyl–phenyl | — | Me | F | OCF₂H |
| | | Z = (IV) | | | | |
| 290 | C₅H₁₁ | cyclohexyl–phenyl | | C₃H₇ | F | CF₂H |
| 291 | C₃H₇ | cyclohexyl–phenyl | | C₂H₇ | F | OCF₂H |
| 292 | C₅H₁₁ | phenyl–phenyl | | Me | F | CF₂H |
| 293 | C₃H₇ | phenyl–phenyl | | C₃H₇ | F | OCF₂H |
| 294 | C₃H₇ | cyclohexyl–cyclohexyl | | Me | F | CF₂H |

-continued

| No. | R¹ | A¹—B¹—A²—B²—A³—B³ | A⁴—B⁴ | R² | X | Y |
|---|---|---|---|---|---|---|
| 295 | C₃H₇ | Cy-Cy | — | C₃H₇ | F | CF₂H |
| 296 | C₃H₇ | Cy-Ph | — | Me | F | CF₂H |
| 297 | C₃H₇ | Cy-Ph | — | Me | F | OCF₂H |
| 298 | C₃H₇ | Cy-Cy-Cy | — | Me | H | CF₂H |
| 299 | C₃H₇ | Cy-Cy-Cy | — | Me | F | OCF₂H |
| 300 | C₃H₇ | Cy-Cy-Ph | — | Me | F | CF₂H |
| 301 | C₃H₇ | Cy-Cy-Ph | — | Me | F | OCF₂H |
| 302 | C₃H₇ | Cy-Ph-Ph | — | Me | F | CF₂H |
| 303 | C₃H₇ | Cy-Ph-Ph | — | Me | F | OCF₂H |
| 304 | C₃H₇ | Cy-Ph | Cy | C₃H₇ | F | CF₂H |

-continued
| No. | R¹ | A¹—B¹—A²—B²—A³—B³ | A⁴—B⁴ | R² | X | Y |
|---|---|---|---|---|---|---|
| 305 | C₃H₇ | 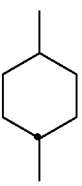 | 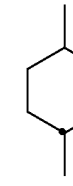 | Me | F | OCF₂H |
| 306 | C₃H₇ |  |  | C₃H₇ | F | CF₂H |
| 307 | C₃H₇ | 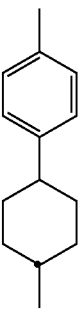 | 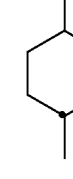 | Me | F | OCF₂H |
| | | Z = (V) | | | | |
| 308 | C₃H₇ | — | — | Me | H | CF₂H |
| 309 | C₃H₇ | — | —OCH₂— | C₃H₇ | H | OCF₂H |
| 310 | C₃H₇ | — | —OCH₂— | Et | H | CF₂H |
| 312 | C₃H₇ | — | — | C₃H₇ | H | OCF₂H |
| 313 | C₃H₇ |  | — | Me | H | CF₂H |
| 314 | C₅H₁₁ | 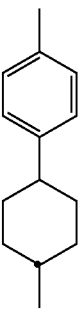 | — | Me | H | OCF₂H |
| 315 | C₃H₇ |  | — | Me | F | CF₂H |
| 316 | C₅H₁₁ | 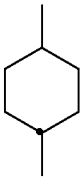 | — | Me | F | OCF₂H |
| 317 | C₃H₇ | 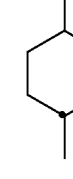 | —OCH₂— | Et | F | CF₂H |

-continued

| No. | R¹ | A¹—B¹—A²—B²—A³—B³ | A⁴—B⁴ | R² | X | Y |
|---|---|---|---|---|---|---|
| 318 | C₅H₁₁ | cyclohexyl | —OCH₂— | Et | F | OCF₂H |
| 319 | C₃H₇ | cyclohexyl | —OCH₂— | Et | F | CF₂H |
| 320 | C₅H₁₁ | cyclohexyl | —OCH₂— | Et | F | OCF₂H |
| 321 | C₃H₇ | — | 2,3-difluorophenyl | Me | F | CF₂H |
| 322 | C₃H₇ | — | 2,3-difluorophenyl | OEt | F | CF₂H |
| 323 | C₃H₇ | — | 2,3-difluorophenyl | C₃H₇ | F | OCF₂H |
| 324 | C₃H₇ | — | 2,3-difluorophenyl | OEt | F | OCF₂H |
| 325 | C₃H₇ | bicyclohexyl | — | C₃H₇ | F | CF₂H |

-continued

| No. | R¹ | A¹—B¹—A²—B²—A³—B³ | A⁴—B⁴ | R² | X | Y |
|---|---|---|---|---|---|---|
| 326 | C₅H₁₁ | Cy-Cy | — | C₃H₇ | F | OCF₂H |
| 327 | C₃H₇ | Cy-Cy | — | OEt | F | CF₂H |
| 328 | C₅H₁₁ | Cy-Cy | — | OEt | F | OCF₂H |
| 329 | C₃H₇ | Cy | Ph | Me | F | CF₂H |
| 330 | C₃H₇ | Cy | Ph | Me | F | OCF₂H |
| 331 | C₃H₇ | Cy | Ph(2,3-F₂) | Me | F | CF₂H |
| 332 | C₅H₁₁ | Cy | Ph(2,3-F₂) | Me | F | OCF₂H |
| 333 | C₃H₇ | Cy | — | Me | F | CF₂H |
| 334 | C₅H₁₁ | Cy | — | Me | F | OCF₂H |

Z = (VI)

-continued

| No. | R¹ | A¹—B¹—A²—B²—A³—B³ | A⁴—B⁴ | R² | X | Y |
|---|---|---|---|---|---|---|
| 335 | $C_2H_5O$ | 4,4'-biphenyl | — | $C_3H_7$ | F | $CF_2H$ |
| 336 | $C_2H_5O$ | 4,4'-biphenyl | — | $C_3H_7$ | F | $OCF_2H$ |
| 337 | $C_2H_5O$ | 2,3-difluoro-4,4'-biphenyl | — | $C_3H_7$ | F | $CF_2H$ |
| 338 | $C_2H_5O$ | 2,3-difluoro-4,4'-biphenyl | — | $C_3H_7$ | F | $OCF_2H$ |

EXAMPLE 10

Synthesis of 3-difluoromethyl-1-ethoxy-2-fluoro-4-(4-(4pentylcyclohexyl)cyclohexyl)methyloxybenzene (compound expressed by the general formula (I) wherein Z is the partial structural formula (II), $R^1$ is n-pentyl group, $R^2$ is methyl group, $A^1$ and $A^2$ are cyclohexylene groups, $A^3$, $A^4$, $B^1$, $B^2$ and $B^3$ are all single bonds, $B^4$ is oxymethylene, X is a fluorine atom, and Y is difluoromethoxy group (Compound No. 195))

1-Iodomethyl-4-(4-pentylcyclohexyl)cyclohexane (9.8 g, 26 mmol) was reacted with 4-ethoxy-3-fluorophenol (3.7 g, 24 mmol) in THF (60 ml) in the presence of NaH (ca. 24 mmol) used as a base. After treatment was carried out by the same method as in Example 3 to obtain 1-ethoxy-2-fluoro-4-(4-(4-pentylcyclohexyl)cyclohexyl)methyloxybenzene (yield: 39%).

Formylation was carried out in the same manner as in Example 5, except that this compound was used in place of 2-fluoro-4-(4-(4-propylcyclohexyl)benzyloxy)toluene (yield: 46%).

This compound was fluorinated in the same manner as in Example 2 by adding DAST and refined by means of column chromatography (heptane:toluene=1:1) and a recrystallization operation (heptane) to thereby obtain the objective compound in the form of colorless crystal (yield: 90%).

MS; 454($M^+$)

$^1$H NMR (CDCl$_3$); δ (ppm) 7.02 (t, 1H, CF$_2$H, J=53.7 Hz), 6.99 (t, 1H, aromatic6H, J=9.05 Hz), 6.57 (d, 1H, aromatic5H, J=9.05 Hz), 4.05 (q, 2H, OCH$_2$Me, J=7.00 Hz), 3.74 (2H, OCH2, J=6.25 Hz), 1.8–2.1 (m, 31H, aliphatic protons).

$^{19}$F NMR (CDCl$_3$); δ (ppm) −115.5 (dd, 2F, CF$_2$H, J=51.7, 14 Hz), −135.3 (q, 1F,ArF, J=14 Hz).

Phase transition point: C.85.3.N.115.4° C.I

EXAMPLE 11

Use Example 1

Nematic liquid crystal composition comprising the following components (hereinafter referred to as a liquid crystal composition A1) was prepared:

4-Ethoxyphenyl 4-propylcyclohexanecarboxylate 17.2% by weight
4-Butoxyphenyl 4-propylcyclohexanecarboxylate 27.6% by weight
4-Ethoxyphenyl 4-butylcyclohexanecarboxylate 20.7% by weight
4-Methoxyphenyl 4-pentylcyclohexanecarboxylate 20.7% by weight
4-Ethoxyphenyl 4-pentylcyclohexanecarboxylate 13.8% by weight.

This liquid crystal composition A1 has the following characteristics:

Clearing point (CP): 74.0° C., Δε: −1.3, Δn: 0.887 and viscosity ($η_{20}$) at 20° C.: 18.9 mPa·s.

This liquid crystal composition A1 of 95 parts by weight was mixed with 5 parts by weight of 2-ethoxy-5-(4-propylcyclohexyl)cyclohexylbenzaldehyde (Compound No. 21) obtained in Example 1 to prepare a liquid crystal composition B1. This liquid crystal composition B1 had the following physical properties:

CP: 76.8° C., Δε: −1.70, Δn: 0.088 and $η_{20}$: 22.1 mPa·s.

EXAMPLE 12

Use Example 2

The liquid crystal composition A1 of 85 parts by weight used in Example 11 was mixed with 15 parts by weight of 2-difluoromethyl-1-ethoxy-4-(4-propylcyclohexyl)cyclohexylbenzene (Compound No. 22) obtained in Example 2 to prepare a liquid crystal composition B2.

This liquid crystal composition B2 had the following physical properties:

CP: 76.5° C., Δε: −1.82, Δn: 0.086 and $η_{20}$: 26.7 mPa·s.

Further, this composition was allowed to stand in a freezer of −20° C. for 30 days, but deposition of crystals and appearance of smectic phase were not observed either.

EXAMPLE 13 to 17

Use Examples 3 to 7

A liquid crystal composition B3, B5, B6, B8 and B10 were each prepared in the same manner as in Example 12, except that the compound of No. 201, 202, 49, 25, or 195 obtained in Example 3, 5, 8, or 10, respectively, was used in place of the compound of No. 22. These liquid crystal compositions had the following physical properties:

Liquid Crystal Composition B3

EXAMPLE 13

CP: 64.6° C., Δε: −1.61, Δn: 0.088 and $η_{20}$: 26.8 mPa·s.
Liquid Crystal Composition B5

EXAMPLE 14

CP: 65.9° C., Δε: −2.16, Δn: 0.089 and $η_{20}$: 29.1 mPa·s.
Liquid Crystal Composition B6

EXAMPLE 15

CP: 65.7° C., Δε: −2.03, Δn: 0.089 and $η_{20}$: 29.1 mPa·s.
Liquid Crystal Composition B8

EXAMPLE 16

CP: 78.4° C., Δε: −2.40, Δn: 0.087 and $η_{20}$: 32.3 mPa·s.
Liquid Crystal Composition B10

Example 17

CP: 79.1° C., Δε: −2.46, Δn: 0.087 and $η_{20}$: 29.7 mPa·s.

Further, these compositions were allowed to stand in a freezer of −20° C. for 30 days, but deposition of crystals and appearance of smectic phase were not observed either.

Comparative Example 1

The compounds of No. 22, 201, 202, 25, and 19 were selected as the representative examples of the compound of the present invention, and a 2,3-difluorobenzene derivative (16) described in the above Japanese Patent Application Laid-Open No. 1725/1990 was selected as an example of a comparative compound. The liquid crystal characteristics (Δε and Δn) of the respective compounds were compared.

The above liquid crystal characteristics of the compounds of the present invention are values are values determined by extrapolation based on the physical properties of the liquid crystal compositions B2, B3, 85, B8, B10 obtained in Examples 12, 13, 14, 16, and 17.

With respect to those of the comparative compound (16), this compound was actually synthesized this time, and the compound thus obtained was processed in the same manner as the cases of the compounds of the present invention, was processed in the same manner as the cases of the compounds of the present invention, except that it was used in place of the compound of the present invention. Then, the values thereof were determined by extrapolation.

TABLE 2

| Compounds | | Δε | Δn |
|---|---|---|---|
| 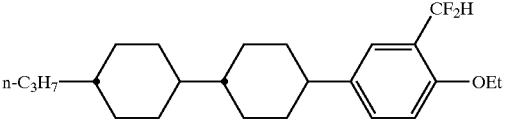 | (No. 22) | −4.1 | 0.080 |
| 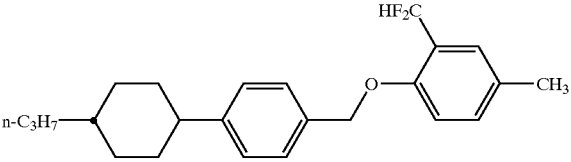 | (No. 201) | −2.7 | 0.094 |
| 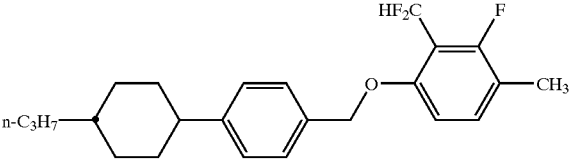 | (No. 202) | −6.4 | 0.100 |
| 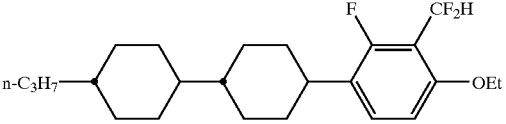 | (No. 25) | −7.9 | 0.087 |
| 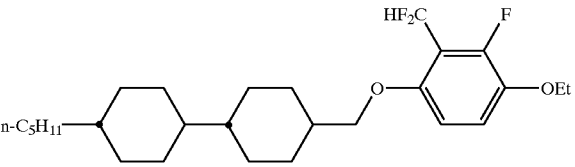 | (No. 195) | −8.4 | 0.087 |
| 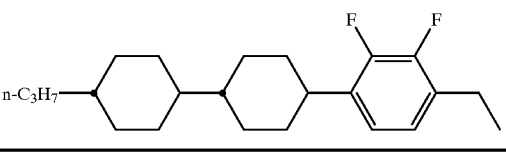 | (16) | −3.3 | 0.090 |

It has been apparent from the results shown in Table 2 that the compounds of the present invention have a negative and absolutely large value of dielectric anisotropy and that the values thereof are equivalent (No. 201) to or more than (No. 22, 202, 25, 195) that of the comparative compound (16).

Industrial Applicability

As explained above, the present invention can achieve a liquid crystalline compound with the characteristics having a negative and absolutely very large value of Δε, being low in viscosity, being chemically and physically stable, being excellent in compatibility with other liquid crystal compounds, particularly at a low temperature, and being out of lowering the clearing point of the compositions. Accordingly, it is very useful for developing particularly liquid crystal compositions having a negative Δε (dielectric anisotropy value) and liquid crystal display devices comprising this liquid crystal compositions.

What is claimed is:

1. A liquid crystalline compound expressed by the general formula (1):

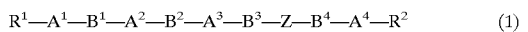

wherein $A^1$, $A^2$, $A^3$ and $A^4$ each independently represent a single bond, 1,4-cyclohexylene, 1,4-phenylene which may be substituted with a fluorine atom(s), dioxane-2,5-diyl, pyrimidine-2,5-diyl, piperidine-1,4-diyl, pyridine-2,5-diyl which may be substituted with a fluorine atom(s) or 1-sila-1,4-cyclohexyllene; Z represents a group selected from divalent groups expressed by partial structural formulas (I) to (VI):

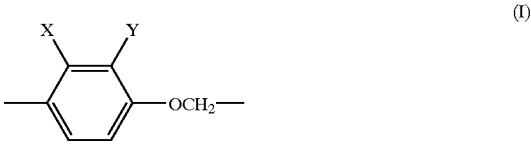
(I)

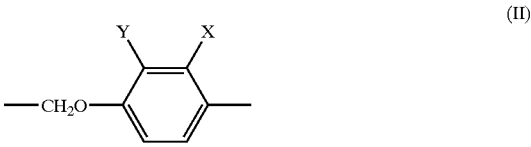
(II)

-continued (III)

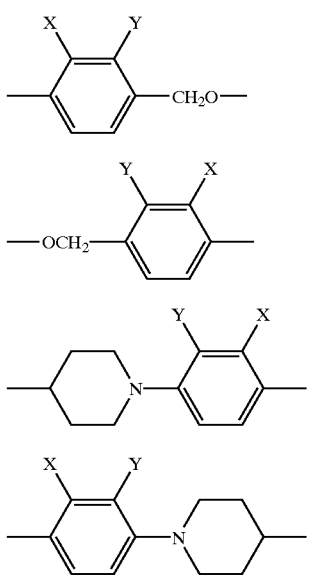

(IV)

(V)

(VI)

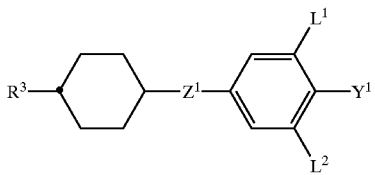  (2)

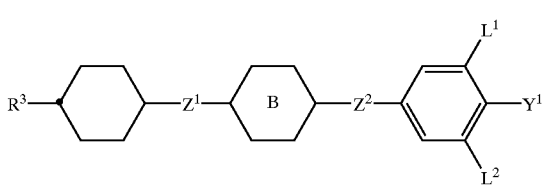  (3)

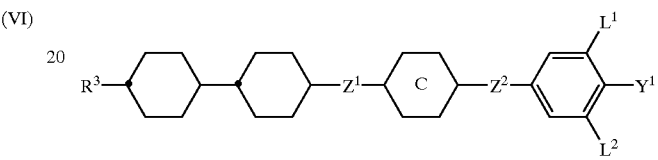  (4)

wherein X represents a hydrogen atom or a fluorine atom, and Y represents a difluoromethyl group, a difluoromethoxy group, a formyl group or a carboxyl group; $B^1$, $B^2$, $B^3$ and $B^4$ each independently represent a single bond, 1,2-ethylene, 1,2-ethenylene, -1,2-ethynylene, oxymethylene, methyleneoxy, carbonyloxy, oxycarbonyl or 1,4-butylene group, provided that when Z is a group represented by the partial structural formula (III), then $B^4$ is neither oxymethylene nor oxycarbonyl group, and that when Z is a group represented by the partial structural formula (IV), then $B^3$ is neither methyleneoxy nor carbonyloxy group, and that when Z is a group represented by the partial structural formula (I), (II), (III) or (IV), then $A^1$, $A^2$, $A^3$ and $A^4$ do not simultaneously represent a single bond, and that when Z is a group represented by the partial structural formula (V) or (VI), then Y does not represent a carboxyl group; $R^1$ and $R^2$ each independently represent an alkyl group or a fluoroalkyl group substituted with at least one fluorine atom having 1 to 10 carbon atoms in which alkyl group or fluoroalkyl group one or not adjacent two or more methylene groups may be replaced by an oxygen atom, a sulfur atom or —CH=CH—.

2. The liquid crystalline compound as described in claim 1 wherein Z is a group represented by the partial structural formula (I).

3. The liquid crystalline compound as described in claim 1 wherein Z is a group represented by the partial structural formula (II).

4. The liquid crystalline compound as described in claim 1 wherein Z is a group represented by the partial structural formula (V).

5. The liquid crystalline compound as described in claim 1 wherein Z is a group represented by the partial structural formula (VI).

6. A liquid crystal composition comprising two or more components at least one of which is a liquid crystalline compound described in any one of claims 1 to 5.

7. A liquid crystal composition comprising, as a first component, at least one liquid crystalline compound described in any one of claims 1 to 5 above, and as a second component, at least one compound selected from the group consisting of the compounds expressed by any one of the formulas (2), (3) and (4):

wherein $R^3$ represents an alkyl group having 1 to 10 carbon atoms in which alkyl group one or not adjacent two or more methylene groups may be replaced by an oxygen atom or —CH=CH—, and any hydrogen atom thereof may be replaced by a fluorine atom; $Y^1$ represents a fluorine atom, a chlorine atom, $OCF_3$, $OCF_2H$, $CF_3$, $CF_2H$, $CFH_2$, $OCF_2CF_2H$ or $OCF_2CFHCF_3$; $L^1$ and $L^2$ each independently represent a hydrogen atom or a fluorine atom; $Z^1$ and $Z^2$ each independently represent a 1,2-ethylene group, a 1,4-butylene group, —COO—, —$CF_2O$—, —$OCF_2$—, —CH=CH— or a single bond; ring B represents trans-1,4-cyclohexylene, 1,3-dioxane-2,5-diyl or 1,4-phenylene in which any hydrogen atom on the ring may be replaced by a fluorine atom; and ring C represents trans-1,4-cyclohexylene, or 1,4-phenylene in which any hydrogen atom on the ring may be replaced by a fluorine atom.

8. A liquid crystal composition comprising, as a first component, at least one liquid crystalline compound described in any one of claims 1 to 5 above, and, as a second component, at least one compound selected from the group consisting of compounds expressed by the formulas (5) and (6):

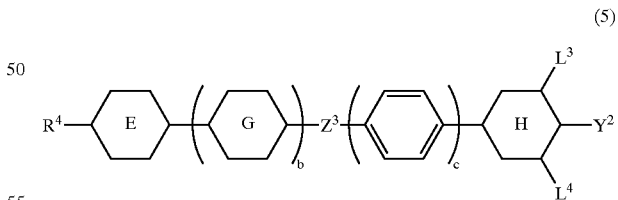  (5)

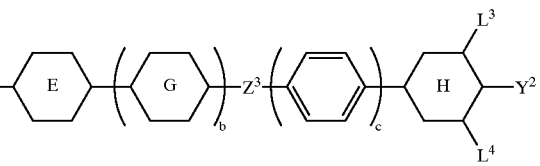  (6)

wherein $R^4$ and $R^5$ each independently represent an alkyl group having 1 to 10 carbon atoms in which alkyl group one or not adjacent two or more methylene groups may be replaced by an oxygen atom or —CH=CH—, and any hydrogen atom thereof may be replaced by a fluorine atom;

$Y^2$ represents a —CN group or —C≡C—CN; ring E represents trans-1,4-cyclohexylene, 1,4-phenylene, 1,3-dioxane-2,5-diyl or pyrimidine-2,5-diyl; ring G represents trans-1,4-cyclohexylene, 1,4-phenylene 4-phenylene in which any hydrogen atom on the ring may be replaced by a fluorine atom or pyrimidine-2,5-diyl; ring H represents trans-1,4-cyclohexylene or 1,4-phenylene; $Z^3$ represents a 1,2-ethylene group, —COO— or a single bond; $L^3$, $L^4$ and $L^5$ each independently represent a hydrogen atom or a fluorine atom; and b, c and d each independently represent 0 or 1.

9. A liquid crystal composition comprising, as a first component, at least one liquid crystalline compound described in any one of claims 1 to 5 above, and as a second component, at least one compound selected from the group consisting of the compounds expressed by any one of the formulas (7), (8) and (9):

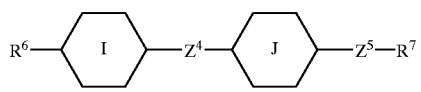
(7)

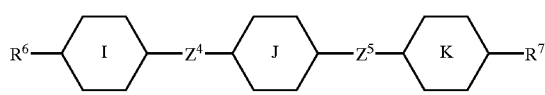
(8)

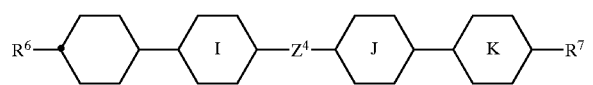
(9)

wherein $R^6$ and $R^7$ each independently represent an alkyl group having 1 to 10 carbon atoms in which alkyl group one or not adjacent two or more methylene groups may be replaced by an oxygen atom or —CH═CH—, and any hydrogen atom thereof may be replaced by a fluorine atom; rings I, J and K each independently represent trans-1,4-cyclohexylene, pyrimidine-2,5-diyl or 1,4-phenylene in which any hydrogen atom on the ring may be replaced by a fluorine atom; and $Z^4$ and $Z^5$ each independently represent —C≡C—, —COO—, —CH$_2$CH$_2$—, —CH═CH— or a single bond.

10. A liquid crystal composition comprising, as a first component, at least one liquid crystalline compound described in any one of claims 1 to 5 above, as a second component, at least one compound selected from the group consisting of the compounds expressed by any one of the formulas (2), (3) and (4), and, as a third component, at least one compound selected from the group consisting of the compounds expressed by any one of the formulas (7), (8) and (9):

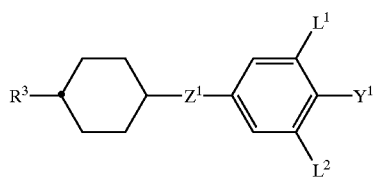
(2)

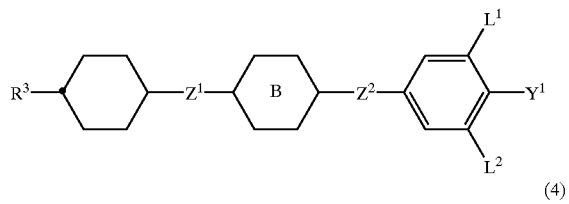
(3)

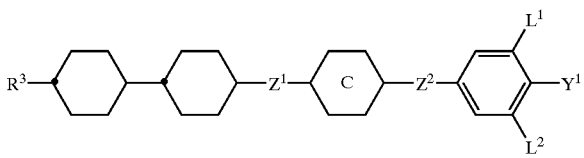
(4)

wherein $R^3$ represents an alkyl group having 1 to 10 carbon atoms in which alkyl group one or not adjacent two or more methylene groups may be replaced by an oxygen atom or —CH═CH—, and any hydrogen atom thereof may be replaced by a fluorine atom; $Y^1$ represents a fluorine atom, a chlorine atom, OCF$_3$, OCF$_2$H, CF$_3$, CF$_2$H, CFH$_2$, OCF$_2$CF$_2$H or OCF$_2$CFHCF$_3$; $L^1$ and $L^2$ each independently represent a hydrogen atom or a fluorine atom; $Z^1$ and $Z^2$ each independently represent a 1,2-ethylene group, a 1,4-butylene group, —COO—, —CF$_2$O—, —OCF$_2$—, —CH═CH—or a single bond; ring B represents trans-1,4-cyclohexylene, 1,3-dioxane-2,5-diyl or 1,4-phenylene in which any hydrogen atom on the ring may be replaced by a fluorine atom; and ring C represents trans-1,4-cyclohexylene, or 1,4-phenylene in which any hydrogen atom on the ring on the ring may be replaced by a fluorine atom,

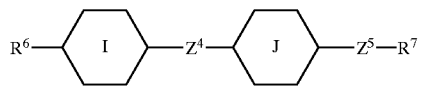
(7)

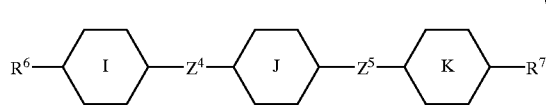
(8)

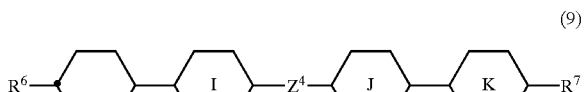
(9)

wherein $R^6$ and $R^7$ each independently represent an alkyl group having 1 to 10 carbon atoms in which alkyl group one or not adjacent two or more methylene groups may be replaced by an oxygen atom or —CH═CH—, and any hydrogen atom thereof may be replaced by a fluorine atom; rings I, J and K each independently represent trans-1,4-cyclohexylene, pyrimidine-2,5-diyl or 1,4-phenylene in which any hydrogen atom on the ring may be replaced by a fluorine atom; and $Z^4$ and $Z^5$ each independently represent —C≡C—, —COO—, —CH$_2$CH$_2$—, —CH═CH— or a single bond.

11. A liquid crystal composition comprising, as a first component, at least one liquid crystalline compound described in any one of claims 1 to 5 above, as a second component, at least one compound selected from the group consisting of the compounds expressed by any one of the formulas (10), (11) and (12):

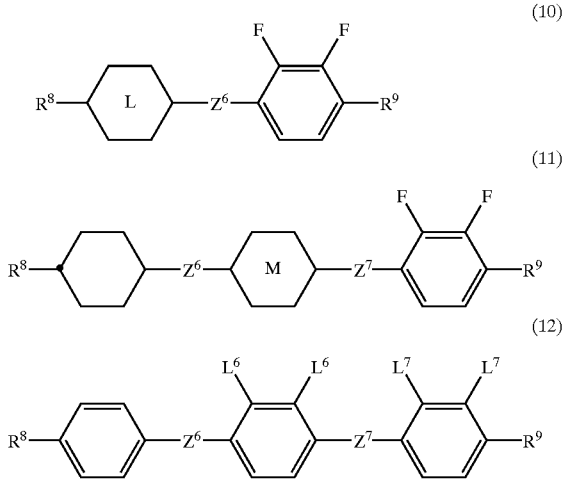

(10)

(11)

(12)

wherein $R^8$ and $R^9$ each independently represent an alkyl group having 1 to 10 carbon atoms in which alkyl group one or not adjacent two or more methylene groups may be replaced by an oxygen atom or —CH=CH—, and any hydrogen atom thereof may be replaced by a g fluorine atom; rings L and M each independently represent trans-1,4-cyclohexylene or 1,4-phenylene; $L^6$ and $L^7$ each independently represent a hydrogen atom or a fluorine atom but never be hydrogen atoms at the same time; and $Z^6$ and $Z^7$ each independently represent —CH$_2$CH$_2$—, —CH$_2$O— or a single bond.

12. A liquid crystal composition comprising, as a first component, at least one liquid crystalline compound described in any one of claims 1 to 5 above, as a second component, at least one compound selected from the group consisting of the compounds expressed by any one of the formulas (7), (8) and (9), and, as a third component, at least one compound selected from the group consisting of the compounds expressed by any one of the formulas (10), (11) and (12):

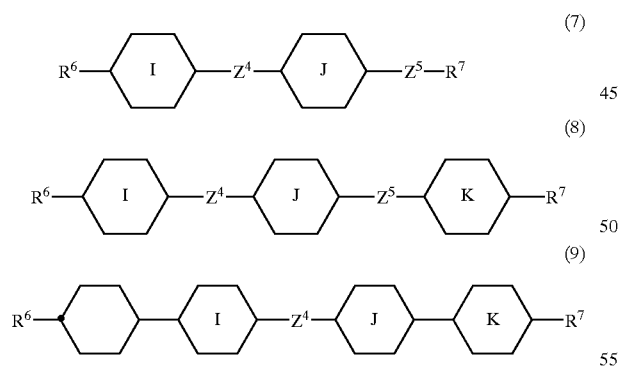

(7)

(8)

(9)

wherein $R^6$ and $R^7$ each independently represent an alkyl group having 1 to 10 carbon atoms in which alkyl group one or not adjacent two or more methylene groups may be replaced by an oxygen atom or —CH=CH—, and any hydrogen atom thereof may be replaced by a fluorine atom; rings I, J and K each independently represent trans-1,4-cyclohexylene, pyrimidine-2,5-diyl or 1,4-phenylene in which any hydrogen atom on the ring may be replaced by a fluorine atom; and $Z^4$ and $Z^5$ each independently represent —C≡C—, —COO—, —CH$_2$CH$_2$—, —CH=CH— or a single bond,

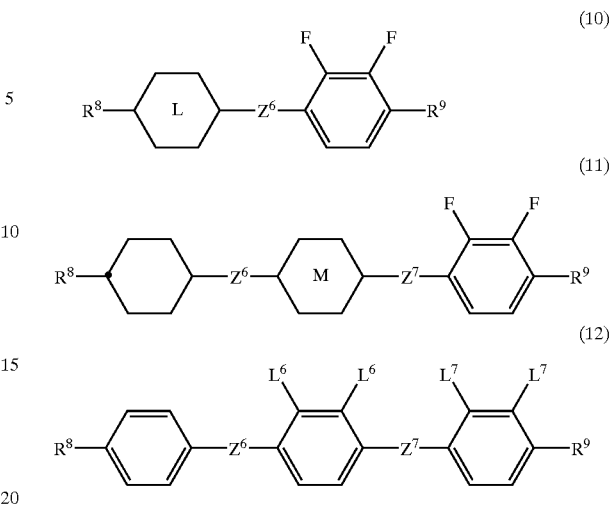

(10)

(11)

(12)

wherein $R^8$ and $R^9$ each independently represent an alkyl group having 1 to 10 carbon atoms in which alkyl group one or not adjacent two or more methylene groups may be replaced by an oxygen atom or —CH=CH—, and any hydrogen atom thereof may be replaced by a fluorine atom; rings L and M each independently represent trans-1,4-cyclohexylene or 1,4-phenylene; $L^6$ and $L^7$ each independently represent a hydrogen atom or a fluorine atom but never be hydrogen atoms at the same time; and $Z^6$ and $Z^7$ each independently represent —CH$_2$CH$_2$—, —CH$_2$O—or a single bond.

13. A liquid crystal composition comprising, as a first component, at least one liquid crystalline compound described in any one of claims 1 to 5 above, as a second component, at least one compound selected from the group consisting of compounds expressed by the formulas (5) and (6), and, as a third component, at least one compound selected from the group consisting of the compounds expressed by any one of the formulas (7), (8) and (9):

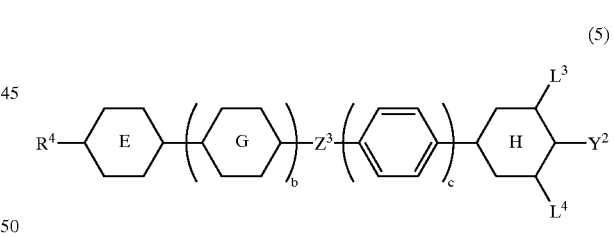

(5)

wherein $R^4$ and $R^5$ each independently represent an alkyl group having 1 to 10 carbon atoms in which alkyl group one or not adjacent two or more methylene groups may be replaced by an oxygen atom or —CH=CH—, and any hydrogen atom thereof may be replaced by a fluorine atom; $Y^2$ represents a —CN group or —C≡C—CN; ring E represents trans-1,4-cyclohexylene, 1,4-phenylene, 1,3-dioxane-2,5-diyl or pyrimidine-2,5-diyl; ring G represents trans-1,4-cyclohexylene, 1,4-phenylene 4-phenylene in which any hydrogen atom on the ring may be replaced by a fluorine atom or pyrimidine-2,5-diyl; ring H represents trans-1,4-cyclohexylene or 1,4-phenylene; $Z^3$ represents a 1,2-ethylene group, —COO— or a single bond; $L^3$, $L^4$ and $L^5$ each independently represent a hydrogen atom or a fluorine atom; and b, c and d each independently represent 0 or 1,

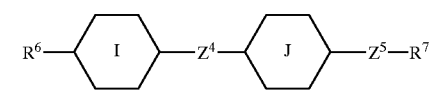
(7)

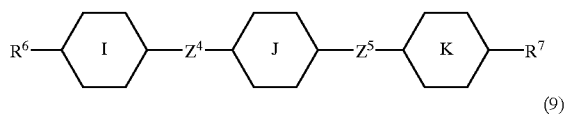
(8)

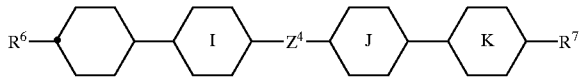
(9)

wherein R⁶ and R⁷ each independently represent an alkyl group having 1 to 10 carbon atoms in which alkyl group one or not adjacent two or more methylene groups may be replaced by an oxygen atom or —CH=CH—, and any hydrogen atom thereof may be replaced by a fluorine atom; rings I, J and K each independently represent trans-1,4-cyclohexylene, pyrimidine-2,5-diyl or 1,4-phenylene in which any hydrogen atom on the ring may be replaced by a fluorine atom; and $Z^4$ and $Z^5$ each independently represent —C≡C—, —COO—, —CH₂CH₂—, —CH=CH— or a single bond.

14. A liquid crystal composition comprising, as a first component, at least one liquid crystalline compound described in any one of claims 1 to 5 above, as a second component, at least one compound selected from the group consisting of the compounds expressed by any one of the formulas (2), (3) and (4), as a third component, at least one compound selected from the group consisting of compounds expressed by the formulas (5) and (6), and, as a fourth component, at least one compound selected from the group consisting of the compounds expressed by any one of the formulas (7), (8) and (9):

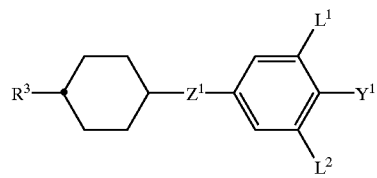
(2)

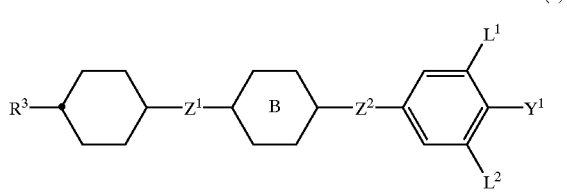
(3)

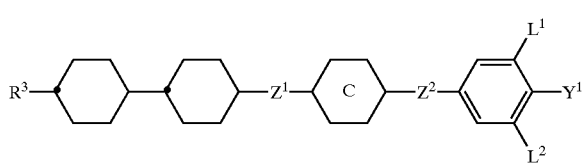
(4)

wherein R³ represents an alkyl group having 1 to 10 carbon atoms in which alkyl group one or not adjacent two or more methylene groups may be replaced by an oxygen atom or —CH=CH—, and any hydrogen atom thereof may be replaced by a fluorine atom; Y¹ represents a fluorine atom a chlorine atom, OCF₃, OCF₂H, CF₃, CF₂H, CFH₂, OCF₂CF₂H or OCF₂CFHCF₃; L¹ and L² each independently represent a hydrogen atom or a fluorine atom; Z¹ and Z² each independently represent a 1,2-ethylene group, a 1,4-butylene group, —COO—, —CF₂O—, —OCF₂—, —CH=CH—or a single bond; ring B represents trans-1,4-cyclohexylene, 1,3-dioxane-2,5-diyl or 1,4-phenylene in which any hydrogen atom on the ring may be replaced by a fluorine atom; and ring C represents trans-1,4-cyclohexylene, or 1,4-phenylene in which any hydrogen atom on the ring may be replaced by a fluorine atom,

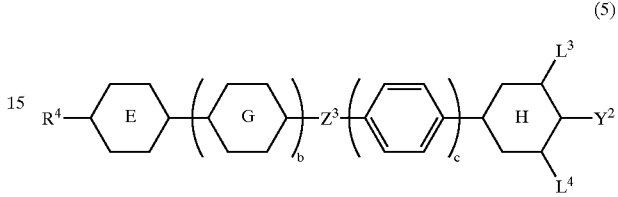
(5)

wherein R⁴ and R⁵ each independently represent an alkyl group having 1 to 10 carbon atoms in which alkyl group one or not adjacent two or more methylene groups may be replaced by an oxygen atom or —CH=CH—, and any hydrogen atom thereof may be replaced by a fluorine atom; Y² represents a —CN group or —C≡C—CN; ring E represents trans-1,4-cyclohexylene, 1,4-phenylene, 1,3-dioxane-2,5-diyl or pyrimidine-2,5-diyl; ring G represents trans-1,4-cyclohexylene, 1,4-phenylene 4-phenylene in which any hydgrogen atom on the ring may be replaced by a fluorine atom or pyrimidine-2,5-diyl; ring H represents trans-1,4-cyclohexylene or 1,4-phenylene; Z³ represents a 1,2-ethylene group, —COO— or a single bond; L³ and L⁴ and L⁵ each independently represent a hydrogen atom or a fluorine atom; and b, c and d each independently represents 0 or 1,

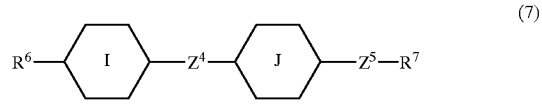
(7)

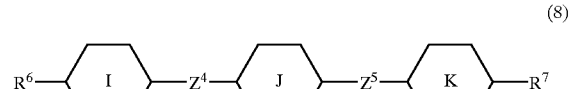
(8)

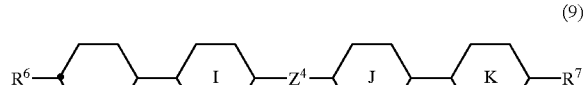
(9)

wherein R⁶ and R⁷ each independently represent an alkyl group having 1 to 10 carbon atoms in which alkyl group one or not adjacent two or more methylene groups may be replaced by an oxygen atom or —CH=CH—, and any hydrogen atom thereof may be replaced by a fluorine atom; rings I, J and K each independently represent trans-1,4-cyclohexylene, pyrimidine-2,5-diyl or 1,4-phenylene in which any hydrogen atom on the ring may be replaced by a fluorine atom; and Z⁴ and Z⁵ each independently represent —C≡C—, —COO—, —CH₂CH₂—, —CH=CH—or a single bond.

15. A liquid crystal composition recited in claim 6 wherein the liquid crystal composition further comprises an optically active compound.

16. A liquid crystal display device comprising the liquid crystal composition as recited in claim 6.

* * * * *